United States Patent [19]

Boynton et al.

[11] 4,452,136

[45] Jun. 5, 1984

[54] PRINTER SUBSYSTEM WITH DUAL COOPERATING MICROPROCESSORS

[75] Inventors: William W. Boynton, Bronson; Charles J. Weber, Boca Raton, both of Fla.

[73] Assignee: International Business Machines Corporation, Armonk, N.Y.

[21] Appl. No.: 86,484

[22] Filed: Oct. 19, 1979

[51] Int. Cl.³ .............................................. B41J 3/10
[52] U.S. Cl. ................................. 101/93.05; 400/70; 400/124; 400/224; 400/225; 400/616.1; 400/656; 364/900
[58] Field of Search .............. 400/1, 2, 3, 4, 5, 8, 400/124, 126; 364/200, 900; 101/93.04, 93.05

[56] References Cited

U.S. PATENT DOCUMENTS

| | | | |
|---|---|---|---|
| 3,299,408 | 1/1967 | An Wang et al. | 400/7 X |
| 4,026,402 | 5/1977 | Byrd | 364/900 X |
| 4,028,669 | 6/1977 | Higashide | 364/900 |
| 4,037,216 | 7/1977 | Chang et al. | 364/900 |
| 4,059,183 | 11/1977 | Hoskins | 101/93.05 X |
| 4,065,810 | 12/1977 | Cramer et al. | 364/200 |
| 4,084,228 | 4/1978 | Dufond et al. | 364/200 |
| 4,096,578 | 6/1978 | Malkemes | 364/900 |
| 4,128,876 | 12/1978 | Ames et al. | 364/200 |
| 4,149,235 | 4/1979 | Froyd et al. | 364/900 X |
| 4,179,738 | 12/1979 | Fairchild et al. | 364/200 |
| 4,215,395 | 7/1980 | Bunyard et al. | 364/200 X |
| 4,218,754 | 8/1980 | Schaeffer et al. | 364/900 |
| 4,261,039 | 4/1981 | Baker et al. | 101/93.05 X |

OTHER PUBLICATIONS

IBM Technical Disclosure Bulletin, "Standard Printer or I/O Adapter Control Method and Apparatus," Hays et al., vol. 22, No. 1, Jun. 1979, pp. 269–271.
Article, "Managing Dot-Matrix Printing with a Microprocessor", by John J. Ignoffo et al., Hewlitt-Packard Journal, v. 29, No. 15, 1978, pp. 8–19.

*Primary Examiner*—Ernest T. Wright, Jr.
*Attorney, Agent, or Firm*—D. Kendall Cooper; John C. Black; J. Jancin, Jr.

[57] ABSTRACT

A printer subsystem is interconnected with a host system from which it receives command and data information and to which it provides status information. The printer subsystem has two microprocessors, one of which communicates with the host system for transfer of command, data, and status signals and the other of which directly controls the printer unit in the subsystem especially with respect to the print assembly, forms feed assembly, ribbon drive assembly, and print wire actuators.

10 Claims, 117 Drawing Figures

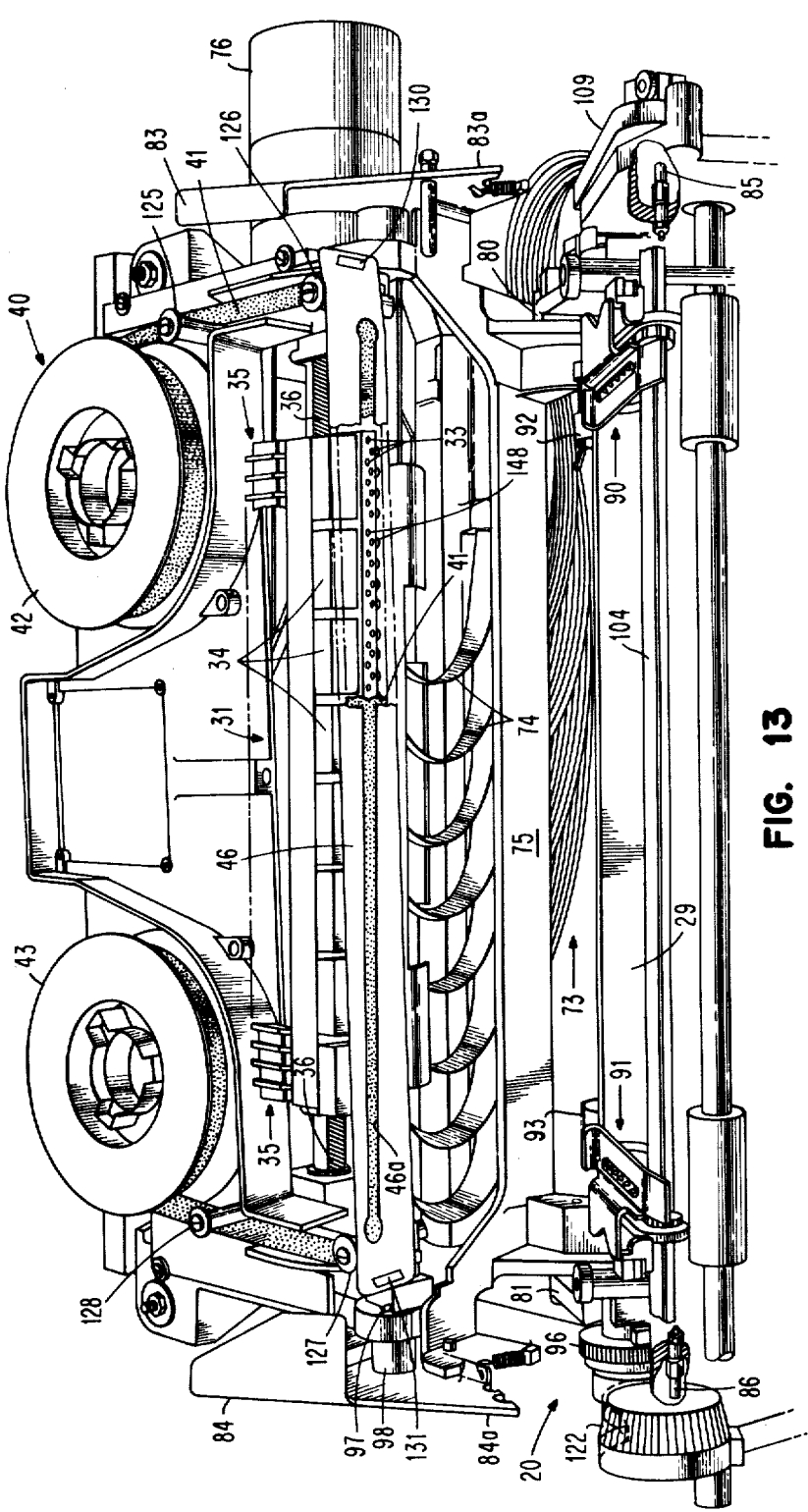

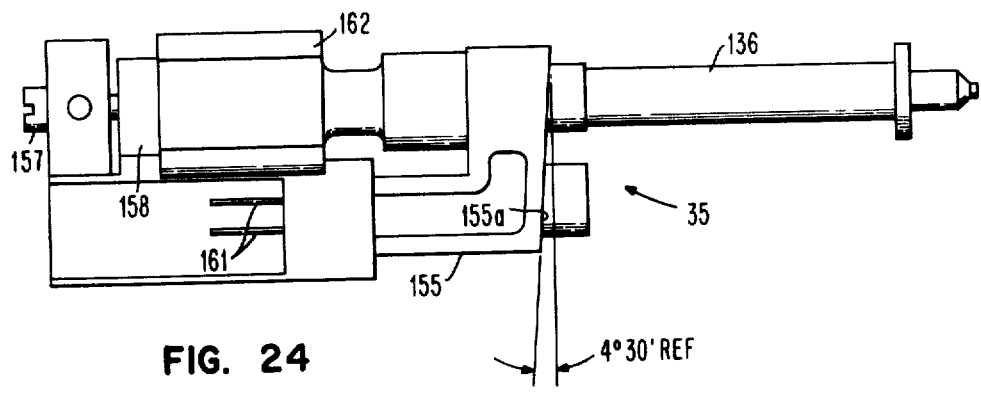
FIG. 24
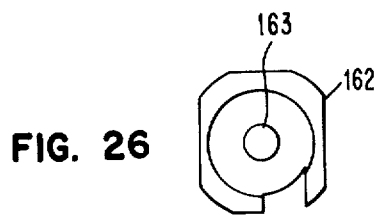
FIG. 26
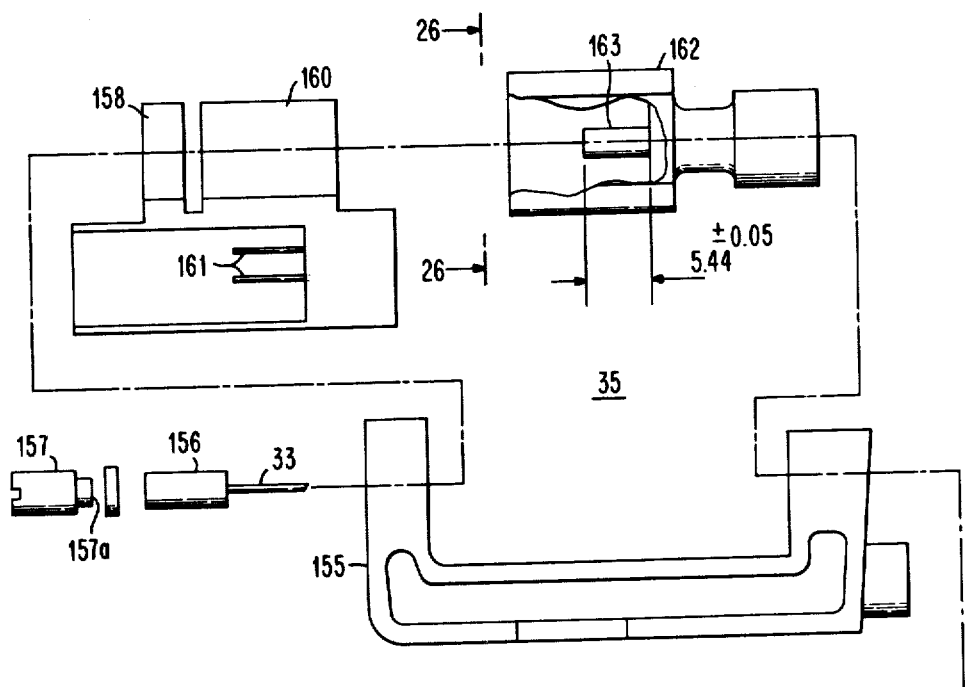
FIG. 25
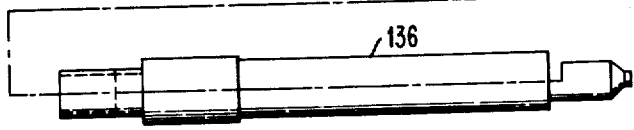

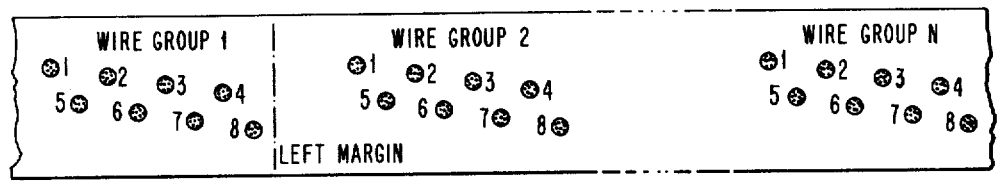
FIG. 29
FIG. 30
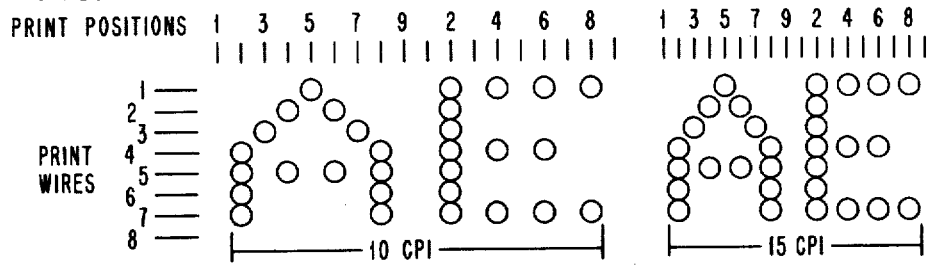
FIG. 31
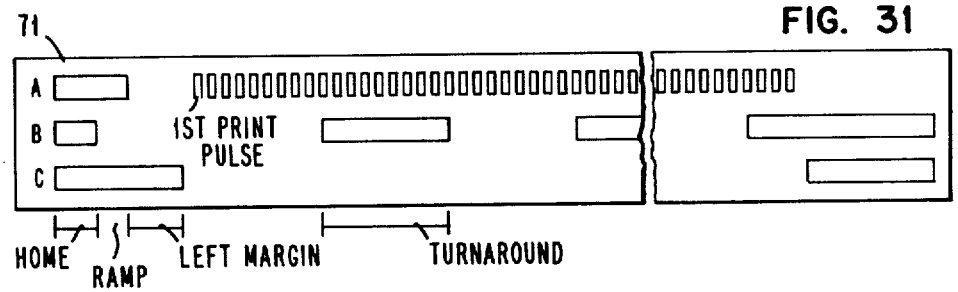
FIG. 32
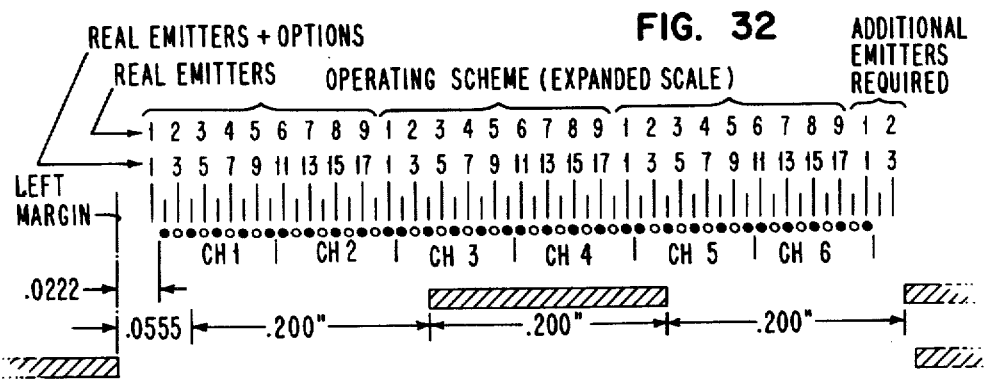

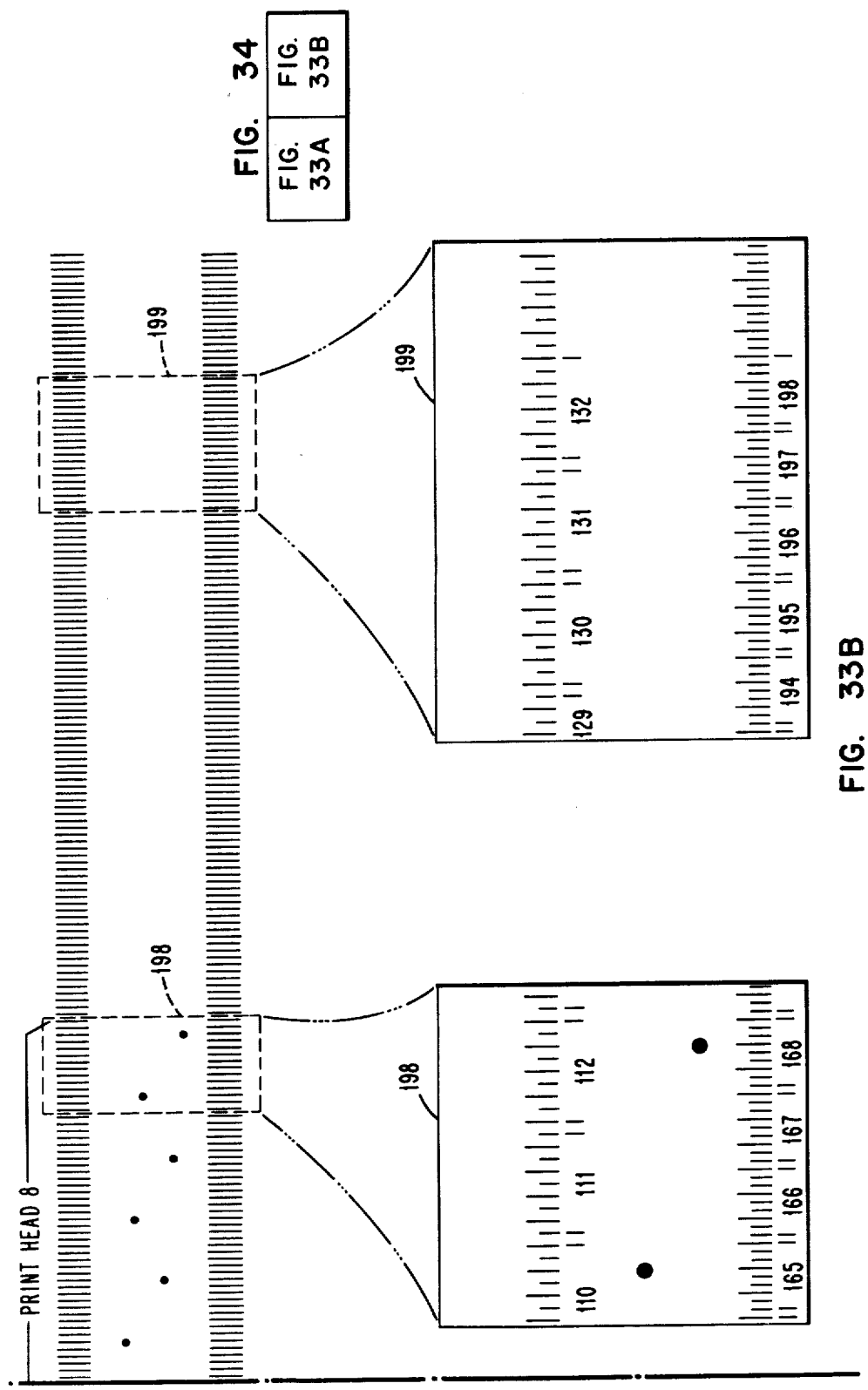

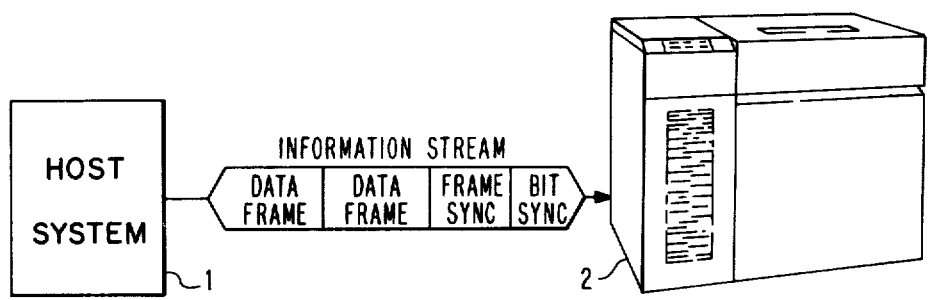
FIG. 41
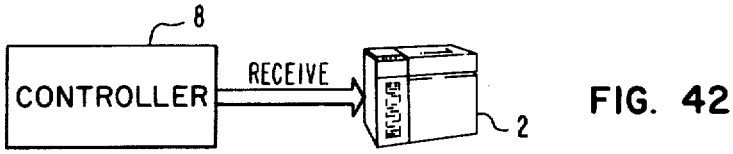
FIG. 42
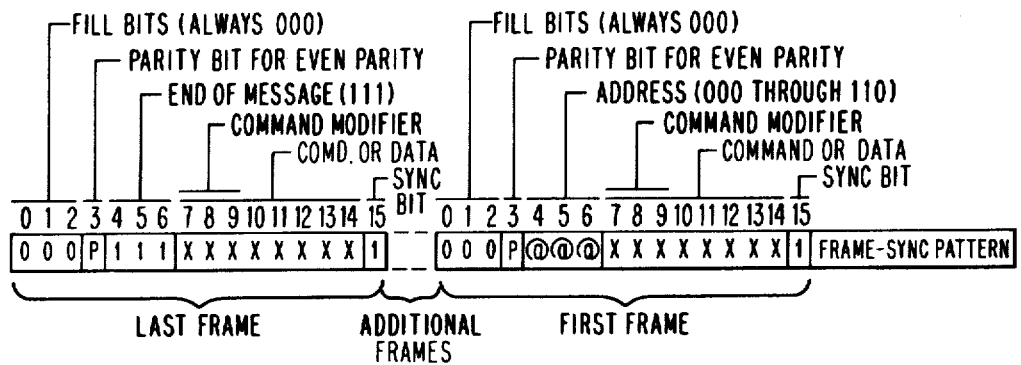
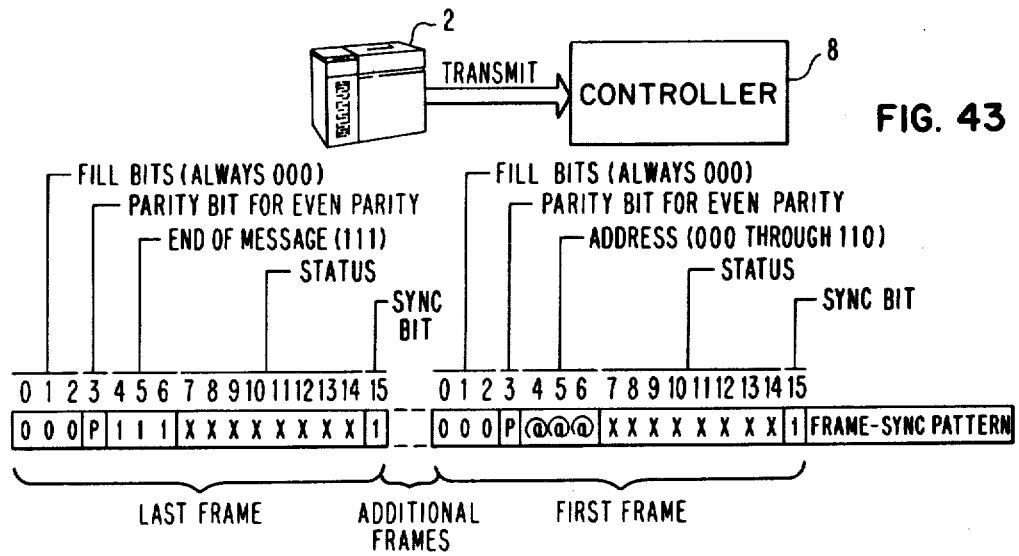
FIG. 43

ADDRESSING HIGHLIGHTS

FOR A SINGLE PRINTER, ADDRESS IS 000
WITH CABLE CONNECTOR FEATURE, USABLE ADDRESSES ARE 000 TO 110
A BIT COMBINATION OF 111 INDICATES END-OF-MESSAGE & TERMINATES A
TRANSFER SEQUENCE

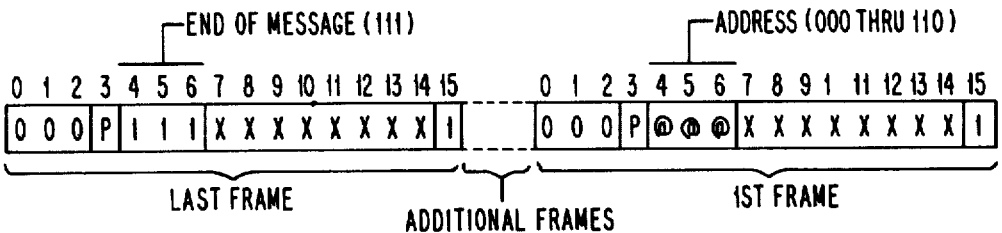

FIG. 44

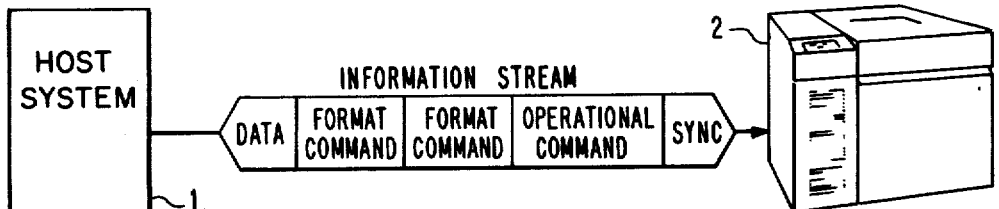

FIG. 45

SAMPLE TRANSFER SEQUENCE FOR PRINTING DATA

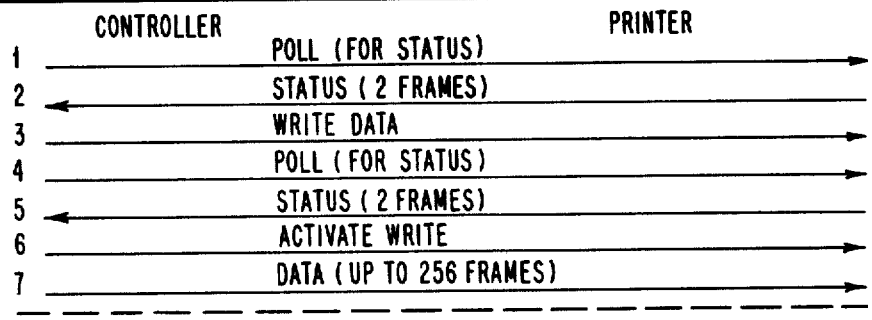

1,4: POLL COMMAND REQUESTS PRINTER STATUS
2,5: RESPONSE STATUS FRAMES INFORM CONTROLLER OF PRINTER AVAILABILITY
  3: WRITE DATA COMMAND PREPARES PRINTER FOR PRINTING OPERATION
  6: ACTIVATE WRITE COMMAND STARTS PRINTING OPERATION
  7: CONTROLLER SENDS DATA & EMBEDDED FORMATTING COMMANDS TO PRINTER

FIG. 46

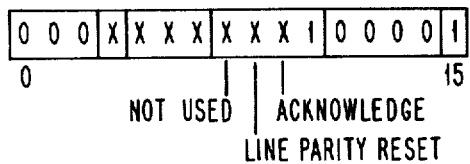
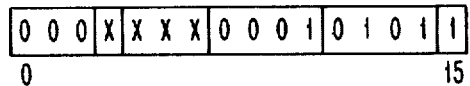
FIG. 47A
FIG. 47B
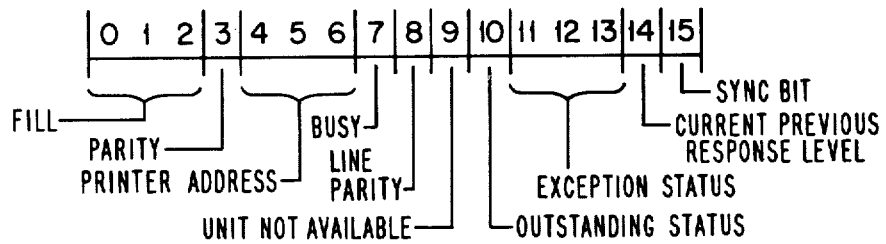
FIG. 48
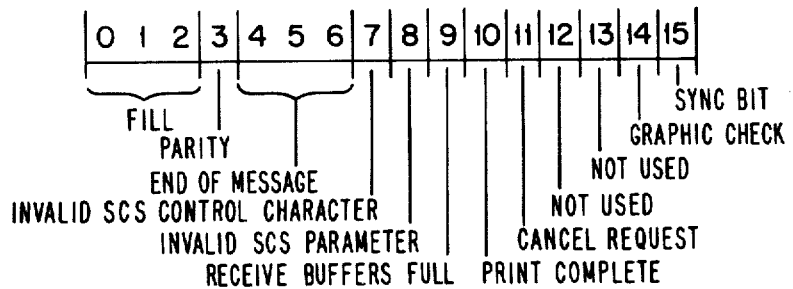
FIG. 49

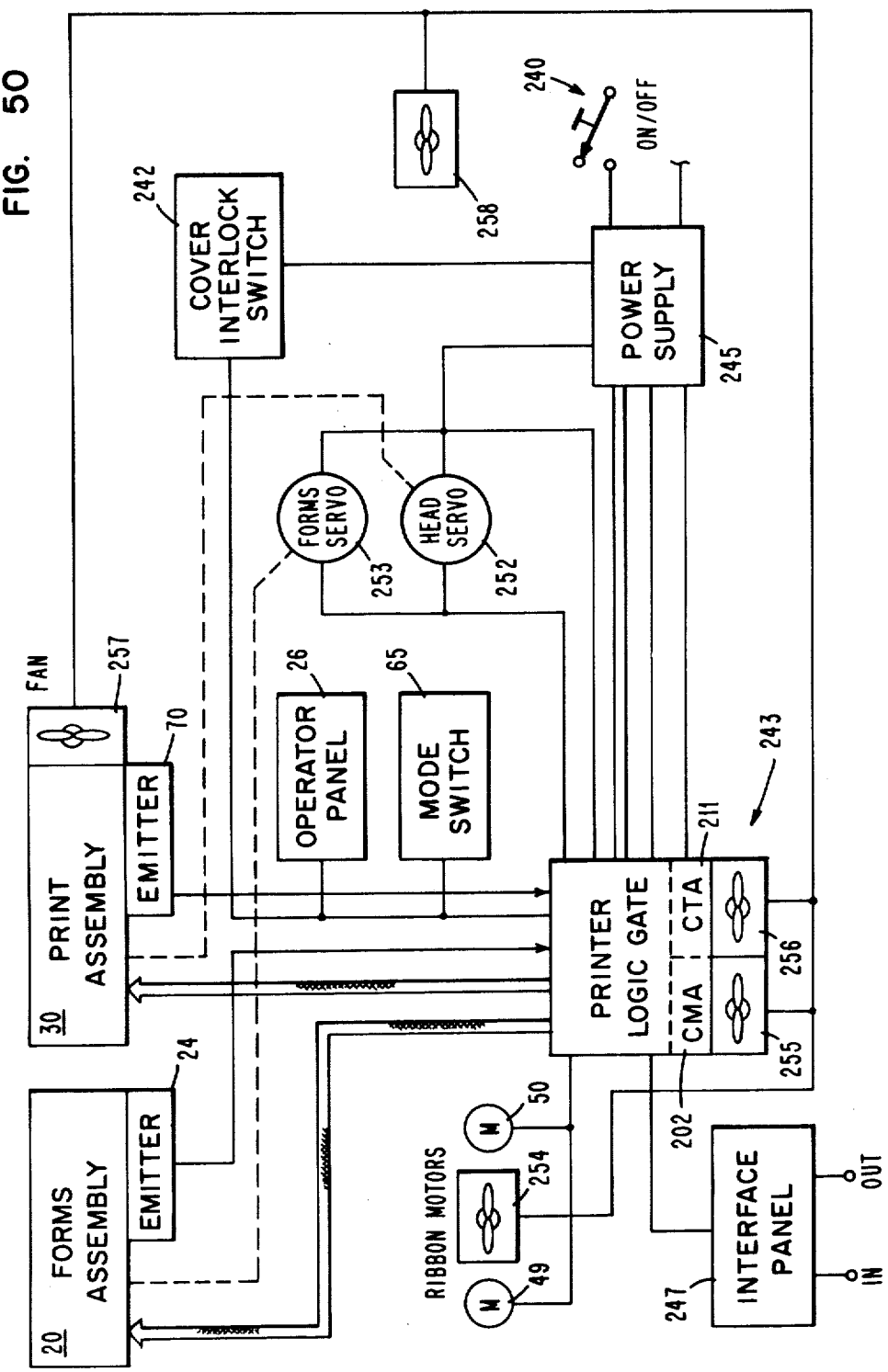

COMMUNICATIONS MICROPROCESSOR (CMM)

CONTROL MICROPROCESSOR (CTM)

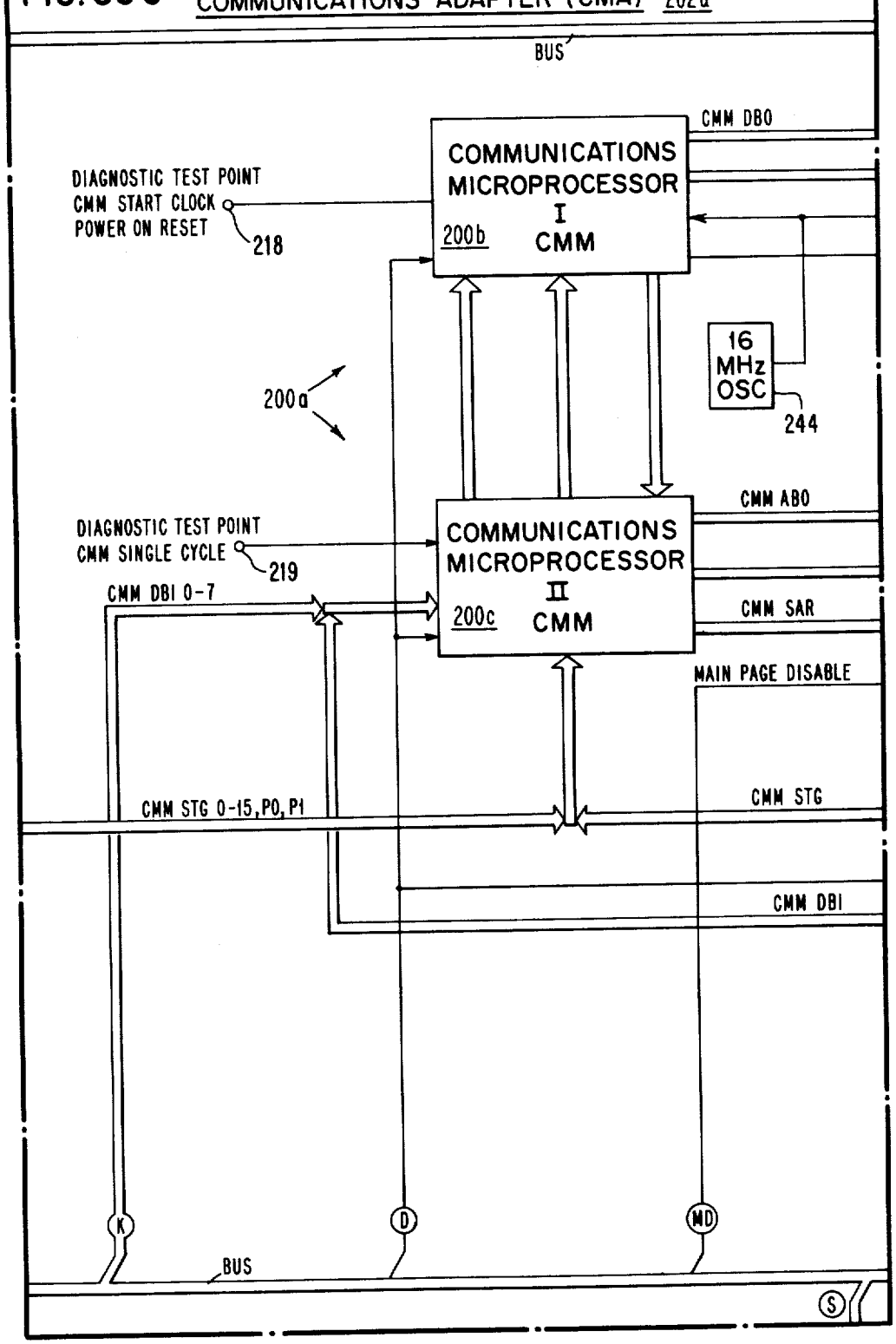

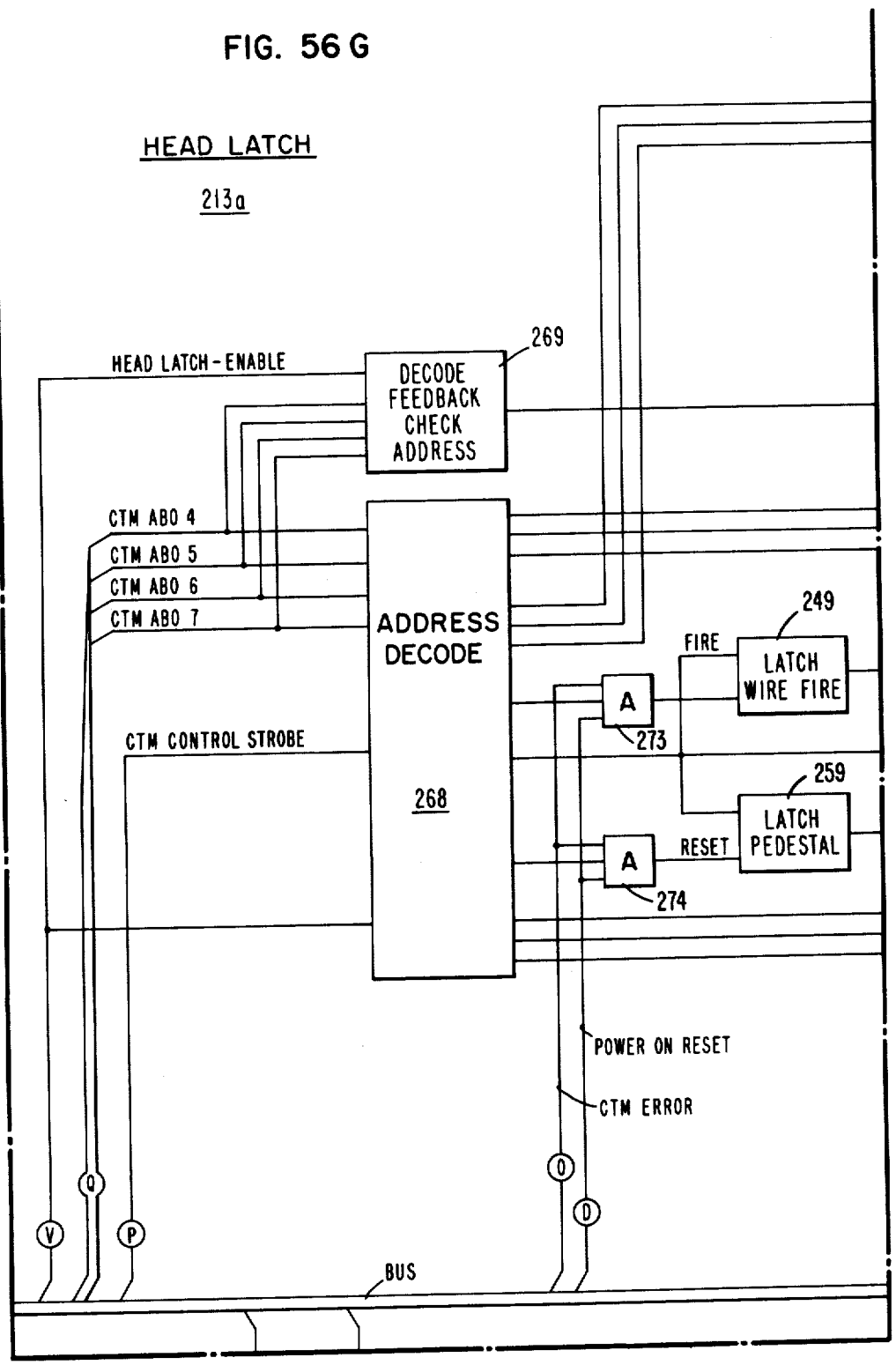

| FIG. 56A | FIG. 56B | FIG. 56C | FIG. 56D | FIG. 56E | FIG. 56F | FIG. 56G | FIG. 56H |
|---|---|---|---|---|---|---|---|
| FIG. 56I | FIG. 56J | FIG. 56K | FIG. 56L | FIG. 56M | FIG. 56N | FIG. 56O | FIG. 56P |

SPEED REFERENCE GENERATOR

| FIG. | FIG. | FIG. |
|------|------|------|
| 61A  | 61B  | 61C  |

DETENT REFERENCE GENERATOR

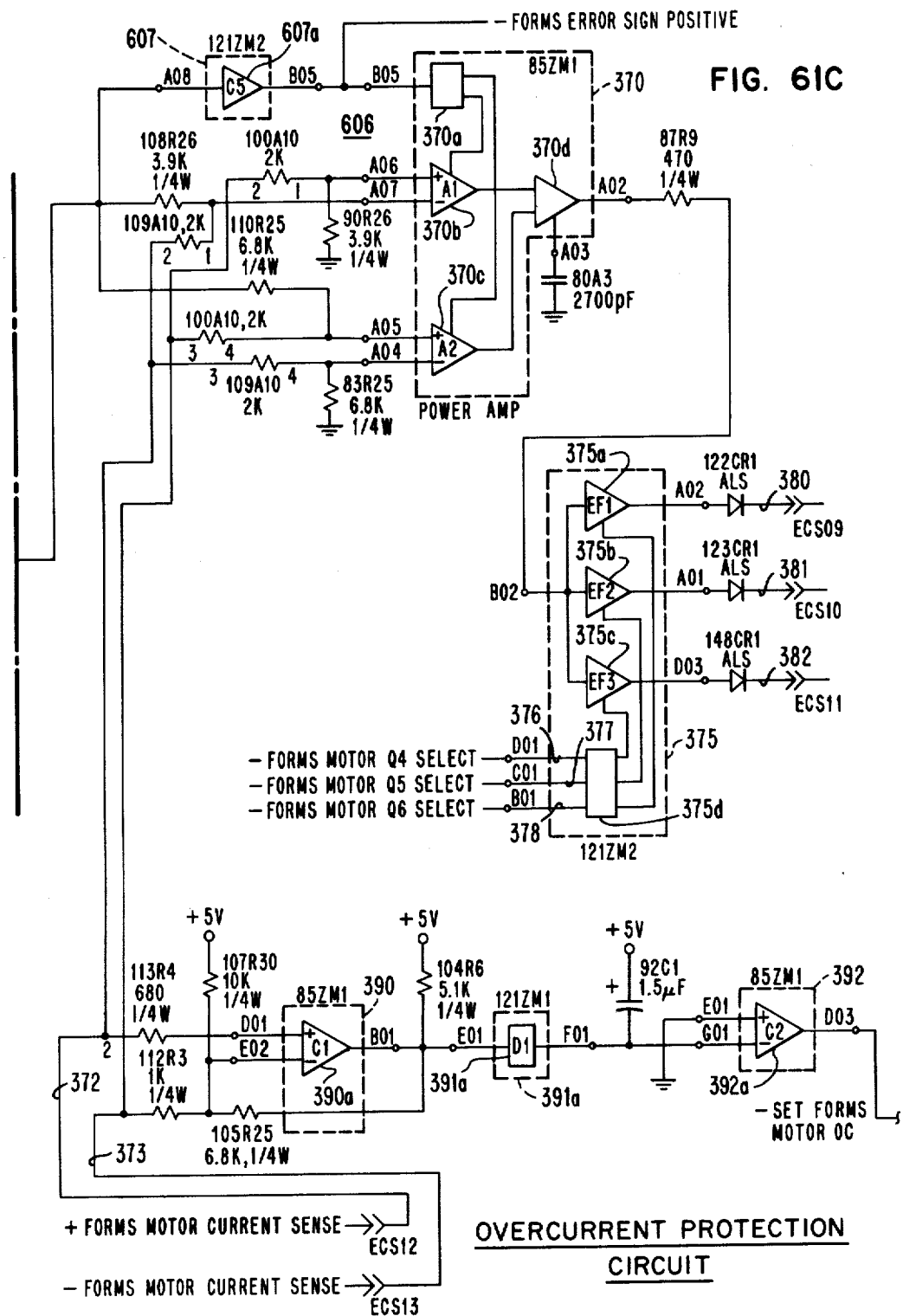

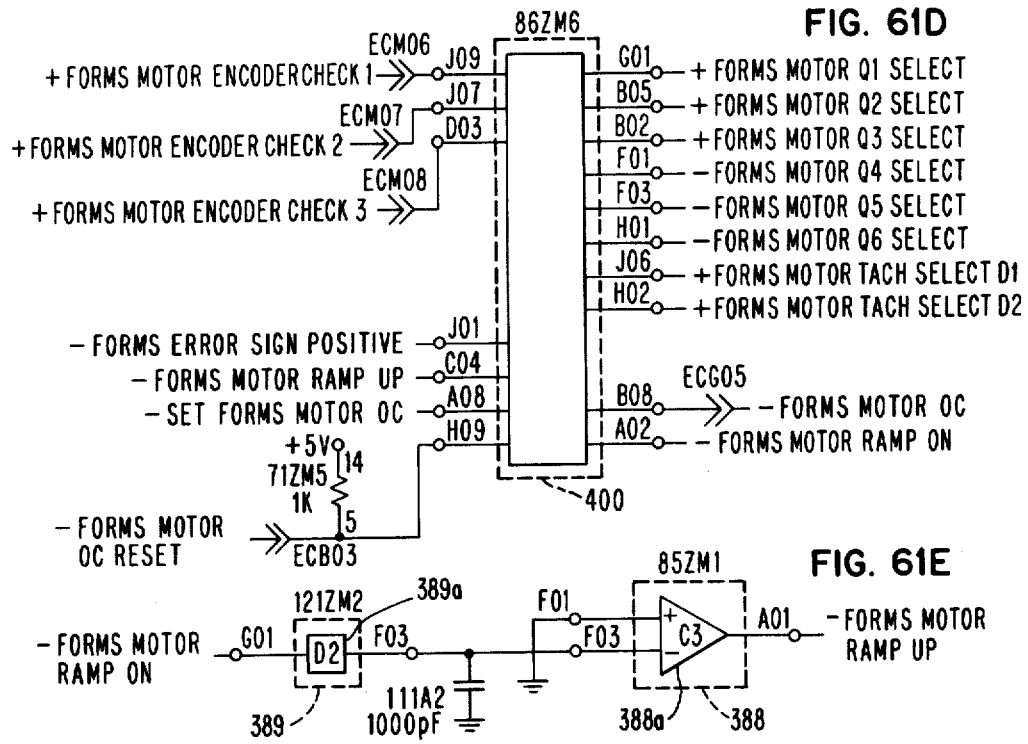
FIG. 61D
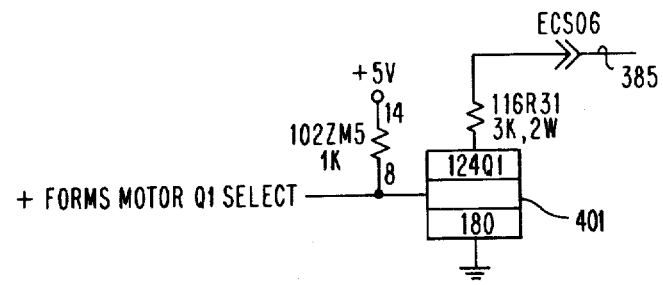
FIG. 61E
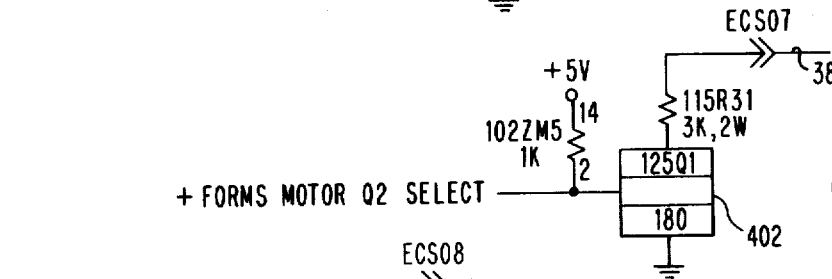
FIG. 61F
FIG. 61G
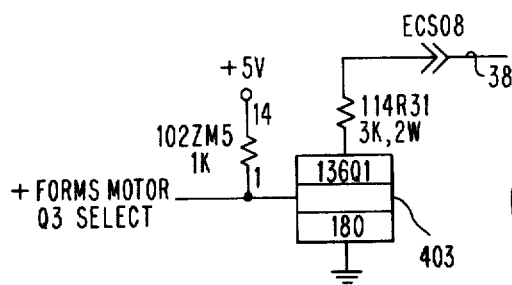
FIG. 61H FIG. 61I
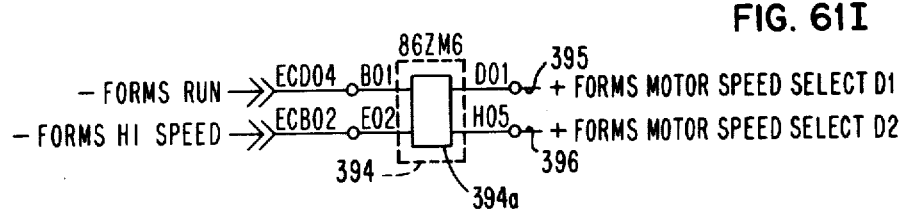
FIG. 61J
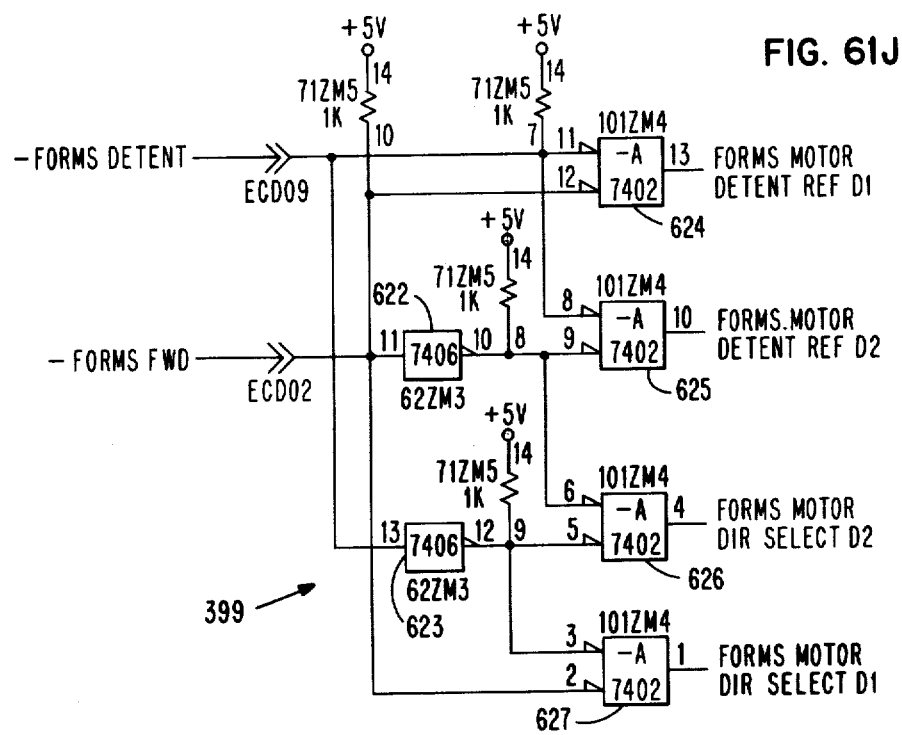
FIG. 61K
| MODULE | VOLTAGE | | | | |
|---|---|---|---|---|---|
| | +5V | -6V | +8V | +15V | GND |
| 18ZM1,85ZM1 | C04 | A08,D07 H09,J05 | G06,H08 | B02,J08 | C01,C06 |
| 21ZM2,121ZM2 | A03 | D07,H09 J05 | G06,H08 A04 | J08 | C06,E02 |
| 86ZM6 | D07 | | | | C06,G06 |
| 62ZM3,63ZM4 101ZM4 | PIN 14 | | | | PIN 7 |

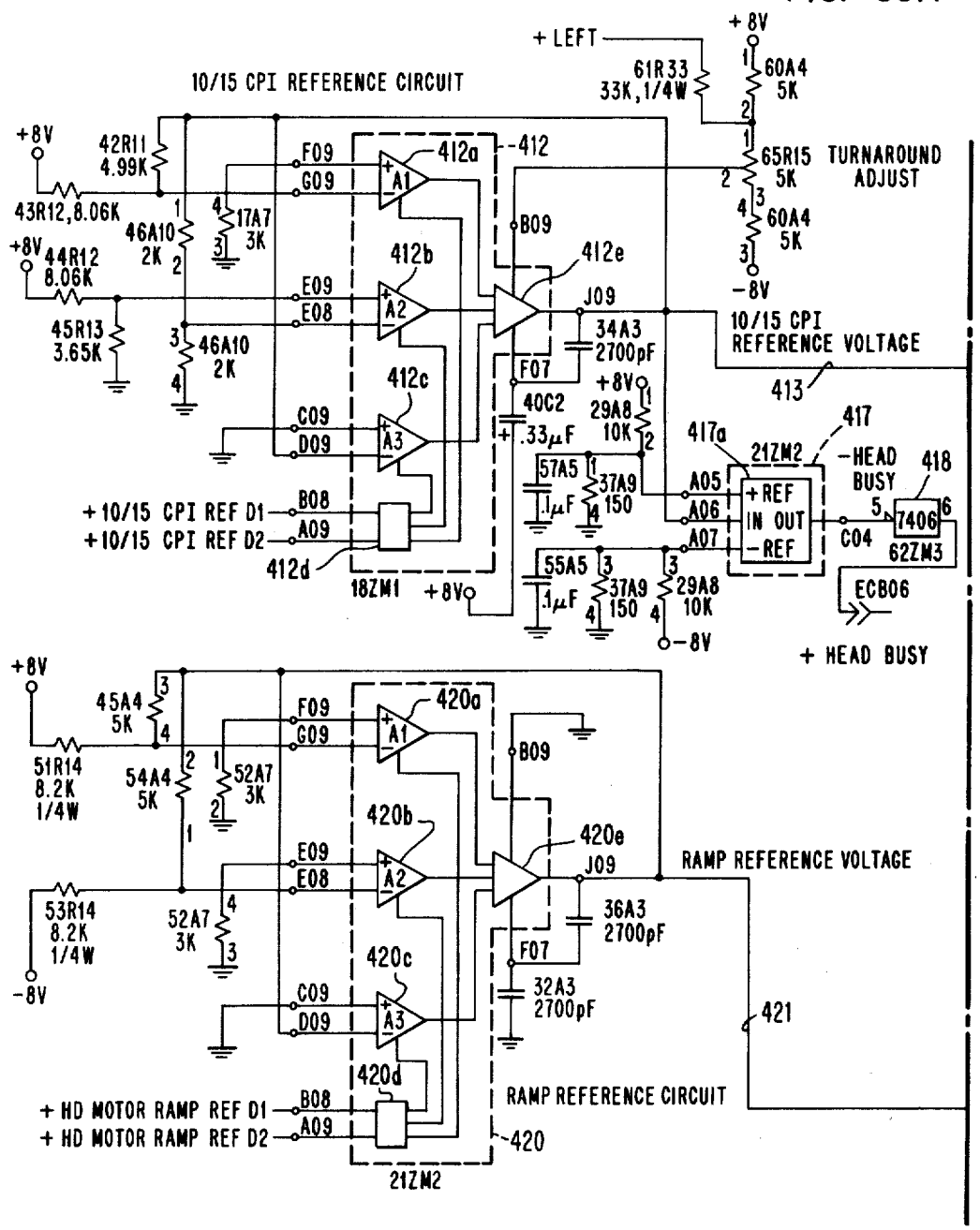

DISCRETE PREDRIVERS

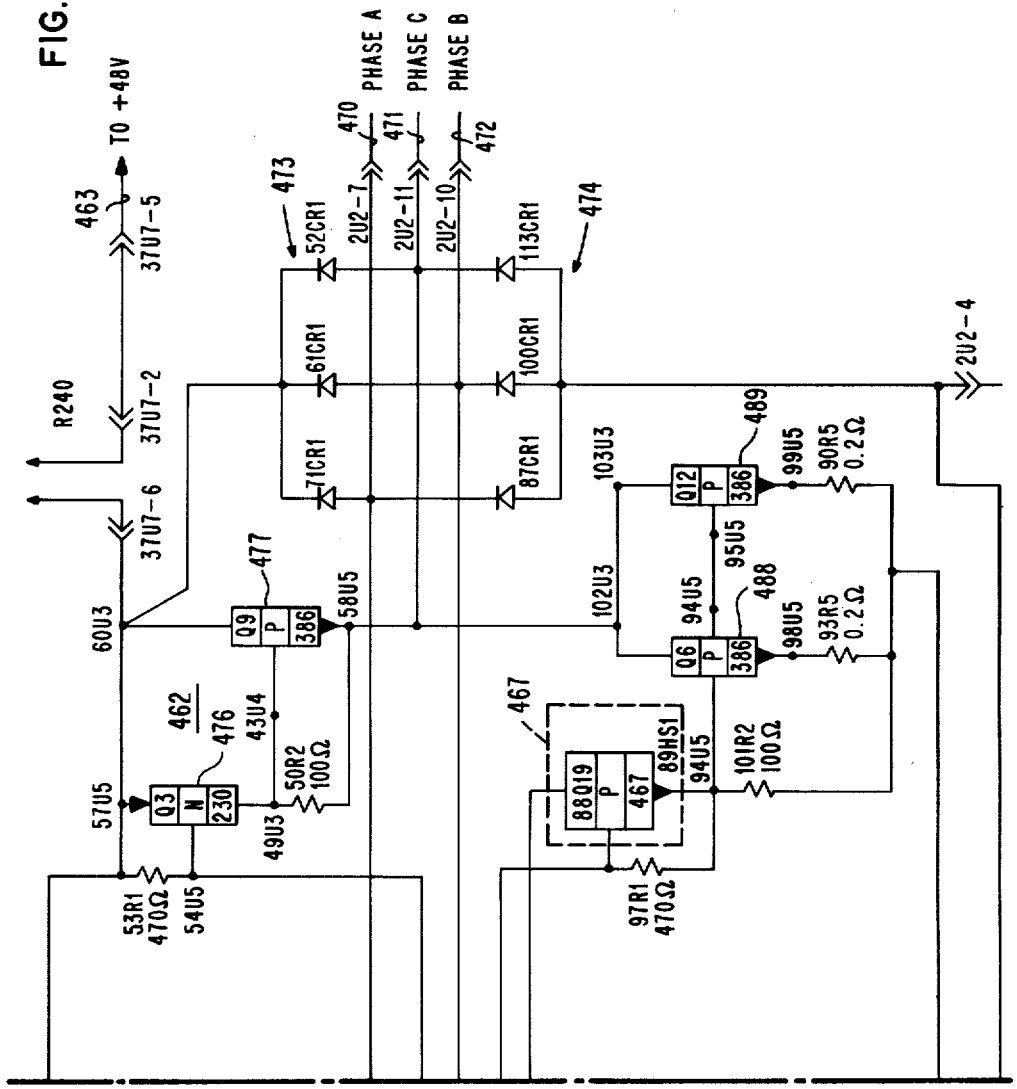

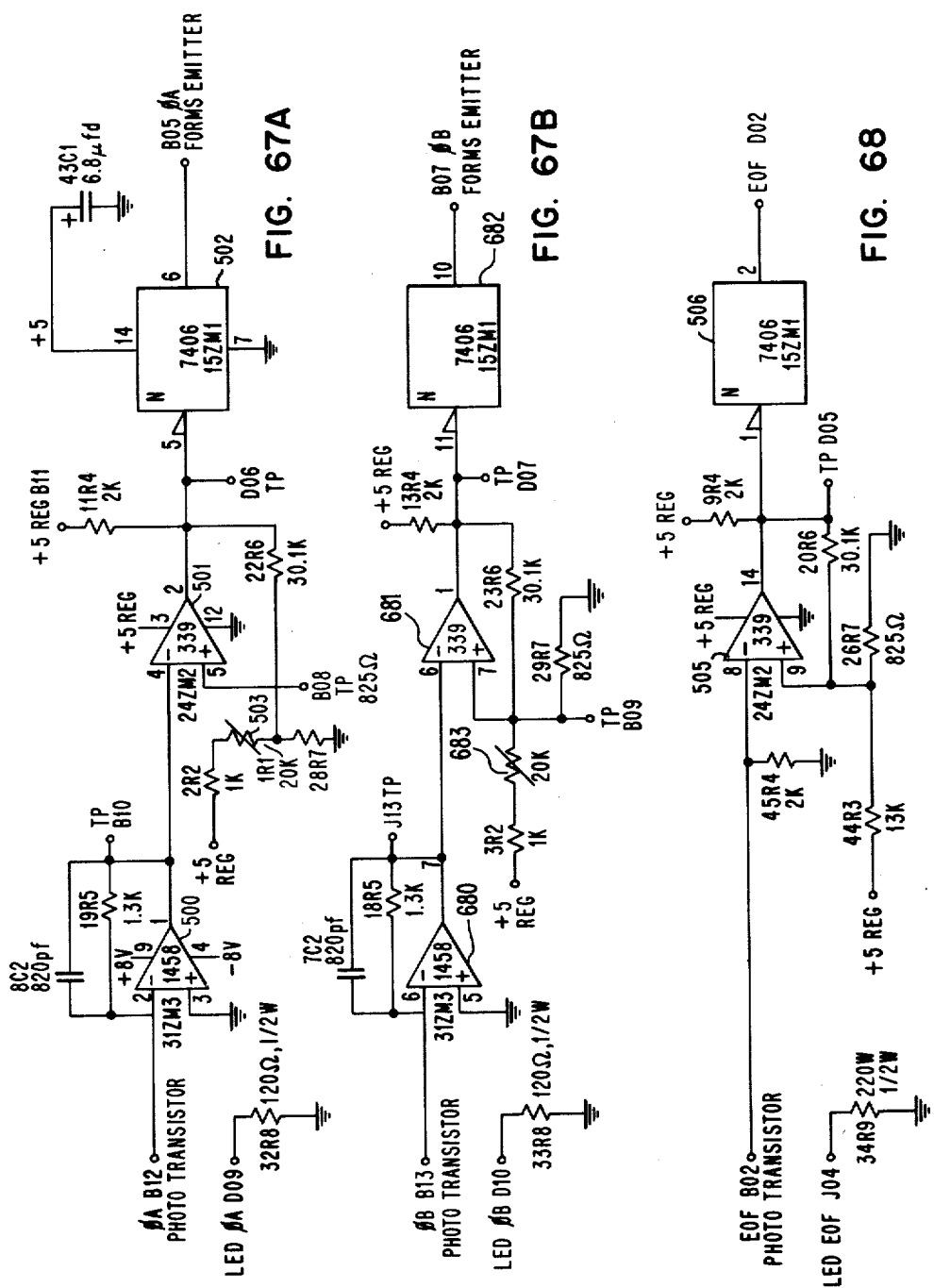

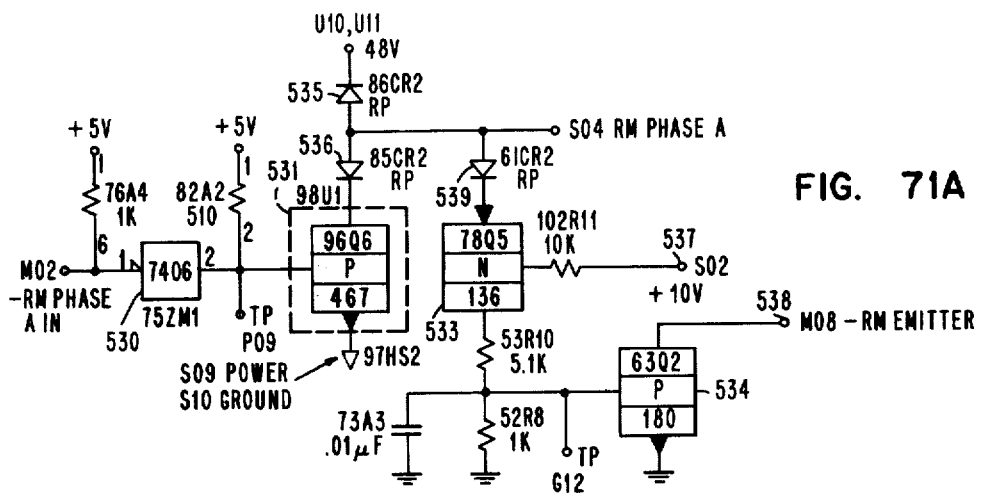
FIG. 71A
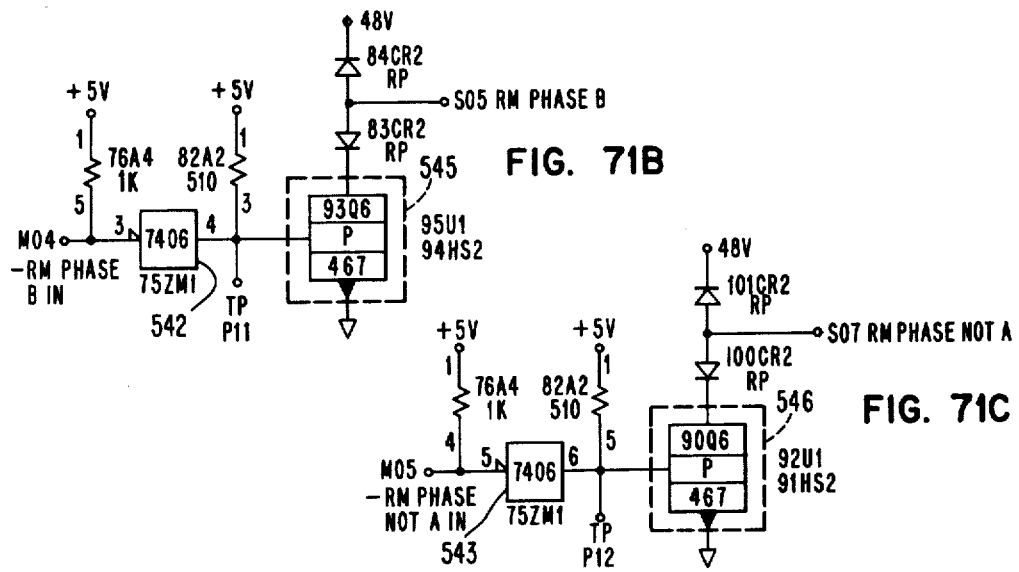
FIG. 71B
FIG. 71C
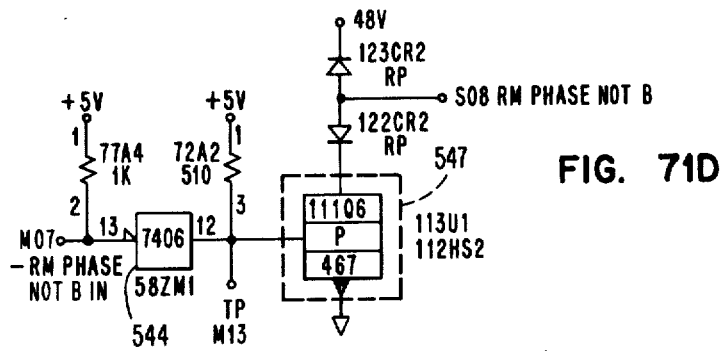
FIG. 71D

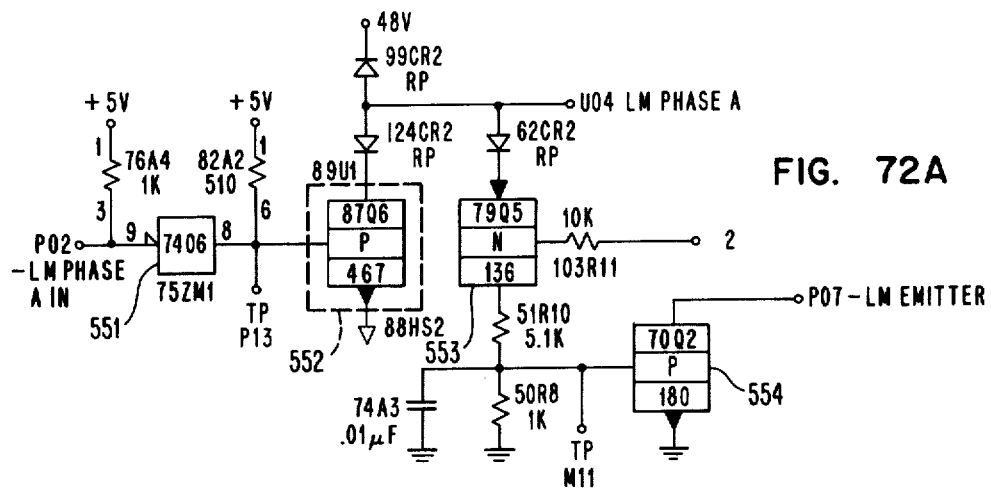
FIG. 72A
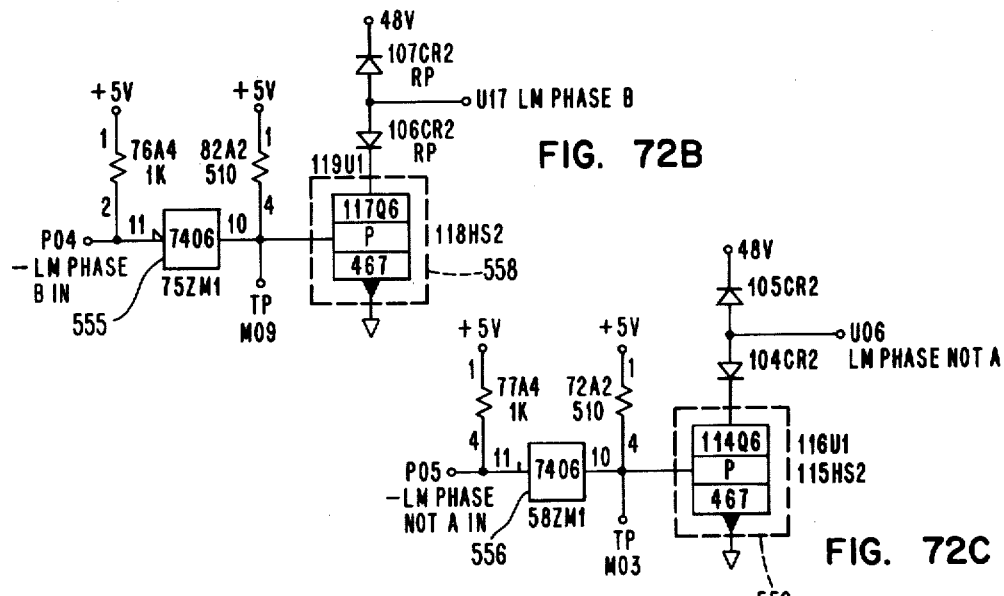
FIG. 72B
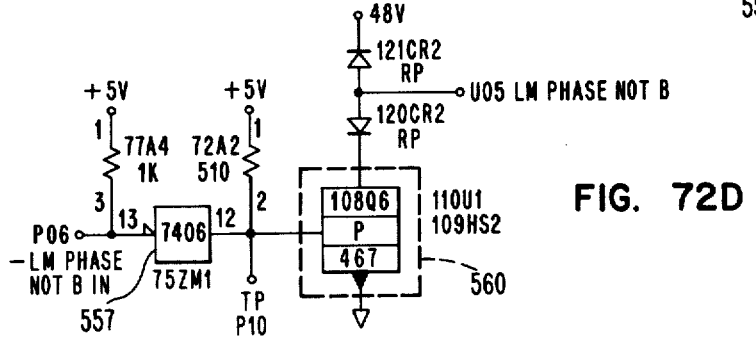
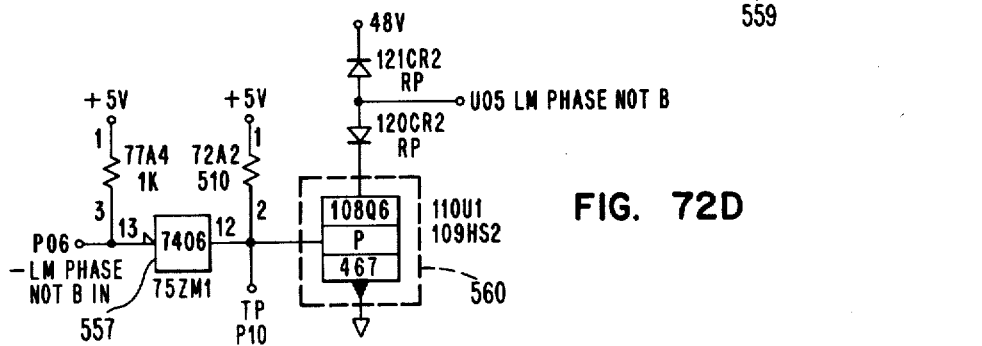
FIG. 72C
FIG. 72D

PRINTER SUBSYSTEM WITH DUAL COOPERATING MICROPROCESSORS

BACKGROUND OF THE INVENTION

This invention relates to printer subsystems and more particularly to printer control units for such subsystems. Printer subsystems normally are interconnected with a host system, are responsive to command signals from such host system to perform various printing functions and are further responsive to data signals to print characters of information on a form. It has been customary in such systems to rely heavily on the host system for operational and printing control of the printer unit. In some cases, only a very limited amount of control capability is incorporated in the printer subsystem itself. In those subsystems where local control is provided in the form of control logic or local processor control, such control logic or processor control ordinarily handles tasks in the printer subsystem in a sequential fashion resulting in somewhat slower response times and in some cases overloading of the control facility.

SUMMARY OF THE INVENTION

In accordance with the present invention, a printer subsystem is provided with at least two microprocessors, each being operable relatively independently of the other, being able to communicate with the other as the need arises and each having its assigned functions. Both of the microprocessors can operate concurrently to accomplish its assigned functions.

In the preferred embodiment described herein, one of the microprocessors serves in a communications function to receive data and command information from a host system and to provide status information back to the host system, while the other microprocessor serves more directly to control the printer functions such as forms feed, ribbon feed, print drive, and the like. Each of the microprocessors has some diagnostic capability in its assigned area of functional responsibility. The dual microprocessor control system herein is described in conjunction with a high speed wire matrix printer that is provided with print heads in which print wires are located in a slanted wire image configuration in relation to the print line. However, principles set forth herein are applicable to wire matrix printers, other print head structures and printers of a non-matrix character, as well.

CROSS-REFERENCE TO RELATED PATENT APPLICATIONS

The present patent application is one of a group of copending patent applications which concern the same overall printer subsystem configuration but which individually claim different inventive concepts embodied is such overall printer subsystem configuration. These related patent applications were filed on the same date, namely, Oct. 19, 1979, are specifically incorporated by reference herein, and are more particularly described as follows:

(1) Application Ser. No. 086,494 entitled "Partial Line Turnaround for Printers", the inventors being Messrs. Gregory N. Baker et al;

(2) Application Ser. No. 086,384 entitled "Font Selection and Compression for Printer Subsystem", the inventor being Mr. Lee T. Zimmerman;

(3) Application Ser. No. 086,490, now abandoned, entitled "Automatic Print Inhibit in Margins for Printer Subsystem", the inventors being Messrs. Willard B. Greene et at;

(4) Application Ser. No. 086,491 now U.S. Pat. No. 4,304,497 issued Dec. 8, 1981 and entitled "Detection of Multiple Emitter Changes in A Printer Subsystem", the inventors being Messrs. Barry R. Cavill et al;

(5) Application Ser. No. 086,492, now U.S. Pat. No. 4,279,199 issued July 21, 1981, and entitled "Print Head Image Generator for Printer Subsystem", the inventors being Messrs. Abelardo D. Blanco et al;

(6) Application Ser. No. 086,568, now U.S. Pat. No. 4,285,604 issued Aug. 25, 1981, and entitled "Ribbon Shield for Printer", the inventor being Mr. Donald K. Rex;

(7) Application Ser. No. 086,483, now U.S. Pat. No. 4,278,020 issued July 14, 1981, and entitled "Print Wire Actuator Block Assembly for Printers", the inventor being Mr. Albert W. Oaten;

(8) Application Ser. No. 086,567, now U.S. Pat. No. 4,313,683 issued Feb. 2, 1982 and entitled "Microcomputer Control of Ribbon Drive for Printers", the inventors being Messrs. Earl T. Brown et al;

(9) Application Ser. No. 086,383, now U.S. Pat. No. 4,290,138 issued Sept. 15, 1981 and entitled "Wire Fire Mapping for Printers", the inventors being Messrs. Gary T. Bare et al; and

(10) Application Ser. No. 086,493, now U.S. Pat. No. 4,284,001 issued Aug. 18, 1981 and entitled "Head Image Generator for A Matrix Printer", the inventor being Mr. Leo K. Leontiades.

The following patent applications are of interest in connection with the present application:

(1) Application Ser. No. 068,372, filed Aug. 21, 1979 and entitled "Parallel Storage Access by Multiprocessors," the inventors being Messrs. R. H. Kranz et al; and (2) Application Ser. No. 115,856, filed Jan. 28, 1980, now U.S. Pat. No. 4,273,841 issued June 16, 1981 and entitled "Belt Printer Control Architecture", the inventors being R. D. Bolcavage et al.

These applications are assigned to the same assignee as the present application.

For a better understanding of the present invention, together with other and further advantages and features thereof, reference is made to the description taken in connection with the accompanying drawing, the scope of the invention being pointed out in the appended claims.

BRIEF DESCRIPTION OF THE DRAWING

Referring to the drawing:

FIG. 11 is a view of a ribbon shield having a print aperture positioned in a horizontal plane.

FIG. 12 is a cross-sectional view of the ribbon shield on the line 12—12 in FIG. 11.

FIG. 13 is an overhead view of the printer slightly from the rear of the unit showing the forms feed open.

FIGS. 23–26 illustrate a print wire actuator, a plurality of which are mounted in the block assembly shown in FIG. 14.

FIG. 29 illustrates the arrangement of print wires in groups relative to a left margin in the printer unit.

FIG. 30 illustrates printing of characters at 10 characters per inch and 15 characters per inch.

FIGS. 31 and 32 illustrate the print emitter and its operating scheme.

FIGS. 33A and 33B, when arranged as shown in FIG. 34, show in greater detail the relationship of the print wires to character locations on the forms to be printed.

FIG. 41 illustrates a stream of information between the host system and the printer subsystem.

FIG. 42 illustrates significance of bits in the frames during a receive mode when information is transferred from the controller to the printer subsystem.

FIG. 43 illustrates bit significance for the frames during a transmit mode when information is transferred from the printer subsystem to the controller.

FIG. 44 illustrates the bit configurations for printer addressing.

FIG. 45 shows command and data arrangements in the information stream.

FIG. 46 is a chart illustrating a typical transfer of data to be printed.

FIGS. 47A and 47B illustrate representative operational and formatting commands.

FIGS. 48 and 49 illustrate frame layout for status reports during a Poll operation.

FIG. 50 is a block diagram of various circuit components used in the printer subsystem of FIGS. 1 and 2.

FIGS. 61A–61J represent forms drive circuitry. FIGS. 61A–61C when arranged as shown in FIG. 62 represent a Forms servo amplifier portion of the Forms drive circuitry in the printer electronics. FIGS. 61D–61J, illustrate other portions of the forms drive circuitry. FIG. 61K is a tabulation of voltage levels present in the circuitry of FIGS. 61A–61J.

FIGS. 63A–63J represent print head drive circuitry. FIGS. 63A–63C, when arranged as shown in FIG. 64, show a portion of the circuitry for the Print Head Servo amplifier in the print head drive circuitry in the printer electronics while FIGS. 63D–63J illustrate other portions of the print head drive circuitry.

FIGS. 65A–65C, when arranged as shown in FIG. 66, illustrate Servo Power Driver circuitry in the printer electronics that is used with the Forms drive circuitry of FIGS. 61A–61J and the Head drive circuitry of FIGS. 63A–63J.

FIGS. 67A, 67B, and 68 represent Forms emitter and end-of-forms emitter circuitry provided in the printer electronics.

FIGS. 71A–71D and 72A–72D show various printer electronics circuitry associated with the ribbon drive assembly.

DESCRIPTION OF PRINTER SUBSYSTEM AND PRINTER MECHANISMS

In order to best illustrate the utility of the present invention, it is described in conjunction with a high speed matrix printer, typically capable of printing in a high range of lines per minute on continuous forms. The particular printer subsystem described herein is associated with a host system or processor, responds to command and data signals from the host system to print on the forms and in turn provides status signals to the host system during operations.

The printer itself is an output line printer designed to satisfy a variety of printing requirements in data processing, data collection, data entry, and communications systems. It can be used as a system printer or a remote work station printer. The following printer highlights are of interest:

- Print density of 10 or 15 characters per inch (25.4 mm) selectable by the operator or by the using system program;
- Condensed print mode, 15 characters per inch (25.4 mm) saves paper costs and makes report handling, mailing, reproduction, and storage easier;
- Line spacing of 6, or 8 lines per inch (25.4 mm) or any other line density selectable by the operator or by the using system program;
- Incremental and reverse forms movement selectable by the using system program;
- Sixteen self-contained character sets selectable by the using system program with a base language selected by hardware jumpers.
- Special graphics ability (special characters, graphs, plotting, etc.) selectable by the using system program;
- Matrix printing technology;
- Built-in diagnostics for problem determination by the operator;
- Microprocessor control unit;
- Maximum print line width—330.2 mm (13.2 in);
- Maximum print positions for 10 characters per inch (25.4 mm)—132;
- Maximum print positions for 15 characters per inch (25.4 mm)—198;
- Adjustable forms width—76.2 to 450 mm (3.0 to 17.7 in);
- Maximum forms length—76.2 to 317.5 mm (3.0 to 12.5 in).

Figure 1:
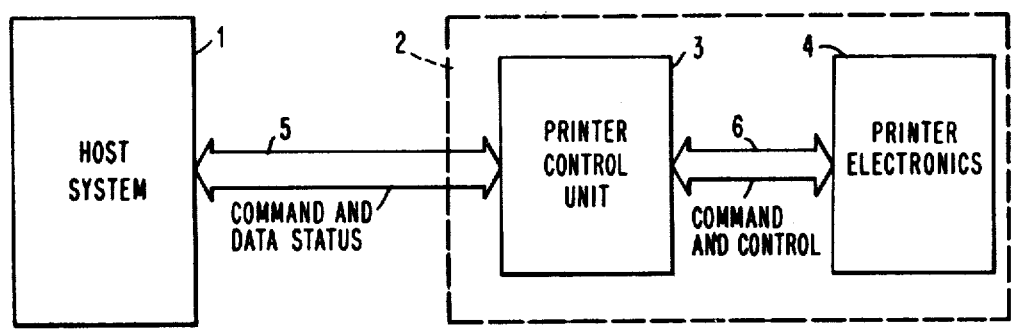
FIG. 1 is a simplified system diagram for the printer subsystem.

FIG. 1 illustrates a representative system configuration including a host system 1 and the printer subsystem 2 which includes a printer control unit 3 and printer electronics 4. Command and data signals are provided by the host system 1 by way of interface 5, and command and control signals are provided from printer control unit 3 to the printer electronics 4 by way of bus 6. Status signals are supplied by printer control unit 3 to host system 1 by way of interface 5. Typically, the host system 1 generates information including commands and data and monitors status. Printer control unit 3 receives the commands and data, decodes the commands, checks for errors and generates status information, controls printing and spacing, and contains printer diagnostics. Printer electronics 4 executes decoded control unit commands, monitors all printer operations, activates print wires, drives motors, senses printer emitters, and controls operator panel lights and switching circuitry. It controls the tractor/platen mechanism, the ribbon drive, the print head (i.e., actuator group) carrier 31, the operator panel 26, and the printer sensors.

The elements of the system, such as the printer control unit 3 and printer electronics 4, incorporate one or more microprocessors or microcomputers to analyze commands and data and to control operations.

Figure 2:
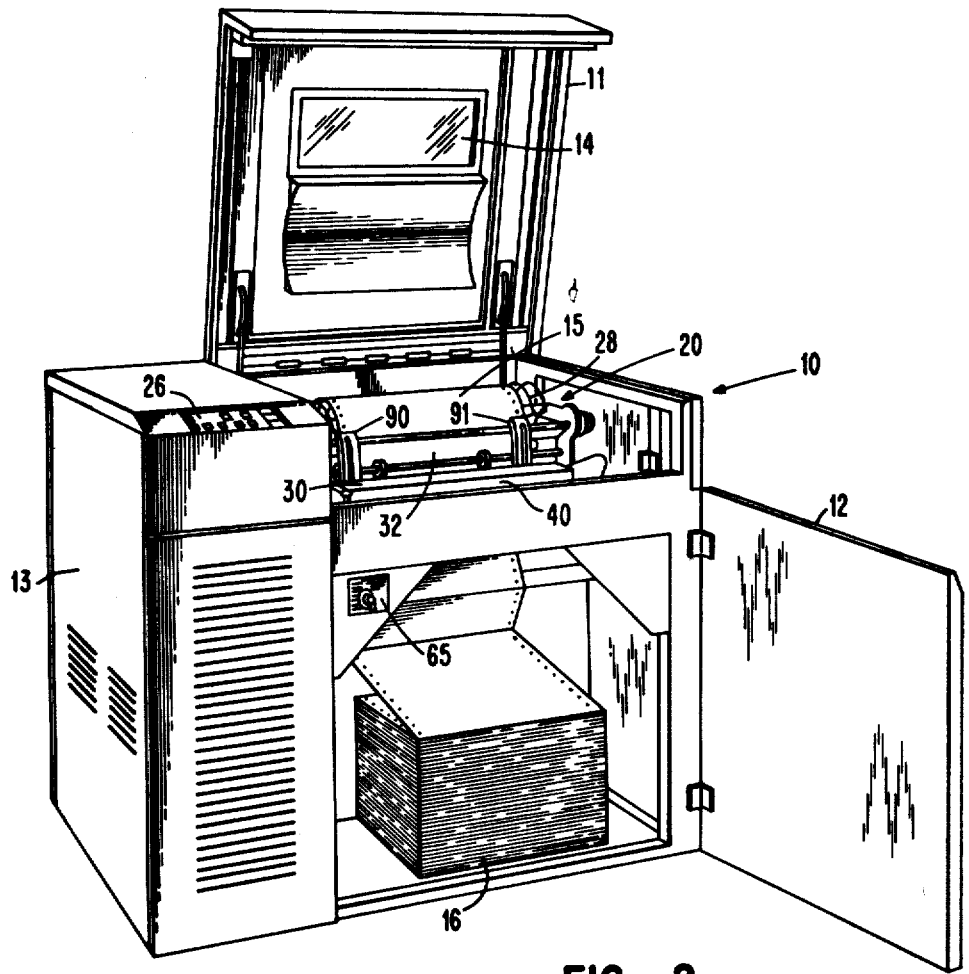
FIG. 2 illustrates the printer console and a number of printer components as well as forms feeding.
Figure 3:
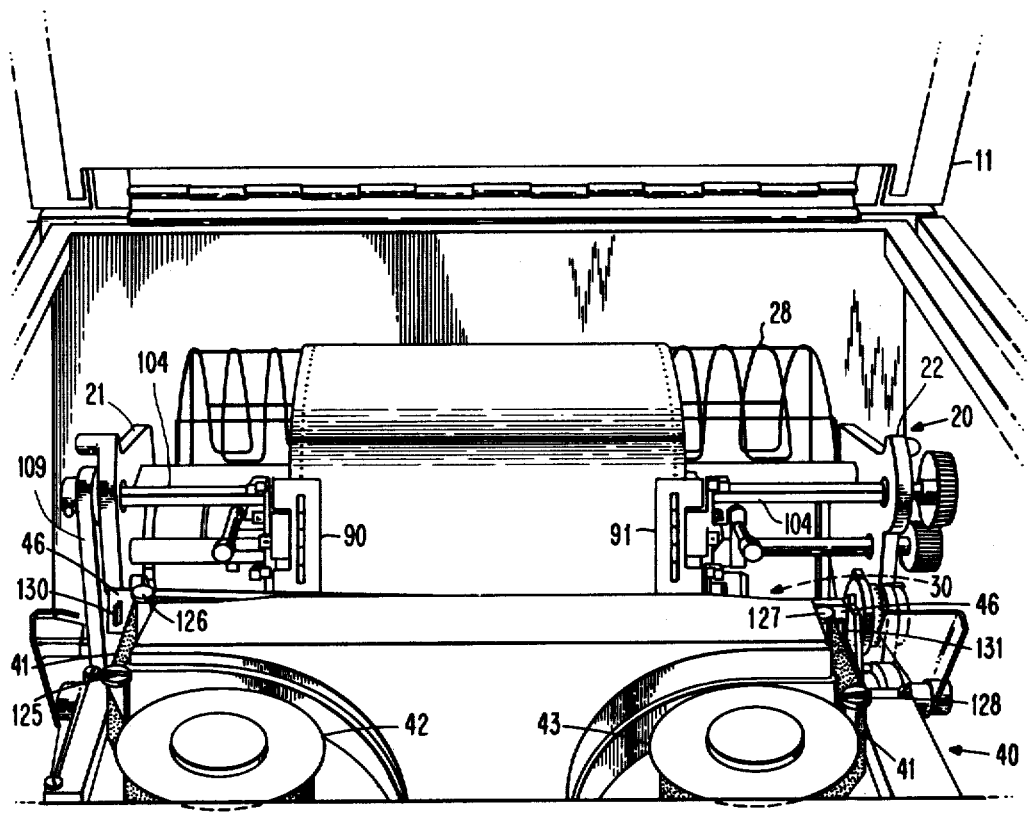
FIG. 3 is a frontal view of the printer unit in the printer console of FIG. 2.

FIGS. 2 and 3 illustrate various components of the printer all of which are housed in the console 10. Various access panels or covers such as those designated 11, 12, and 13 are provided. Top cover 11 has a window 14 that enables an operator to observe forms movement during operation of the printer and when the cover 11 is closed. Forms (documents) 15 are provided from a stack 16 and can be fed in one embodiment upwardly or downwardly as viewed in FIGS. 2 and 3 by means of a forms feed assembly 20 which includes one or more sets of forms tractors such as the upper set comprising tractors 90 and 91. A forms guide 28 guides the forms 15 after printing to a takeup stack, not shown but positioned below the printing mechanism and to the rear of the printer console 10. The printer subsystem 2 incorporates a print assembly 30 that is positioned generally in a horizontal relationship with respect to forms 15 at a print station 32. Print assembly 30 is more clearly visible in other views. This is also true of the printer ribbon drive assembly 40 which is located in closer proximity to the front of the printer. Printer control unit 3 and its associated microprocessors are generally located behind the side cover 13.

A ribbon 41 is provided on one of the spools 42 or 43, which are disposable. Each box of ribbons would preferably contain a disposable ribbon shield 46 that fits between print assembly 30 and forms 15 to keep ribbon 41 in proper alignment and to minimize ink smudging on forms 15. Two motors 49 and 50 shown more clearly in FIG. 8 drive ribbon 41 back and forth between spools 42 and 43. The printer control unit 3 detects ribbon jams and end of ribbon (EOR) conditions. A ribbon jam turns on an error indicator (display 59 shows "80", FIG. 4) and stops printing. An EOR condition reverses the ribbon drive direction.

The printer includes an operator panel 26 (shown in greater detail in FIG. 4) that consists of several operator control keys or pushbuttons 51–55 and 60, two indicator lights 56, 57, a power on/off switch 58, and an operator panel display 59. By using various combinations of the keys 51–54 and 60 in conjunction with the shift key 55 the operator can: start or stop printing and view the last line printed, set print density, position the forms 15 up or down one page or one line at a time, move the forms 15 incrementally up or down for fine adjustment, and start or stop the diagnostic tests when selected by a mode switch 65, FIG. 5, to be described.

The operator panel 26 notifies the operator that: the printer is ready to print data from the using system (57), the printer requires attention (56), the current print density setting (60), errors, if any, have been detected, and the results of the diagnostic tests (59).

Figure 5:
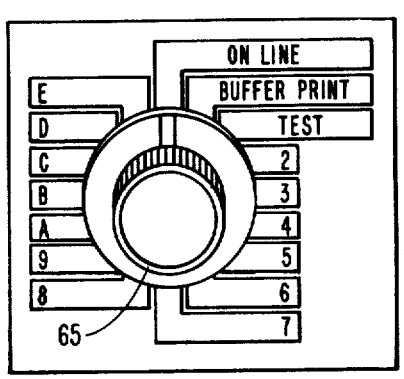
FIG. 5 shows a mode switch for control of on-line, off-line conditions.

A 16-position mode switch 65 is located behind the front door 12 and is shown in greater detail in FIG. 5. The on-line positions permit printing to be controlled by the using system. All other positions are off-line and do not allow printing to be initiated from the using system.

The first three switch positions are used by the operator to select these modes:

On-line. The normal operating position. With the switch 65 in this position, the printer accepts commands from the using system. The operator panel display 59 indicates any detected error conditions.

Buffer Print. An additional on-line position which prints the EBCDIC values (hexadecimal codes) sent from the host system 1 and the associated character images. No control characters are interpreted. This feature allows the user to view the data stream sent to the printer.

Test. For off-line checkout and problem determination. In test mode, when Start key 53 is pressed, the attention indicator (56) stays on and Ready indicator (57) is turned on until the diagnostic tests that are stored in the printer control unit 3 are finished or the Stop key 52 is pressed. If an error is detected, the printer stops and displays an error code in the operator panel display 59.

The remaining thirteen (13) positions of the mode switch 65 designated "2-9" and "A-E" are used by service personnel to select a variety of diagnostic tests to aid in off-line problem determination and confirmation of service requirements.

Figure 6:
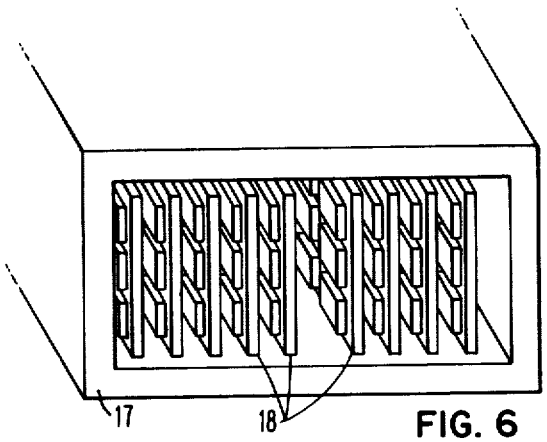
FIG. 6 shows a gate assembly with printed circuit cards.

FIG. 6 illustrates a gate assembly 17 located behind side cover 13, FIG. 2, the gate assembly 17 including modular printed circuit cards such as cards 18 that contain much of the circuit elements for printer control unit 3 and printer electronics 4, FIG. 1.

Figure 7:
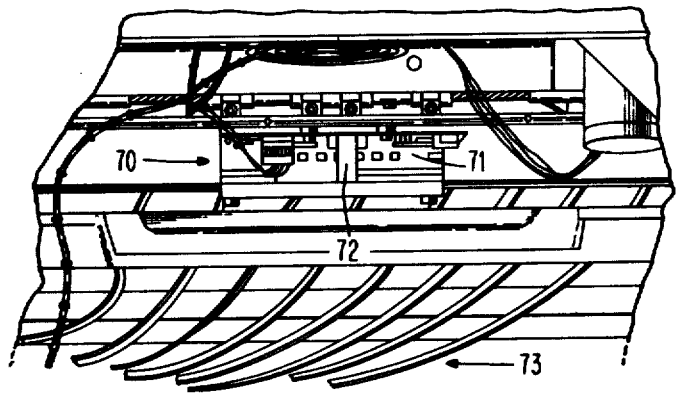
FIG. 7 is a frontal view of the printer console of FIG. 2 with the cover open showing a print emitter.

FIG. 7 is a frontal view of a print emitter assembly 70 that includes an emitter glass 71 and an optical sensor assembly 72. Glass 71 is vertically positioned with respect to sensor assembly 72 and is mechanically attached to print assembly 30 so that as the print heads 34, print actuators 35, and print wires 33 move back and forth left to right and conversely as viewed in FIG. 7, glass 71 also moves in the same manner with respect to sensor assembly 72 to indicate the horizontal position of the print wires 33. Cabling 73 supplies signals to the print actuators 35 which are described in detail below.

OVERVIEW OF PRINTER MECHANISMS

Figure 8:
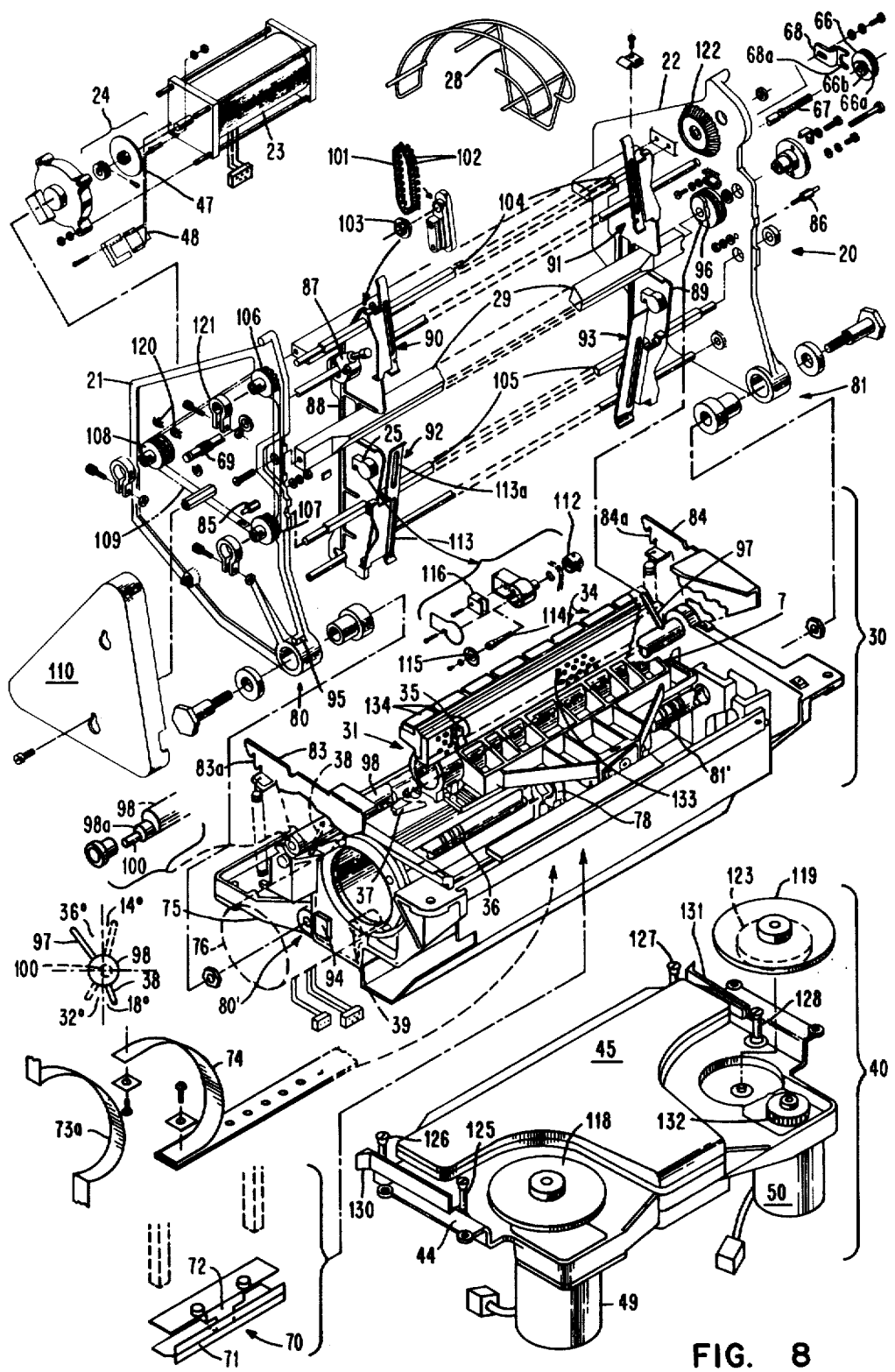
FIG. 8 is an exploded view of various printer assemblies including the forms feed assembly, the print assembly and the ribbon drive assembly.
Figure 9:
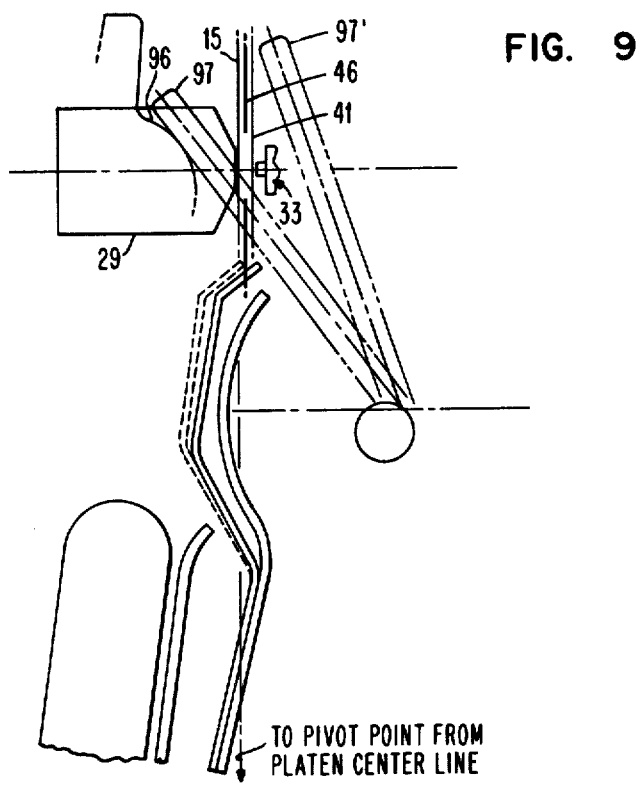
FIG. 9 is a cross-sectional view at the print line of the printer of FIGS. 2, 3, and 8.
Figure 10:
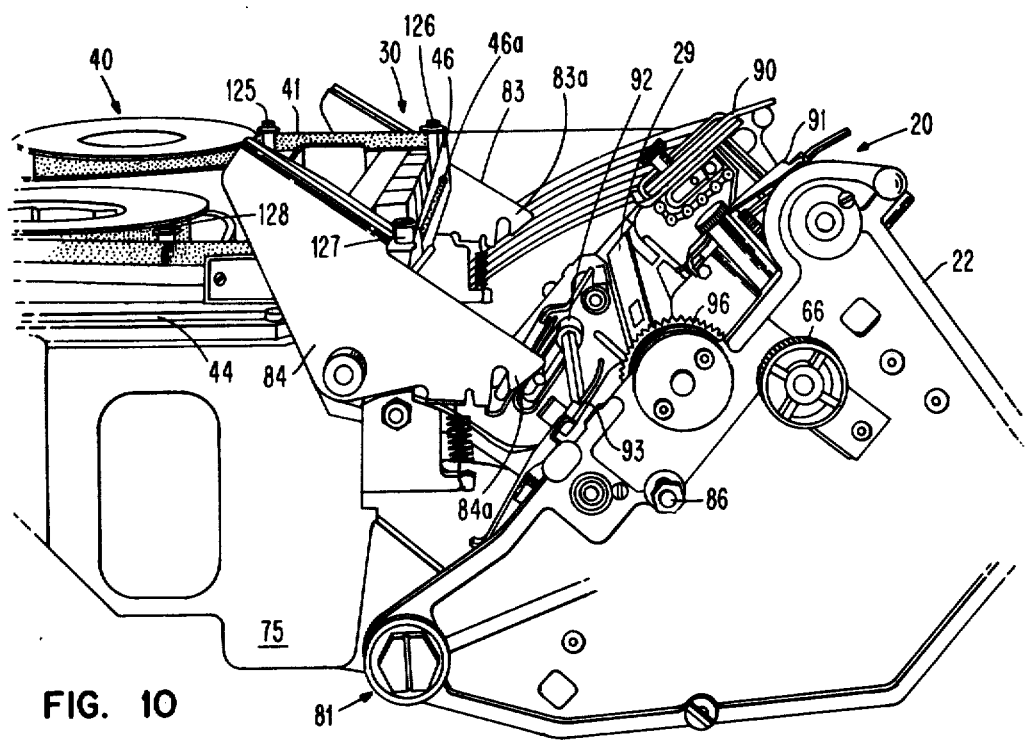
FIG. 10 is a right side elevation of various printer assemblies shown in FIG. 8.

FIGS. 8, 9 and 10, among others, show the details of construction of the forms feed assembly 20, the print assembly 30, the ribbon drive assembly 40, and various associated emitters. A general overview of these assemblies is first presented.

As best seen in FIGS. 8 and 10, forms feed assembly 20 has end plates (side castings) 21 and 22 which support the various forms feed mechanisms including a drive motor 23 to drive tractors 90-93, the motor 23 having a forms feed emitter assembly 24. The forms feed assembly 20 has a separate end of forms and jam detector emitter 25. Assembly 20 also includes a platen 29 located behind the forms 15 and against which the print wires 33 are actuated during printing. See FIG. 9.

The print assembly 30 includes a base casting 75 supporting various mechanisms including print motor 76, shown in phantom in FIG. 8 in order that other elements may be seen more easily, and connected to drive a print head carrier 31 with actuator block assembly 7 in a reciprocal fashion horizontally to effect printing on an inserted form 15. The print assembly 30 also drives the print emitter assembly 70 having emitter glass 71 and optical sensor assembly 72.

The ribbon drive assembly 40 includes a support casting 44, a cover 45, and drive motors 49 and 50.

FORMS FEED ASSEMBLY

In order to load paper in the printer the forms feed assembly 20 pivots away from the base casting 75 at pivot points 80 (80') and 81 (81'), the latter pivot point being best seen in FIG. 10, to allow access to thread the forms 15 into position. Latches 83 and 84 are raised by the operator so that extremities 83a and 84a disengage eccentric pins 85 and 86 on the forms feed assembly 20. The forms feed assembly 20 then pivots away from the operator as viewed in FIGS. 3 and 8 and to the right as viewed in FIG. 10. This allows access to tractors 90-93 so that the operator may load paper. The forms feed assembly 20 is then reclosed and relatched by latches 83 and 84 for normal machine operation. During the time that the forms feed assembly 20 is pivoted back for service, a switch 94 prevents machine operation. Switch 94 is actuated by a tang 95 on forms feed assembly 20 when it is closed.

Referring to FIG. 8, the forms feed assembly 20 includes means for adjusting for forms thickness. As mentioned, the entire forms feed assembly 20 pivots back from the rest of the printer about pivot points 80 and 81. In the closed position the forms feed assembly 20 is in such a position that a spiral cam and knob assembly 96 engages a pin 97 on the main carrier shaft 98 of the print assembly 30. Pin 97 is movable, for example, to position 97' as illustrated in FIG. 9. Adjustment of the spiral cam and knob assembly 96 is such that it rotates the main carrier shaft 98. Assembly 96 is detented into a position selected by the operator. Associated with shaft 98 are eccentrics such as portion 98a on the left end of shaft 98 with tenon 100 onto which latch 83 is mounted. Rotation of shaft 98 thus moves latches 83 and 84 which changes the distance between assemblies 20 and 30 and thus the distance between the ends of print wires 33 and platen 29. This adjustment enables the printer subsystem 2 to accommodate forms 15 of various thicknesses. The printer can handle forms 15 from one part to six parts thickness.

The paper feeding is accomplished by the four sets of tractors 90-93, two above the print line and two below the print line. The individual tractors 90-93 include drive chains to which pins are attached at the proper distance to engage the holes in the form 15. As an example, tractor 90 has drive chain 101 with pins 102. Chain 101 is driven by a sprocket 103 attached to a shaft 104 which also drives the sprocket and chains for tractor 91. Tractors 92 and 93 are driven from shaft 105. Because the tractors 90-93 are above and below the print line, the printer is able to move the paper in either direction. The normal direction of forms drive is upwardly in FIGS. 3 and 8. However, it is possible to move the paper downwardly, as well.

Rotation of shafts 104 and 105 and forms feeding is accomplished by appropriate drive of motor 23 in the proper direction which in turn drives pulleys 106 and 107 (to which shafts 104 and 105 are connected) from motor pulley 108 by means of drive-timing belt 109. Cover 110 covers belt 109 and pulleys 106-108 during rotation. The forms feed emitter assembly 24 includes an emitter wheel 47 with marks to indicate rotation and a light emitting diode assembly 48 that serve to indicate extent of rotation of motor 23 in either direction and as a consequence, the extent of movement of the forms 15 as they are driven by motor 23.

The capability of the printer to feed paper in both directions offers some advantages. For example, in order to improve print visibility at the time the Stop pushbutton 52 (on operator panel 26) is depressed by the operator, the paper may be moved up one or two inches above where it normally resides so that it can be easily read and can be easily adjusted for registration. When the Start pushbutton 53 (on operator panel 26) is depressed, the paper is returned to its normal printing position back out of view of the operator. The printer may also be used in those applications where plotting is a requirement. In this case a plot may be generated by calculating one point at a time and moving the paper up and down much like a plotter rather than calculating the entire curve and printing it out from top to bottom in a raster mode.

End of forms and jam detection is accomplished by assembly 25 having a sprocket 112 just above the lower left tractor 92. The teeth in sprocket 112 protrude through a slot 113a in the flip cover 113. Sprocket 112 is not driven by any mechanism but simply is supported by assembly 25. Sprocket 112 engages the feed holes in the paper as it is pulled past by the tractor assemblies. On the other end of the shaft 114 from sprocket 112 is a small optical emitter disc 115. The marks in disc 115 are sensed by an LED phototransistor assembly 116 and supplied to electronics 4 of the subsystem 2. Electronics 4 verifies that marks have passed the phototransistor assembly 116 at some preselected frequency when the paper is being fed. If the mark is not sensed during that time, the machine is shut down as either the end of forms has occurred or a paper jam has occurred.

The castings 88 and 89 supporting the tractors 90-93 are adjustable left or right in a coarse adjustment in order to adjust for the paper size used in a particular application. After they are properly positioned they are locked in place on shaft 67 by locking screws such as locking screw assembly 87.

All tractors 90-93 are driven by the two shafts 104 and 105 from motor 23 as previously described. Motor 23 adjusts in the side casting 21 in slots 120 in order to provide the correct tension for belt 109.

Besides the coarse adjustment, there is also a fine adjustment which is used to finally position in very small increments laterally the location of the printing on forms 15. This is done by a threaded knob 66 which engages shaft 67 to which both tractor castings 88 and 89 clamp. Shaft 67 floats between side castings 21 and 22 laterally. The threads in knob 66 engage threads on the right end of shaft 67. Knob 66 is held in an axially fixed position by a fork 68, the portion 68a engaging notch 66a formed by the flanged portion 66b of knob 66. Therefore knob 66 stays stationary and the threads driving through the shaft 67 force it laterally left or right, depending upon the direction in which knob 66 is rotated. Shaft 67 is always biased in one direction to take out play by a spring 69 on the left end of shaft 67. As the forms 15 leave the top of the tractors 90, 91, they are guided up and toward the back of the machine and down by the wire guide 28.

In order to insure that the distance between the pins 102 in the upper tractors 90, 91 is in correct relationship to the pins 102 in the lower tractors 92, 93 an adjustment is performed. This adjustment is made by inserting a gauge or piece of paper, not shown, in the tractor assembly which locates the bottom pins 102 in the correct relationship to the top pins 102. This is done by loosening a clamp 121 on the end of shaft 104. Once this position is obtained, then clamp 121 is tightened and in effect phases the top set of tractors 90, 91 to the bottom set 92, 93 so that holes in the forms 15 will engage both sets of tractors 90, 91 and 92, 93 correctly. Forms 15 may be moved through the tractor forms feed assembly 20 manually by rotating knob 122. Knob 122 simply engages the top drive shaft 104 of the upper tractor set and through the timing belt 109 (also shown in FIG. 13) provides rotational action to the lower tractor set, as well.

PRINT ASSEMBLY

In FIG. 8, print assembly 30 comprising a carrier 31, actuator block assembly 7 and support 78 accommodates all the print heads 34 with their wire actuators 35 and print wires 33. Also, see FIGS. 13 and 14-26. Actuator block assembly 7 is designed to hold from two up to eight or nine print head groups of eight actuators 35 each. Thus, a printer with eight print head groups, as shown in FIGS. 8 and 13, has sixty-four print wire actuators 35 and sixty-four associated print wires 33.

Print wires 33 project through apertures 148, FIG. 13. Only two actuators 35 are shown positioned in place in FIG. 8. The other sixty-two actuators 35 would be located in apertures 133 only a few of which are depicted. To insure long life of the print wires 33, lubricating assemblies 134 containing oil wick assemblies 142 (See FIG. 14) are positioned in proximity to the print wires. The print wire actuators 35 fire the wires 33 to print dots to form characters. Carrier 31 is engaged with and is shuttled back and forth by a lead screw 36 driven by motor 76. Lead screw 36 is connected to carrier 31 to drive it back and forth. When carrier 31 is located at the extreme left, as viewed in FIGS. 3 and 8 (to the right as viewed in FIG. 13), this is called the "home or ramp position". When carrier 31 is moved to the home position, a cam 37 attached to the carrier 31 engages a pin 38, the pin 38 being attached to the main carrier shaft 98. If the machine has not been printing for some period of time, in the neighborhood of a few seconds, the printer control unit 3 signals the carrier 31 to move all the way to the left, in which case cam 37 engages pin 38 to rotate the main carrier shaft 98 approximately 15 degrees. The maximum rotation of shaft 98 is about 50° shown for pin 97 as 36°+14°=50° and for pin 38 as 32°+18°=50°. On each end of the shaft 98 are the eccentrically located tenons, such as tenon 100, previously described. Tenons, such as tenon 100, engage the latches 83 and 84 so that the distance between the print assembly 30 and the forms feed assembly 20 is controlled by the latches 83 and 84. As shaft 98 rotates, the eccentrically located tenons, such as tenon 100, associated with latches 83 and 84 separate the forms feed assembly 20 from the print assembly 30.

The purpose of motor 76, of course, is to move the carrier 31 back and forth in order to put the print actuators 35 and print wires 33 in the proper positions to print dots and form characters. Since the motion is back and forth, it requires a lot of energy to get the mass of carrier 31 and actuators 35 stopped and turned around at the end of each print line. A brushless DC motor is used. The commutation to the windings in the motor 76 is done external to the motor 76 through signals sent out of the motor 76 via a Hall effect device emitter 39. In other words, the emitter 39 within the motor 76 sends a signal out telling the printer control unit 3 that it is now time to change from one motor winding to the next. Therefore, there are no rubbing parts or sliding parts within the motor 76, and switching is done externally via electronics 4 based on the signals that the motor sends out from its emitter 39. The motor 76 draws about 20 amperes during turnaround time and, because of the high current it draws and because of the torque constant required from the motor 76, it is built with rare earth magnets of Semarium cobalt which provide double the flux density of other types of magnets.

Semarium cobalt is not just used because of the higher flux density but also because its demagnetization occurrence is much higher and, therefore, more current can be sent through the motor 76 without demagnetizing the internal magnets. During printing, carrier 31 that holds the print actuators 35 goes at a velocity of approximately 25 inches per second. The turnaround cycle at the end of the print line requires 28 milliseconds approximately, resulting in a Gravity or "G" load in the neighborhood of 4 G's. The carrier 31, with all the actuators 35 mounted, weighs about eight and a half pounds.

The current necessary to fire the print actuators 35 is carried to the actuators 35 via the cable assemblies 73, FIGS. 7 and 13, one for each group of eight actuators 35. The cabling, such as cable 73a, FIG. 8, is set in the machine in a semicircular loop so that as carrier 31 reciprocates it allows the cable 73a to roll about a radius and therefore not put excessive stress on the cable wires. This loop in the cable 73a is formed and held in shape by a steel backing strap 74. In this case there is one cable assembly, such as cable 73a, for each group of eight actuators 35 or a maximum of eight cable backing strap groups.

RIBBON DRIVE ASSEMBLY

The ribbon drive assembly 40 for the printer is shown in FIG. 8, but reference is also made to FIGS. 3, 9, and 13. Spools 42 and 43 are shown with spool flanges but may be structured without spool flanges and contain the ribbon 41. Spools 42 and 43 can be seen on either side of the machine near the front, FIG. 3, and are respectively driven by stepper motors 49 and 50. Spools 42 and 43 typically contain 150 yards of standard nylon ribbon 41 that is one and a half inches wide. Gear flanges 118 and 119, FIG. 8, support ribbon spools 42 and 43, respectively. Drive for spool 43, as an example, is from motor 50, pinion gear 132 to a matching gear 123 formed on the underneath side of gear flange 119 then to spool 43. In one direction of feed, the ribbon path is from the left-hand spool 42 past posts 125 and 126, FIGS. 3, 8 and 13, across the front of the ribbon drive assembly 40 between the print heads 34 and forms 15, then past posts 127 and 128 back to the right-hand ribbon spool 43. A ribbon shield 46 to be described in conjunction with FIGS. 11-13 is generally located between posts 126 and 127 and is mounted on the two attachment spring members 130 and 131.

RIBBON SHIELD

FIG. 11 illustrates ribbon shield 46 that is particularly useful in the printer described herein. FIG. 12 is a cross-sectional view along the line 12—12 in FIG. 11. Shield 46 has an elongated aperture 46a extending almost its entire length. The aperture 46a enables the print wires 33 to press against the ribbon 41 in the printer through the shield 46 in order to print on forms 15. Shield 46 has slits 46b and 46c at opposite extremities to permit easy mounting in the printer on spring members 130 and 131 of the ribbon drive assembly 40, FIG. 13.

ASSEMBLY VIEW

FIG. 13 is an assembly view of the printer including forms feed assembly 20, print assembly 30, and ribbon drive assembly 40. Ribbon drive assembly 40 includes the two ribbon spools 42 and 43 which alternatively serve as supply and takeup spools. As mentioned, spools 42 and 43 typically contain 150 yards of standard nylon ribbon 41 that is one and one-half inches wide. If spool 42 is serving as the supply spool, ribbon 41 will be supplied past posts 125 and 126, through the ribbon shield 46 past posts 127 and 128 and thence to the takeup spool 43. Shield 46, FIGS. 11 and 13, and ribbon 41, FIG. 13, are illustrated slightly on the bias relative to horizontal which is their more normal relationship in the printer. The ribbon drive assembly 40 is also positioned on a slight bias relative to horizontal to accommodate the bias of shield 46 and ribbon 41. In this condition aperture 46a assumes a horizontal relationship with respect to the print wires 33 and forms 15. Thus, in FIG. 13, the rightmost end of shield 46 is somewhat elevated in relation to the leftmost end in order that aperture 46a is maintained in a relatively horizontal position with respect to the print actuators 35 in print assembly 30. A few of the groups of print wires 33 are indicated at a breakaway section of shield 46. As previously noted, the print wires 33 are reciprocated back and forth laterally in relation to forms 15, not shown in FIG. 13, in order to effect the printing of characters. The reciprocation is by means of drive mechanisms activated from motor 76. The activating signals for the actuators 35 in print assembly 30 are supplied through cabling indicated at 73.

ACTUATOR BLOCK, GUIDE, AND ACTUATORS

Figure 14:
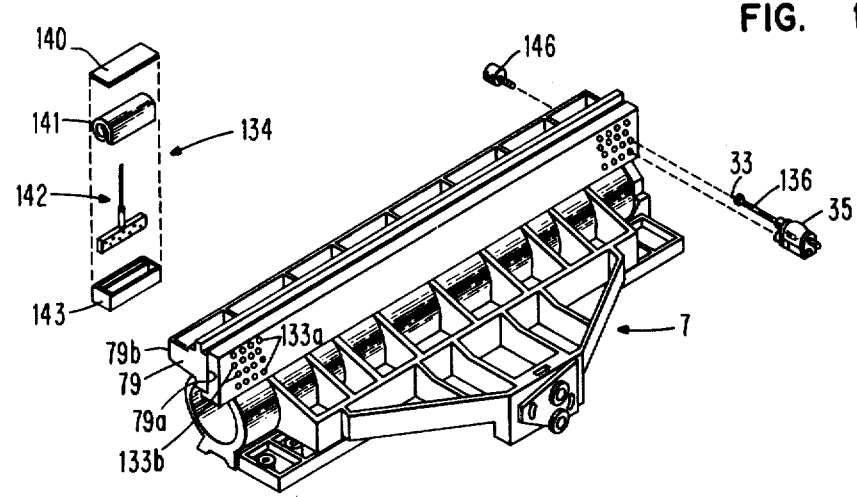
FIG. 14 illustrates a print wire block assembly and associated guide.

Enlarged views of the actuator block assembly 7, guide 79, print wire actuators 35, lubricating assemblies 134, and various related mechanisms are shown in FIGS. 14-23. Referring to FIG. 14, this better illustrates the arrangement of apertures 133 in actuator block assembly 7 which can accommodate eight print heads 34 with eight print wire actuators 35. Apertures 133a are used to mount actuators 35 while apertures 133b allow passage of barrels 136 of actuators 35 through actuator block assembly 7 and guide 79 up to the print line. A typical lubricating assembly 134 comprises a cover 140, felt element 141, wick assembly 142, and housing 143 that contains lubricating oil.

Figure 15:
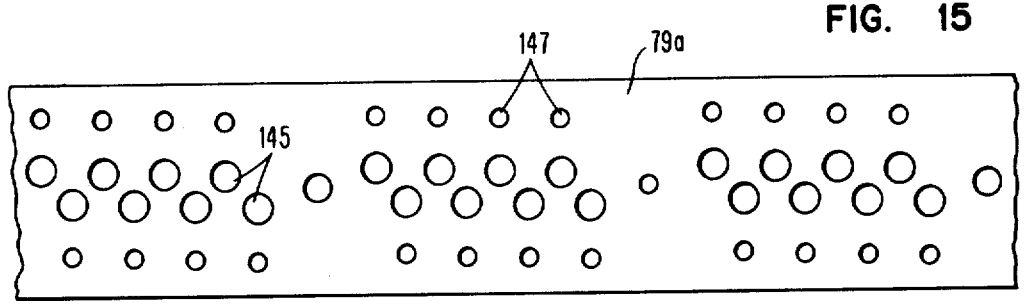
FIGS. 15 and 16 illustrate front and rear faces of the guide shown in FIG. 14.
Figure 16:
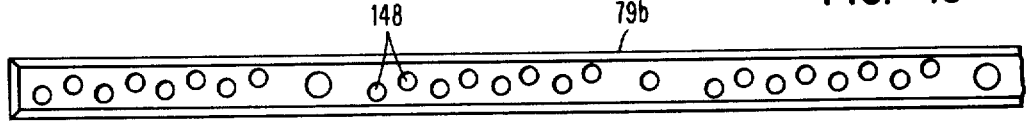

FIG. 15 illustrates a portion of face 79a of guide 79 while FIG. 16 illustrates a portion of face 79b of guide 79. Barrels 136 of actuators 35 pass through apertures 145 on face 79a of guide 79 and are retained by bolts such as bolt 146 passing through apertures 147 from the opposite side of guide 79. Individual actuator barrels 136 and print wires 33 project through apertures 148, FIGS. 13 and 16.

Figure 17:
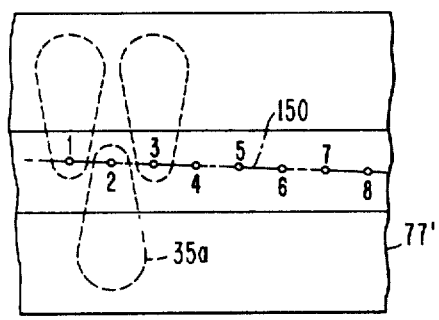
FIGS. 17–19 illustrate an alternative mounting of print wire actuators with an angled face on the block assembly.
Figure 18:
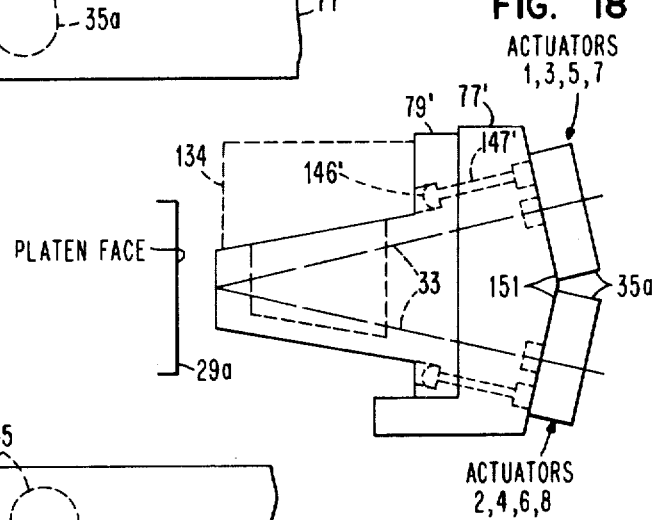
Figure 19:
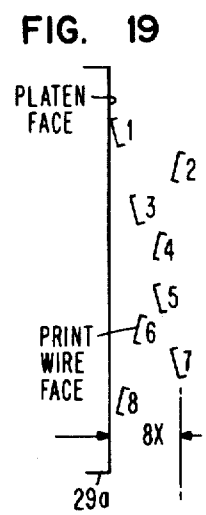
Figure 20:
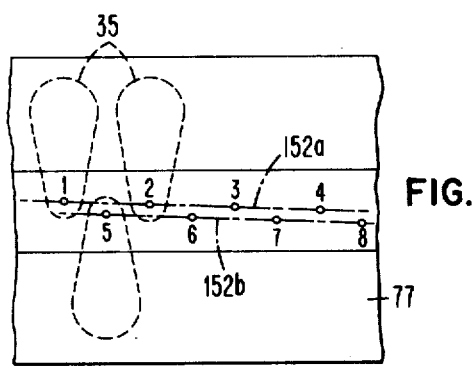
FIGS. 20–22 illustrate mounting of print wire actuators with a flat face on the actuator block assembly.
Figure 21:
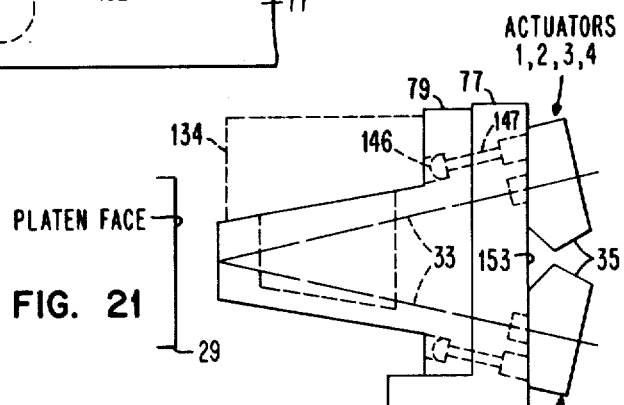
Figure 22:
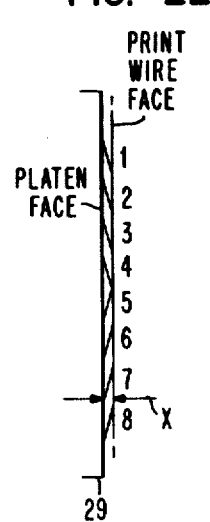

FIGS. 17-22 illustrate several arrangements which permit mounting of a greater multiplicity of actuators 35, (35a) in a given amount of space through actuator block 77 (77') and guide 79 (79'). FIGS. 17-19 illustrate one possible mounting arrangement for the actuators 35a while FIGS. 20-22 illustrate the actual mounting arrangement previously described in conjunction with FIGS. 8, 13, and 14-16.

FIGS. 17-19 represent an alternative mounting arrangement. In this case, actuators 35a, actuator block 77' and guide 79' are retained by bolts, such as bolt 146' passing through aperture 147'. Print actuators 35a and print wires 33 for one print head set of eight (1-8) are arranged on a straight slope 150. Slope 150, combined with actuator block 77' having a double angle configuration at 151, FIG. 18, results in a staggered print wire face-to-platen condition, FIG. 19. This print wire face-to-platen distance, shown as 8X, is critical to both the stroke and flight time of the print wires 33.

The preferred arrangement, FIGS. 20-22, has a number of attributes, including improved functioning, increased coil clearance, and ease of manufacture. In this method, print wires 33 arranged in a set 1-8 are mounted in two offset sloped subsets 152a and 152b forming a sloped serrated pattern. (See also FIGS. 15 and 16.) Subset 152a includes print wires 1-4 of the set while subset 152b includes print wires 5-8. This, combined with a straight surface 153 on actuator block 77 and angled actuators 35, FIG. 21, represent an in-line print wire face-to-platen condition as in FIG. 22. The print wire face-to-platen distance, shown as X, is at a minimum. This permits a higher printing rate and prevents wire breakage. The offset sloped print wire sets gives a greater clearance between wire positions which allows a larger actuator coil to be used.

Use of a straight surface 153 instead of the double angle configuration 151 facilitates manufacturing of the actuator block 77 and thereby reduces cost. However, brackets 155 are still cut at an angle such as shown in FIG. 24. The angular relationships of the print actuators 35a with respect to the platen face in FIG. 18 and print actuators 35 with respect to the platen face in FIG. 21 are somewhat larger than would be encountered in an actual implementation but they are shown this way to make the relationships easier to see. In contrast, an actual angular relationship might be smaller such as the 4°30' angle front face 155a on bracket 155 of actuator 35 in FIG. 24.

FIGS. 23–26 illustrate a preferred form of actuator 35. Actuator 35 operates on principles described and claimed in U.S. patent application Ser. No. 043,183, filed May 29, 1979, having R. W. Kulterman and J. E. Lisinski as inventors and entitled "Springless Print Head Actuator". This application is assigned to the same assignee as the present application. In the Kulterman actuator, a print wire is provided having an armature which is retained in home position by a permanent magnet. When printing of a dot is required, an electromagnet is energized which overcomes the magnetic forces of the permanent magnet and propels the print wire toward the paper.

Figure 23:
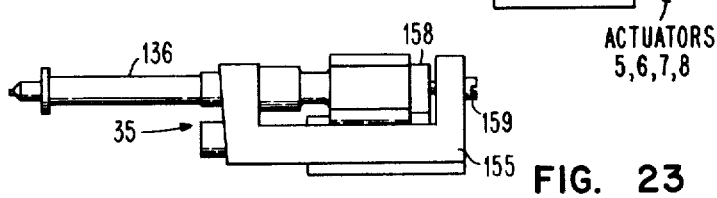

FIG. 23 illustrates one side elevation of the actuator 35, while FIG. 24 illustrates the opposite side elevation. The actuator 35 comprises a number of elements arranged in a generally concentric manner on bracket 155. It is noted that FIG. 24 is somewhat enlarged relative to FIG. 23. Reference is also made to FIGS. 25 and 26 for details of the individual components of the actuator 35. Also, it is noted that some slight structural differences appear between the actuator 35 shown in FIGS. 23–26 and those illustrated in FIGS. 17–22, the actuators 35, 35a in FIGS. 17–22 being more diagrammatically illustrated. The actuator 35 includes a barrel 136 for supporting print wire 33 in proper relationship for printing when mounted in actuator block 77 and guide 79. Attached to the leftmost end of print wire 33 as viewed in FIG. 25 is an armature 156 which is arranged against a stop portion 157a of an adjustment screw 157 by forces exerted from a permanent magnet 158. A lock nut 159, FIG. 23, retains adjustment screw 157 in proper position. Thus, when not active, armature 156 and print wire 33 abut against stop portion 157a. When it is desired to actuate print wire 33, electromagnet 160 is rapidly impulsed from an external source by way of connectors 161. Energization of electromagnet 160 overcomes the magnetic flux forces of permanent magnet 158 moving armature 156 and print wire 33 to the right as viewed in FIG. 25 thus causing the rightmost end of print wire 33 which is in proximity to the forms 15, to print a dot on the forms 15. A bobbin housing 162 is made of metallic substances to provide a shielding effect with respect to the coil of electromagnet 160. It is found that this has been beneficial when numerous print wire actuators 35 are mounted in position on actuator block 77 and guide 79 since it prevents stray impulses from reacting from one actuator 35 to another nearby actuator 35. This has proven to be extremely advantageous when multiple print actuators 35 are provided as in the present printer. A core element 163 provides a forward stop location for armature 156 in readiness for restoration by permanent magnet 158 against stop portion 157a as soon as current is removed from electromagnet 160.

FIG. 26 is an end elevation of housing 162 along the line 26—26 in FIG. 25.

ALTERNATIVE FORMS FEED ASSEMBLY

Figure 27:
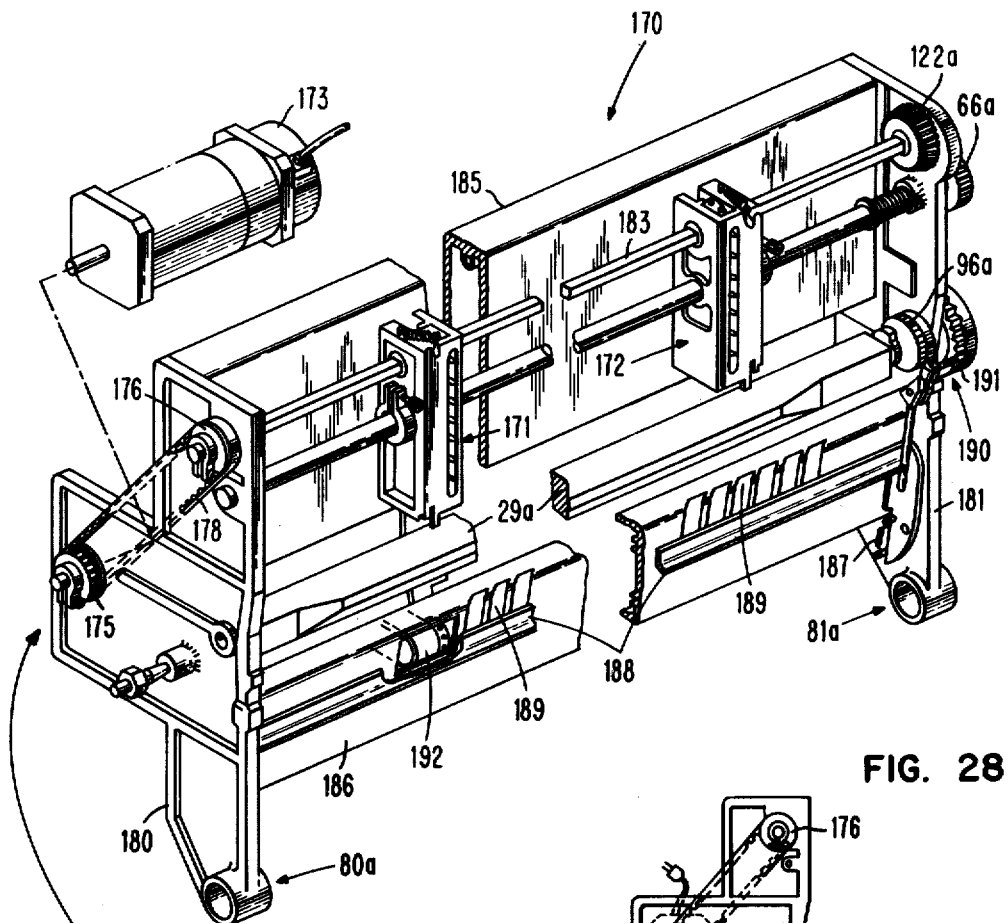
FIGS. 27 and 28 illustrate an alternative forms feed assembly for the printer unit.
Figure 28:
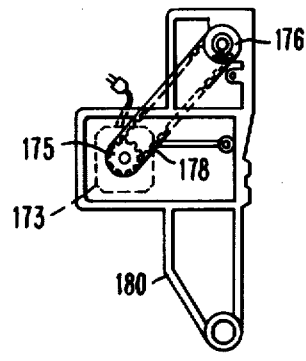

FIGS. 27 and 28 illustrate an alternative single direction forms feed assembly 170 which feeds forms such as forms 15 only in the upward direction as viewed in these figures. In contrast with the forms feed assembly 20 previously described in conjunction with FIG. 8, this forms feed assembly 170 has only a single upper set of tractors 171 and 172. A driving motor 173 provides driving force through gears 175 and 176 by way of timing belt 178. The various elements comprising the forms feed assembly 170 are supported in a left end plate 180 and a right end plate 181. FIG. 28 is a left end elevation of the forms feed assembly 170 illustrating the positional relationships of motor 173, timing belt 178 and other elements. A cover plate 182 covers timing belt 178 during operations. Driving of the pin feeds on the two tractors 171 and 172 is analogous to the driving of the pin feeds for forms feed assembly 20 illustrated in FIG. 8 and previously described. In forms feed assembly 170, the tractor drive includes a drive shaft 183.

Lateral support for the forms feed assembly 170 is provided by an upper support 185 and a lower support 186. The assembly 170 also includes a platen member 29a. Other elements such as knobs 122a, 66a, and 96a are analogous to their counterpart elements 122, 66, and 96 shown in FIG. 8. The forms feed assembly 170 mounts to the printer base casting 75 in FIG. 8 at pivot points 80a and 81a.

In place of the two lower tractors 92 and 93 in FIG. 8, this forms feed assembly 170 includes a pressure drag assembly 188 with compliant fingers 189. These fingers 189 exert physical pressure against the paper when in position against platen 29a and in the immediate vicinity of the printing station which comprises platen 29a.

At the same time that forms feed assembly 170 is opened for insertion of new forms 15, the drag assembly 188 is also opened, but while the forms feed assembly 170 moves toward the rear of the printer, the drag assembly 188 moves toward the front. Spring element 187 enables drag assembly 188 to adjust to allow the forms 15 to slide through when loading the forms 15. One additional cam element 190 cooperates with a follower 191 to provide adjustment of the pressure exerted by the drag assembly 188 on the paper for the purpose of accommodating various thicknesses of forms 15.

The assembly 170 includes an End of Forms sprocket assembly 192 that could also serve to detect paper jams and that works in an analogous fashion to assembly 25 with sprocket 112 shown in FIG. 8.

PRINTING OF CHARACTERS, RELATIONSHIPS OF PRINT WIRES, CHARACTER LOCATIONS AND EMITTERS

Characters that are printed are formed by printing dots on the paper. These dots are printed by wires 33 that are mounted in groups of eight of a carrier 31 that moves back and forth adjacent to the print line. Printing is bidirectional with complete lines of print formed right-to-left and left-to-right. See FIGS. 29, 30, 33A and 33B.

A character is formed in a space that is eight dots high by nine dots wide. As shown in FIG. 30, two of the nine horizontal dot columns (1 and 9) are for spacing between characters. Any one wire 33 can print a dot in four of the seven remaining horizontal dot positions (2 through 8). The printer can print 10 characters per inch or 15 characters per inch.

Most of the characters printed use the top seven wires 33 in the group to print a character in a format (or matrix) that is seven dots high and seven dots wide. The eighth (bottom) wire 33 is used for certain lower case characters, special characters, and underlining.

The number of print wire groups varies according to the printer model, and typically can be 2, 4, 6 or 8 groups. Printing speed increases with each additional wire group.

There are 16 character sets stored in the printer conrol unit 3. Any of these sets may be specified for use by the using system program.

FIG. 31 is a representation of the emitter glass 71 also shown in FIGS. 7 and 8 and associated with the print assembly 30. It has sections called "Ramp", "Home", and "Left Margin". These are coded sections, designated Track A, Track B, and Track C. Track B is sometimes referred to as the "turnaround" track. "Home" is indicated by all three tracks A, B, C, being clear. "Ramp" is when Track A and Track C are clear, but Track B is opaque. "Left Margin" is when only Track C is clear, and Tracks A and B are opaque. Left Margin can be told from Right Margin because Track B is clear on Right Margin whereas Track B is opaque on Left Margin. For convenience, glass 71 is shown in a more normal representation with the left margin areas to the left and the right margin areas to the right. In actuality, the emitter glass 71 is physically located in the machine with the right-hand part in FIG. 31 toward the left and the left-hand part in FIG. 31 toward the right as viewed in FIGS. 7 and 8. This is due to the fact that the associated optical sensor assembly 72 is physically located at the rightmost area of the emitter glass 71 when the print assembly 30 is in home position, and glass 71 actually is moved past the optical sensor assembly 72 from left to right as the print assembly 30 moves from left to right away from home position.

FIG. 32 illustrates the development of emitter pulses from the emitter glass 71 shown in FIG. 31, the signals being termed "real emitters" when actually sensed from Track A. "Option" emitters (sometimes referred to as "false" emitters) are developed electronically in the printer control unit 3. The use of emitter assembly 70 in keeping track of printing location is described. The emitter assembly 70 tells the electronics 4 when the wires 33 are in a proper position to be fired to print the dots in correct locations. It essentially divides the print line into columnar segments, each one of which is available to the electronics 4 to lay down a print dot. Track A, the basic track which controls the printing of dots has spacings of 0.0222 inches. This corresponds to two print columns distance on the emitter assembly 70 in a normal print cycle and for ten characters per inch one optional mark referred to as an "option" is inserted halfway in between each real emitter.

Each emitter track A, B or C actuates one pair of light emitting diode-photo transistor (LED-PTX) sensors. within sensor assembly 72. These sensor pairs are designated 686-687, 688-689, and 690-691 and are described in conjunction with FIG. 69 herein. Track A provides print initiation pulses, Track B provides turnaround information, and Track C indicates if the print heads 34 are in either left or right margin.

If the line to be printed is shorter than the maximum print line length, typically 13.2 inches, then a signal for turnaround (reversal of print motor 76 direction) is given as soon as the last character has been printed. The motor 76 now decelerates until it comes to a stop, and then immediately accelerates in the reverse direction until nominal speed is reached.

Figures 57, 59:
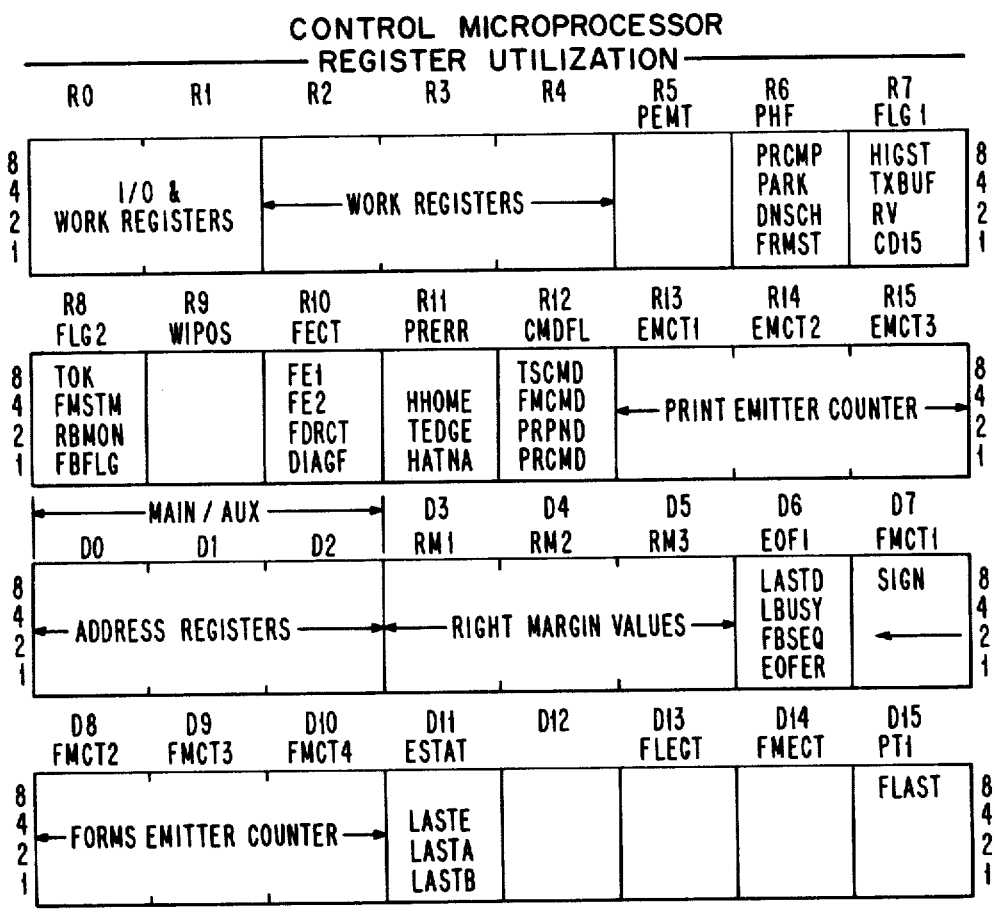
FIG. 59 illustrates layout of various internal registers in the control microprocessor.

To keep track of the print head position, the number of emitter pulses of Track A are counted by utilizing the print emitter counter, FIG. 59. The count derived from Track A keeps increasing regardless of whether the print assembly 30 moves to the right or left. In order to indicate the true position of the print assembly 30, provision is made electronically to convert this count so that the count increases when the print assembly 30 moves in one direction and the count decreases when moving in the opposite direction.

In order to accomplish this, Track B has been added. It is assumed that the print assembly 30 is moving to the right. After the last character has been printed and the signal for turnaround has been given, the print assembly 30 will continue to move to the right and the count will increase. However, as soon as the next transition has been reached on Track B, the count is frozen. The print assembly 30 now comes to a stop and reverses. When it again passes the transition where the count was frozen, the emitter counts will now be subtracted and a true position indication is maintained by the print emitter counter, FIG. 59, for Track A.

The length of the Track B segments are chosen to be longer than the distance it takes the print assembly 30 to come to a stop. The higher the print head speed and the longer the turnaround time, the longer must be the Track B segments. Thus, if the line is shorter than 132 characters at ten characters per inch, the carrier 31 need not travel all the way to the right end of the print line. It may turn around soon after the printing is completed.

Figure 33A:
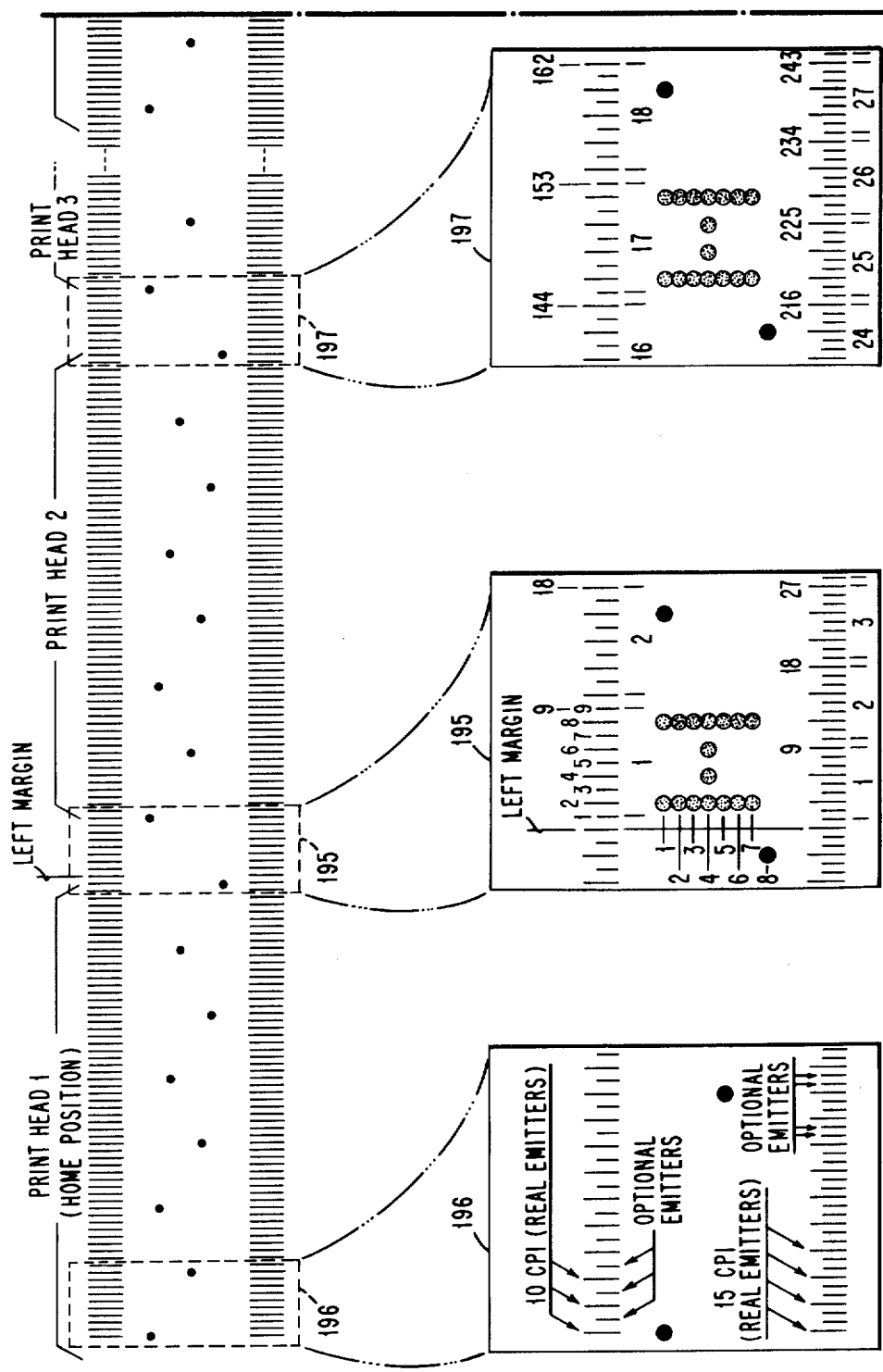

FIGS. 33A and 33B, when arranged as shown in FIG. 34, comprise a diagram showing the physical relationship of the print heads 34 when in the home position relative to character locations on a form 15 to be printed. In addition, the emitter relationships are shown.

In FIG. 33A, print head 1, comprising eight print wires 33, is normally to the left of the nominal left margin when in home position. Print head 2 lies to the right of the left margin when the print assembly 30 is in home position and the other print heads 3-8 up to eight, as an example, are physically located at successively further positions to the right in relation to the form 15. The print wires 33 are arranged in a sloped serrated pattern and are displaced two character positions apart horizontally and one dot location apart vertically. In order to print the character "H" as shown in inset 195, it is necessary that all of the print wires 33 in print head 1 sweep past the "H" character location to effect printing of the individual dots. As each wire 33 passes by and reaches the appropriate position for printing of its assigned dot locations in a vertical direction, it is fired. Thus, formation of characters takes place in a flowing or undulating fashion insofar as the printing of the dots is concerned. That is, an entire vertical column of dots as in the left-hand portion of the character "H" is not formed all at once but is formed in succession as the eight wires 33 in print head 1 sweep past that column. That is true of the printing of all other character columns, as well. As a result of this, each print head 1–8 is required to pass at least far enough so that all of the wires 33 in that print head 34 will be able to print both the first vertical column of dots in the first character required as well as the last column of dots in the last character to be printed in the group of character locations assigned to that print head 1–8.

Accordingly, the first print head 34, during printing movement of carrier 31, prints all of the characters that normally would appear underneath the second print head 34 when the print heads 34 are in their home position. The printing of dots associated with the second print head 34 takes place under the home position for the third print head 34 and so on.

Inset 196 illustrates the relationship of real and optional emitters, sometimes referred to as "false" emitters, for both ten characters per inch (CPI) and fifteen characters per inch (CPI). During the printing of characters at ten characters per inch, real emitters are found as indicated. These are physical real emitters derived from the emitter glass 71 as the print assembly 30 sweeps from left to right or right to left during printing. The same real emitters are used for printing at fifteen characters per inch. However, when printing is at ten characters per inch, one additional (optional) emitter is necessary between each successive pair of real emitters to form the individual characters while, if characters are printed at fifteen characters per inch, two additional (optional) emitters are required between each successive pair of real emitters to handle the printing of dots for those characters.

Inset 197, FIG. 33A, illustrates the character locations associated with the rightmost print wire 33 of print head 2 and the leftmost print wire 33 of print head 3. Print heads 4–7 are not shown since the relations essentially repeat those shown with respect to print heads 1–3. The rightmost wires 33 of print head 8 are shown in Inset 198, FIG. 33B. In addition, Inset 199 shows that for ten characters per inch, 132 characters can be accommodated in a full print line while for fifteen characters per inch, 198 characters are accommodated.

Figure 35:
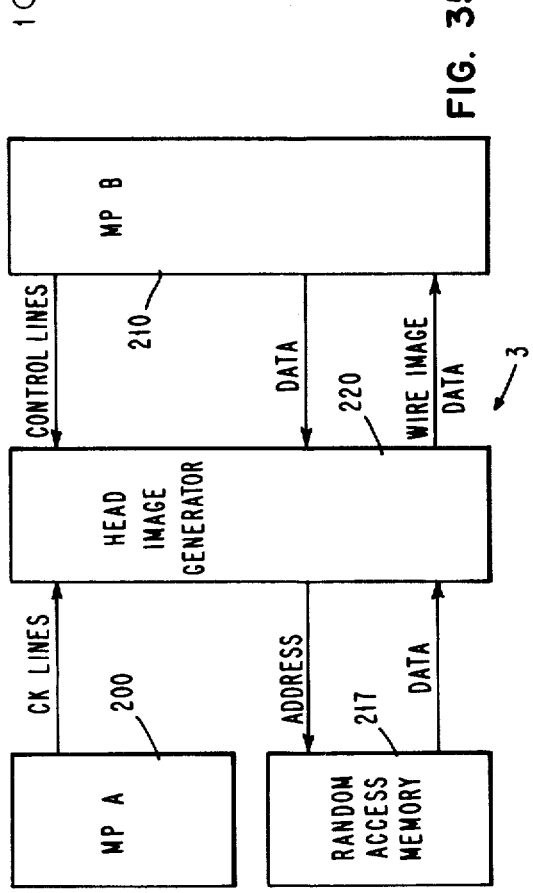
FIG. 35 is a generalized block diagram of the printer control unit shown in FIG. 1.

FIG. 35 is a highly diagrammatic block diagram of the general relationship of various system and control unit components including the two microprocessors 200 and 210 (Also designated MPA and MPB), the Head Image Generator 220 and the random access memory 217 and indicates how the information is transferred that is generated by the Head Image Generator 220 to print dots on the paper by actuation of the actuators 35.

The microprocessors 200 and 210 may be of the typed described in U.S. patent application Ser. No. 918,223 filed June 23, 1978, now U.S. Pat. No. 4,179,738 which issued Dec. 18, 1979 having P. T. Fairchild and J. C. Leininger as inventors and entitled "Programmable Control Latch Mechanism for a Data Processing System".

Figure 37:
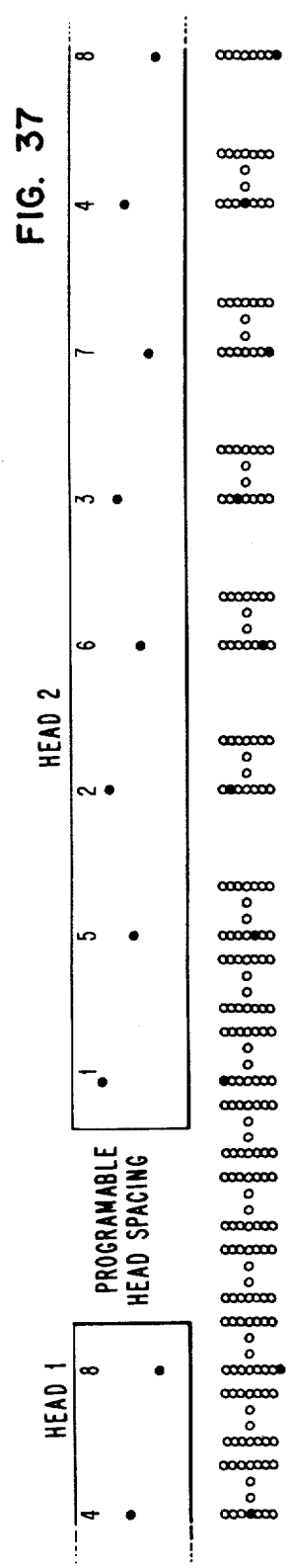

Microprocessor 200 handles communications; microprocessor 210 handles the control of the subsystems. Microprocessor 200, by way of Head Image Generator 220, sets up in memory 217 the count and the text buffer that is to be printed at a selected addressable location. The information is then passed over to microprocessor 210 or the buffer that is to be used. The count is passed to the Head Image Generator 220 and also the address in memory 217 which is the text buffer to be printed. Head Image Generator (HIG) 220, knowing the buffer to be printed, accesses memory 217 and defines the dots for the characters to be printed at each of the successive columns assigned to each print head 34 as print carrier 31 moves during printing. HIG 220 passes the data to the Control microprocessor 210 giving it all the dots to be printed at that particular time. This is represented in FIG. 37 which includes a portion of head 1 and all of head 2. FIG. 37 illustrates printing at ten characters per inch. A string of "H's" is assumed to require printing. The darkened dots of the "H's" represent the wires 33 above them that will actually print that dot. For example, in print head 1, wire 4 prints the fourth dot down in the first column of the leftmost "H". This is the second slice of firing for that particular character with another three actuations being required for wire 4 to complete the horizontal bar portion of the "H". The other seven wires 33 in print head 1 fire at appropriate times to complete their assigned horizontal rows in that character. At head 2, wire 1 is over an "H"; there is no wire 33 over the next "H"; the wire 5 is over the third "H". If printing was at fifteen characters per inch, there would be no wires 33 over two characters between wires 1 and 5 of head 2, rather than just one character as illustrated.

Figure 36:
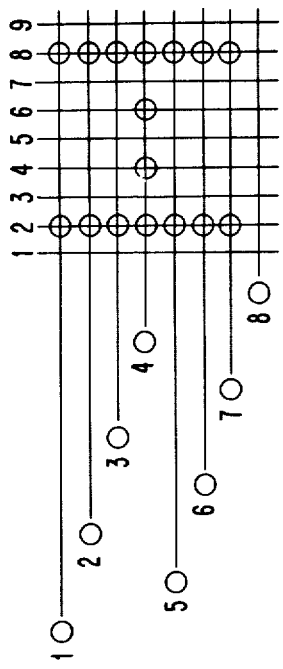
FIGS. 36 and 37 further illustrate the arrangement of dots to form characters and the relationship of the print wires to the various character locations.

The wire layout of "1 5 2 6 3 7 4 8" in FIG. 37 relates to the layout in FIG. 36 where it is shown how an "H" is laid out in relation to the actual wire slices.

PRINTER ATTACHMENT

The printer subsystems may be connected by an interface cable to a controlling device (controller). The printer can be connected to the controlling device itself, or to another printer (or work station unit) with additional cabling.

CONTROLLING DEVICE

Figure 38:
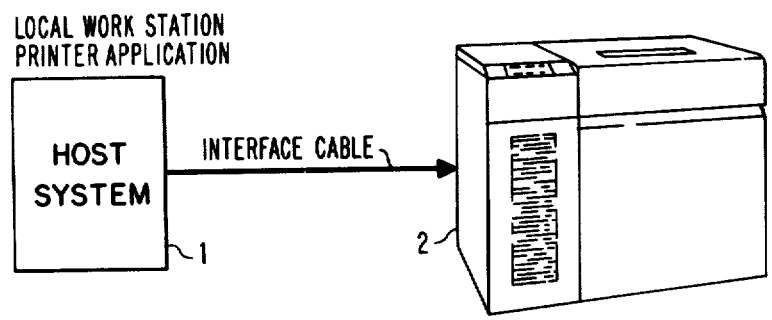
FIGS. 38–40 illustrate various systems in which the printer subsystem may be connected.
Figure 39:
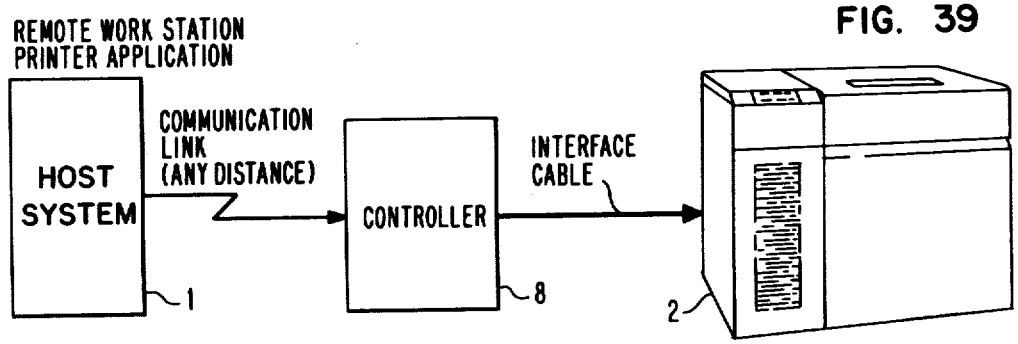

The controlling device to which the printer subsystem 2 is attached may be a host computer system 1, FIG. 38, or a controller 8 at a remote work station, FIG. 39. In either case, all information transfers (exchanges) between the controlling device and the printer control unit 3 are started from the controlling device by a command. Information transfers ordinarily are not initiated by the printer subsystem 2.

In some applications, the printer subsystem 2 may be directly connected to a host computer system 1, as in FIG. 38. In such applications, all commands (operational and formatting) are supplied by the host computer system 1, along with the data to be printed. Responses from the printer are sent directly to the host computer system 1 from the printer control unit 3.

In other applications, FIG. 39, the printer subsystem 2 may be connected to work station controller 8, which in turn is remotely connected to a host computer system 1 by a communications network—such as Systems Network Architecture/Synchronous Data Link Control (SNA/SDLC). In such applications, information (data) to be printed and printer formatting commands are transferred from the computer system 1 to the work station controller 8. The work station controller 8 then generates the operational commands and transfers all this information to the printer subsystem 2. Responses from the printer subsystem 2 are sent to the work station controller 8 then to the computer system 1 by the communications network.

CABLE THROUGH CONNECTOR

Figure 40:
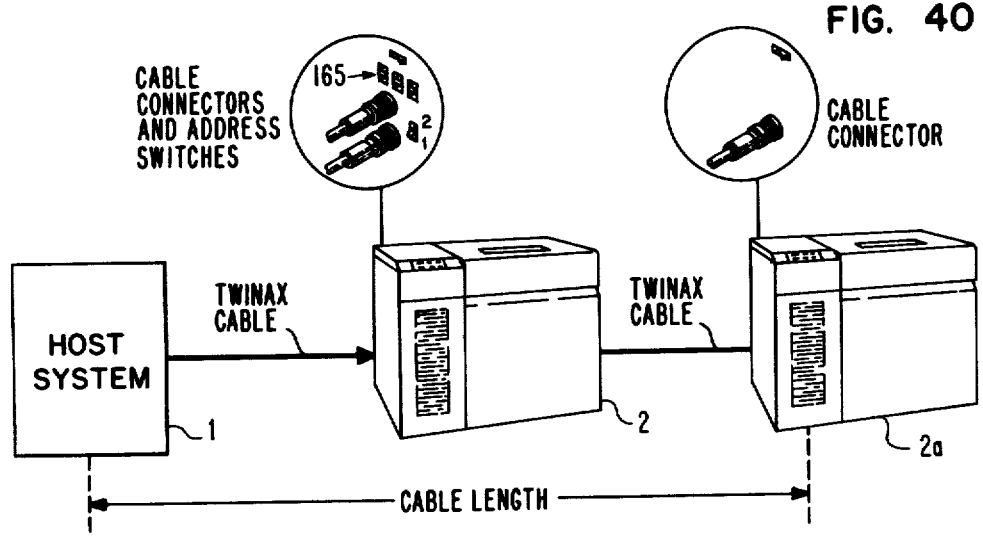

The Cable Through Connector feature, FIG. 40, connects multiple printer subsystems 2, 2a or other work station units on the same interface cable line to the host system 1 or controller (not shown in FIG. 40).

Units with this feature are addressable and have an additional cable connector. The customer assigns a unique address to each unit on the cable connector line and sets the address switches 165, FIGS. 40 and 56A at installation time. The feature is not needed on the last unit on the line. The number of units that can be connected to the same line depends on the capability of the controlling device.

With this feature, the maximum cable length restriction is from the controlling device to the last unit on the line.

AUDIBLE ALARM

An audible alarm can be provided to produce a tone that alerts the operator to conditions that require operator attention.

INTERFACE CABLE

The interface cable may be either coaxial or twinaxial. Representative maximum cable lengths from the controller to the last device on the interface are:

Coaxial cable—610 m (2000 ft.)

Twinaxial cable—1525 m (5000 ft.)

The type of cable selected depends on the requirements of the controlling device to which the printer subsystem is attached.

INFORMATION TRANSFER

Data Stream

All information transferred between the controlling device, such as host system 1, FIG. 41, and the printer subsystem 2 is in the form of a serial "stream" of information bits, FIG. 41. Contained in this stream are:

Bit synchronization patterns

Frame synchronization patterns

Data frames

The bit and frame synchronization (sync) patterns establish timing control between the controlling device and the printer. The data frame is the unit of information used to transfer all commands, data to be printed, and status information.

The data stream can flow in either direction on the interface cable—but only in one direction at a time (half-duplex). The controlling device always initiates the data stream flow for either direction. Only one device on the interface can be communicating with the controlling device at a time.

The data stream flows on the interface for each transfer of single or multiple frames of information. The cable carries no signal between information transfers.

In a typical information transfer from controller to printer, the information stream may be a mixture of operational commands, formatting commands, and data to be printed. Blocks of up to 256 frames may be included in the information stream for a given transfer.

The information stream for any information transfer always begins with the bit-sync and frame-sync patterns, and ends with an end-of-message code in the last frame of the sequence. The end-of-message code causes turnaround on the cable, allowing status information to be transferred in the opposite direction on the cable on the next sequence.

INFORMATION FRAME

The basic unit of information transfer is a 16-bit information frame. The information frame is used for transferring all commands, data, and status information between the controlling device and the printer subsystem 2. A Receive mode from controller 8 to printer subsystem 2 is illustrated in FIG. 42 and a Transmit mode from printer subsystem 2 to controller 8 is illustrated in FIG. 43.

The 16 bits of the information frame are assigned the following significance: Bits 0 through 2, the fill bits, always 000, are for timing control. Bit 3, the parity bit, is set to maintain an even bit count (even parity) in each frame.

Bits, 4, 5, and 6 are the address bits for selecting a specific printer (or other work station unit) attached to the interface. Up to seven units can be addressed by combinations of these bits (000 through 110 are valid addresses). A bit combination of 111 indicates an end-of-message and causes line turnaround.

Bits 7 through 14 are for commands, data or status information. Bit 15, always on, is a synchronization bit.

PRINTER ADDRESSING

Printer addresses are coded in bits 4, 5, and 6 of the information frame, FIG. 44. The address for a single printer on the interface cable is 000. With the Cable Connector feature, addresses can range from 000 through 110. Addresses of printers attached with the Cable Connector feature are set by the customer. A bit combination of 111 is used as an end-of-message indicator in the last frame of a transfer sequence and, therefore, cannot be used as a valid address.

The first frame following any signal turnaround on the cable is a command frame containing a valid printer address (000 through 110) for selecting a specific printer on the interface cable. Each successive frame following a command frame is then checked for the end-of-message code (111).

All response frames from the printer to the controlling device, except the end-of-message frame, contain the address of the selected printer.

PRINTER RESPONSES

All information transfers between the controlling device and the printer are initiated from the controlling device by command frames. The printer, however, does transfer information to the controller 8 on request. These transfers are called printer "responses".

In general, printer response frames are requested by the controller 8 to determine the readiness (or "status") of a printer for accepting data from the controller 8. A variety of printer operational and error conditions are reported to the controller 8 by means of printer response frames. These conditions are described in detail in the section below entitled "Status and Error Information".

PRINTER CONTROL UNIT

The printer control unit (See FIGS. 1 and 35, as examples) connects the printer to the interface cable from the controlling device, controls the flow of information to and from the controlling device and controls all internal printer functions.

Figure 58:
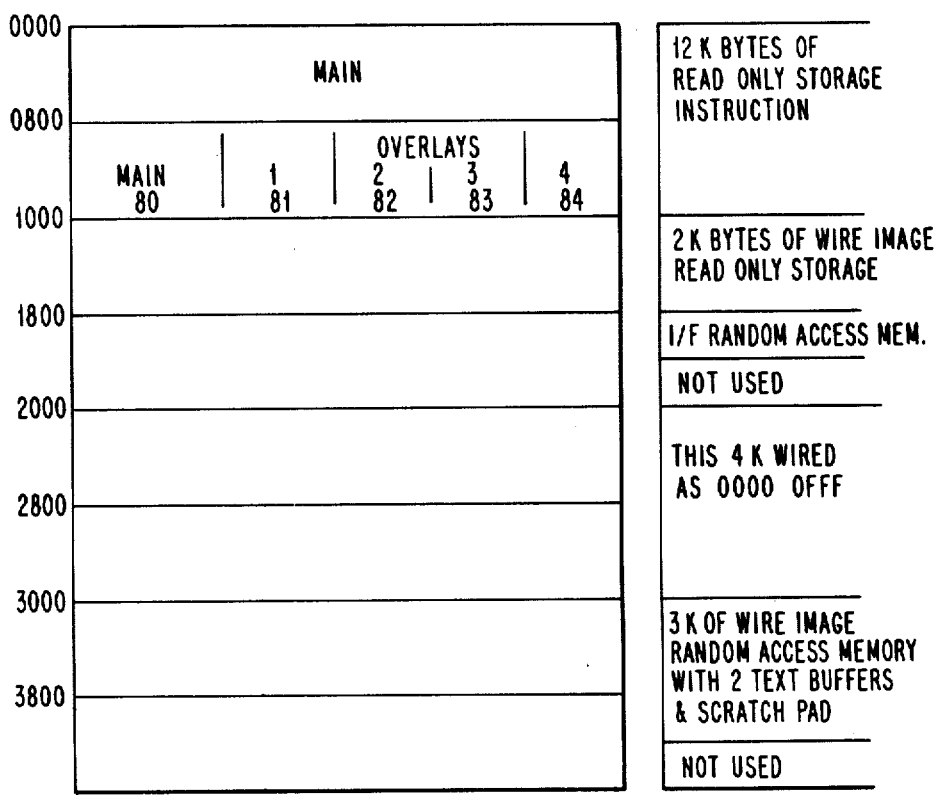
FIG. 58 shows the assignment of the Read Only Storage and Random Access Memory modules in the Communications Storage of Figs. 56L–56N.

When data is received for printing, the printer control unit 3 formats the data into print lines, using formatting commands (control codes) embedded in the data stream. Two print-line text buffers indicated in FIG. 58 are used so one line can be printed while the next line is being formatted. This comprises a "lookahead" function which allows bidirectional printing for maximum throughput.

INFORMATION CODES

All 256 8-bit codes of the Extended Binary Coded Decimal Interchange Code (EBCDIC) are recognized by the printer control unit 3. In a data stream hexadecimal codes of 00 through 3F represent formatting commands, 40 through FE represent data (FF is always a blank character.)

All of these codes may be used to represent characters.

OPERATIONAL COMMANDS

Operational commands, listed in Table I below, determine the printer function to be performed, such as Write Data, Read Status, etc. Also, see FIGS. 45 and 47A. FIG. 47A illustrates a representative operational command: "Poll." Some operational commands require an additional command or data frame. In these cases, the next frame transmitted must contain that command or data frame. Operational commands are embedded in the data stream wherever required for proper control of the printer.

OPERATIONAL COMMAND SEQUENCE

The diagram in FIG. 46 illustrates a representative sequence of events between a controlling unit and the printer subsystem 2 to effect printing of data.

TABLE I
OPERATIONAL COMMAND SUMMARY

| Command Name | Hex Code* | Function |
|---|---|---|
| Poll | X0 | Poll causes a one-frame status response from the printer until a Set Mode command is issued; thereafter, Poll initiates a two-frame status response. Bit 8 set to 1 resets line parity error indication. Bit 9 notifies the printer to send current status frames. |
| Read Device ID | 0C | Initiates the transfer of the ID (Identifier) frame from the printer to the controlling device. Must be followed by an Activate Read command. |
| Read Status | 88 | Initiates the transfer of one frame of outstanding status from the printer. Must be followed by an Activate Read Command. Required to complete Read Device ID or Read Status operations. This command signals the hardware that data is to start a transfer and is not placed in the command queue. |
| Activate Read | 00 | |
| Write Data | 1E | Causes the printer to store all data frames after the Activate Write. |
| Activate Write | 01 | Causes printing of data frames that follow this command. This command signals the hardware that data is to start a transfer. This is not placed in the command queue. |
| Write Control Data | 05 | Resets exception or outstanding status. |
| Set Mode | 13 | Must be issued before the printer accepts any other command except Poll and Reset. Followed by a data frame that defines the interval between frames. |
| Reset | 02 | Resets printer to a power-on reset condition. |
| Clear | 12 | Clears all print data buffers. |
| End-of Queue (EOQ) | 62 | Marks end of command queue loading. |

*Bits 7 through 14 of a data frame

FORMATTING COMMANDS

Formatting Command Function

Formatting commands, shown in Table II below, control forms movement and line length. They are embedded in the information stream that follows the Write Data command, FIG. 45. Also, See FIG. 47B which illustrates a representative formatting command: "New Line."

Some formatting commands require more than one frame. A code in the first frame identifies multiple frame commands. In some cases the code in the second or third frame further defines the total number of frames to be used. The formatting command codes are also referred to as "standard character string" (SCS) codes. SCS is an SNA control-character subset.

TABLE II
FORMATTING COMMAND SUMMARY

| Control Name and Abbreviation | Frame Sequence (Hex Code/Parameter) | | | | | | Description |
|---|---|---|---|---|---|---|---|
| | 1 | 2 | 3 | 4 | 5 | 6 | |
| Null (NUL) | 00 | | | | | | No Operation performed. |
| Carriage Return | 0D | | | | | | Moves the print position to the first position of the current line. |
| New Line | 15 | | | | | | Moves the print position to the first position of the next line. |
| Interchange Record Separator (IRS) | 1E | | | | | | Same as New Line. |
| Line Feed (LF) | 25 | | | | | | Moves the print position to the same horizontal position of the |

TABLE II-continued

FORMATTING COMMAND SUMMARY

| Control Name and Abbreviation | Frame Sequence (Hex Code/Parameter) | | | | | Description |
|---|---|---|---|---|---|---|
| | 1 | 2 | 3 | 4 | 5 | 6 | |
| Form Feed (FF) | 0C | | | | | | next line. Moves the print position to the first position of the next page. |
| Bell (BEL) | 2F | | | | | | Turns off Ready, turns on Attention and the audible alarm, and stops printing. |
| Absolute Horizontal Position (AH) | 34 | C0 | NN | | | | Moves the print position to the horizontal position specified in the parameter frame. The parameter frame NN immediately follows the AH command. |
| Absolute Vertical Position (AV) | 34 | C4 | NN | | | | Moves the print position specified in the parameter frame. The parameter frame NN immediately follows the AV command. |
| Relative Horizontal Print Position (RH) | 34 | C8 | NN | | | | Moves the print position horizontally towards the end of the line from the current print position the number of columns specified in the parameter frame. The parameter frame NN immediately follows the RH command frame. |
| Relative Vertical Print Position (RV) | 34 | 4C | NN | | | | Moves the print position vertically towards the bottom of the page from the current print position the number of lines specified in the parameter frame. The parameter frame NN immediately follows the RV command frame. |
| Set Horizontal Format (SHF) | 2B | C1 | NN | HH | | | Sets the print line length to the value specified in the parameter frames. The parameter frames NN and HH immediately follow the C1 command frame. |
| Set Vertical Format (SVF) | 2B | C2 | NN | VV | | | Sets the page length to the value specified in the parameter frames. The parameter frames NN and VV immediately follow the C2 command frame. |
| Set Graphic | 2B | C8 | NN | GG | UU | | Sets the unprintable character |

TABLE II-continued
FORMATTING COMMAND SUMMARY

| Control Name and Abbreviation | Frame Sequence (Hex Code/Parameter) | | | | | | Description |
|---|---|---|---|---|---|---|---|
| | 1 | 2 | 3 | 4 | 5 | 6 | |
| Error Action (SGEA) | | | | | | | option and defines the default graphic that is specified in the parameter frames. The parameter frames NN, GG, and UU immediately follow the C8 command frame. |
| Transparent (TRN) | 35 | NN | | | | | Permits the codes normally used as control characters to be used as printable characters. The parameter frame NN specifies the number of frames that follows the 35 command frame. |
| Subscript (SBS) Not available for single direction paper feed. | 38 | | | | | | Line feed 1.41 mm (4/72 in) to print subscript characters. |
| Superscript (SBS) Not available for single direction paper feed. | 09 | | | | | | Reverse line feeds down 1.41 mm (4/72 in.) to print superscript characters. |
| Set Character Distance (SCD) | 2B | D2 | 04 | 29 | P1 | P2 | Sets the character density to 10 or 15 cpi as specified in the P1 and P2 parameter frames. |
| Set Baseline Increment (SBI) Not available for single direction paper feed. | 2B | D2 | 04 | 15 | P1 | P2 | Sets the depth of one line of print to .176 mm (1/144 in.). |
| Set CGCS through Local ID (SCL) CGCS - Coded Graphic Character Set | 2B | D1 | 03 | 81 | P1 | | Loads 1 of 16 graphic character sets specified in the P1 parameter frame. |
| Absolute Move Baseline (AMB) Not available for single direction paper feed | 2B | D3 | 04 | D2 | P1 | P2 | Moves the print position forward in the vertical direction from the current print position to the new print position specified in the P1 and P2 parameter frames. |
| Relative Move Baseline (RMB) Not available for single direction paper feed. | 2B | D3 | 04 | D4 | P1 | P2 | Moves the print position forward or backward in the vertical direction from the current print position to the new print position specified in the P1 and P2 parameter frames. |
| Load Alternate | 2B | FE | NN | MM | | | Data allows customer designed |

TABLE II-continued
FORMATTING COMMAND SUMMARY

| Control Name and Abbreviation | Frame Sequence (Hex Code/Parameter) | | | | | Description |
|---|---|---|---|---|---|---|
| | 1 | 2 | 3 | 4 | 5 | 6 | |
| Characters (LAC) | | | | | | | fonts or characters to be loaded for printing. |
| Set Line Density (SLD) | 2B | C6 | NN | P1 | | | Selects vertical line density of 6 or 8 lines per inch or any distance in multiples of 1/72 inch up to 255. |

STATUS AND ERROR INFORMATION

Poll Response Frames

Following a power-on reset (POR), the printer subsystem 2 responds to controller polling with a single status frame, FIG. 48. The printer continues to respond to controller polling with a single status frame until the printer receives a Set Mode command.

After receiving a Set Mode command, the printer responds to polling with two status frames, the second of which is shown in FIG. 49.

Status information described in frame 1, FIG. 48, is the same in either case.

Bits 0, 1, 2—Fill

These bits are always set to 000 and are used for timing control.

Bit 3—Parity

This bit is used to maintain an even bit count (even parity).

Bits 4, 5, 6—Printer address

These bits are used for selecting a specific printer attached to the interface. Up to seven printers can be addressed by the combinations (000 through 110). A bit combination of 111 indicates an end-of-message and causes line turnaround.

Bit 7—Busy

0 = Not busy when operational command queue is empty.
1 = Busy when operational command queue is not empty or an activate command is received.

Bit 8—Line parity

0 = No line parity error is detected in a received frame.
1 = Line parity error is detected in a received frame.

Bit 9—Unit not available

0 = Unit available (the Ready light is on).
1 = Unit not available.

Bit 10—Outstanding status

0 = No outstanding status.
1 = Outstanding status (available by using the Read status command).

Bits 11, 12, and 13 indicate a variety of exception status conditions. Until the exception status is reset, only Poll, Set Mode, and Reset commands are processed. The Write Control Data Command (if the exception status is not power-on transition) is also processed. The power-on transition exception status is reset by the Set Mode command. The exception status conditions are reset by the Write Control command (see "Write Control Data").

| Bit 11 | Bit 12 | Bit 13 | Meaning |
|---|---|---|---|
| 0 | 0 | 0 | No exception status exists. |
| 0 | 0 | 0 | Activate lost - caused by a line parity error following a Write Data, Read Status, or Read Device ID. |
| 0 | 1 | 0 | Invalid activate command - caused when a Write Activate follows a Read Status or Read Device ID or, a Read Activate following a Write Data. |
| 0 | 1 | 1 | Reserved. |
| 1 | 0 | 0 | Invalid command - caused when a command is outside the operational command set or more than 240 microsecond interframe interval has been specified. |
| 1 | 0 | 1 | Input queue or input buffer overrun - caused when more than 16 commands and associated data frames or more than 256 data frames have been sent. |
| 1 | 1 | 1 | Power-on transition-causes only status frame 1 to be sent in response to a Poll command. |

Bit 14—Current/Previous response level

When bit 14 goes from 0 to 1 or 1 to 0, the using system determines that the response frame is current status. When bit 14 is unchanged from the previous response, the using system determines that the response frame is previous status. Any change in the response frame changes bit 14 from its previous state. Bit 14 is set to 0 after power-on.

Bit 15—Sync

A synchronization bit that is always set to 1. Frame 2 contains information shown in FIG. 49.

Bit 0 through 6—Same as Poll status frame 1

Bit 7—Invalid SCS (standard character string) control

0 = No Invalid SCS Control Code is detected.
1 = Invalid SCS Control Code is detected.
Reset by a Reset or Clear command.

Bit 8—Invalid SCS (standard character string) parameter

0 = No Invalid SCS parameter is detected.
1 = Invalid SCS parameter is detected.
Reset by a Reset or Clear command.

Bit 9—Receive buffers full

Used by the using system to determine when data can be sent to the printer.
0=Receive buffers are not full.
1=Receive buffers are full.

Bit 10—Print complete

The print complete bit is set to 0 when the printer detects an Active Write command. The print complete bit is set to 1 by Power-on reset, a Clear command, a Reset command, or when all input data is printed.
0=Printing is in progress.
1=Printing is completed.

Bit 11—Cancel Request

The Cancel request bit is set to 1 when the operator presses the Cancel key on the Operator Panel. This bit is reset by the next Poll command (with Acknowledge bit set to 1), a Reset or Power-On reset.
0=No cancel request.
1=Cancel request.

Bit 12—Not Used

Bit 13—Not used

Bit 14—Graphic check

This bit set to 1 indicates that an undefined character has been detected in the data stream. This bit is reset by the next Poll command (with Acknowledge bit set to 1), a Reset or Power-On reset.
0=No graphic error is detected.
1=Graphic error is detected.

Bit 15—Same as Poll status frame 1

READ STATUS RESPONSE FRAME

One response frame is sent for every Read Status command. The response frame, sent only after the Activate Read command is received, contains a hex code that defines the status condition within the printer.

The hex code corresponds to the last two digits of the error code that may be available as a system error message (depending on the using system). The high order first digits of these hex codes are also automatically displayed on the printer operator panel 26 when the error occurs, the high order digit normally being first displayed on display 59 and the low order digit being displayed upon depression of shift pushbutton switch 55 by the operator.

The defined conditions are:

| Hex Code | Error Condition |
|---|---|
| 11 | Printer controller error |
| 12 | Cable adapter error |
| 31 | Head drive problem |
| 32 | Margin emitter not detected |
| 34 | Turnaround emitter not detected |
| 35 | Print emitter not detected |
| 36 | Head busy (cannot be reset) |
| 37 | Printer control unit |
| 38 | Overcurrent |
| 41 | Forms drive problem (undetermined area) |
| 42 | Forms busy (cannot be reset) |
| 43 | Forms emitter B not detected |
| 44 | Forms emitter A not detected |
| 45 | Run latch failure (printer control unit) |
| 46 | Printer control unit |
| 47 | Overcurrent |
| 48 | Emitter sequence wrong |

-continued

| Hex Code | Error Condition |
|---|---|
| 80 | Ribbon jam |
| 81 | Ribbon jam (diagnostic mode) |
| 82 | Ribbon problem |
| 83 | Head Image Generator error |

PRINTER GENERAL BLOCK DIAGRAM

FIG. 50 illustrates various printer blocks of interest. A power supply 245 supplies the unit with all the power to drive and to control. The on/off switch 240 controls power supply 245 being on and off. From the power supply 245 the cover interlock switch 242 enables and disables the 48-volt drive which controls much of the printer logic 243. Logic 243, once enabled, looks at operator panel 26 for information as to the operations to be performed. Mode switch 65 tells the logic 243 which type of operation in testing procedures should be run. Print assembly 30 is controlled by the printer logic 243 along with the forms feed assembly 20. Emitter devices 24 and 70 supply positional information to the printer logic 243. The printer logic 243 also controls and talks with the interface panel 247 and passes information on the other parts of the printer. The ribbon motors 49 and 50 are controlled in an on/off fashion by printer logic 243 which accepts inputs from the ribbon drive assembly 40 to determine when the end of ribbon 41 has occurred. Head servo 252 is a control block that insures that the print head 34 is in the proper position at the proper time for the actuators 35 to fire. Forms servo 253 is a control block that moves the forms 15 to desired locations. Fans 254–258 are used to control temperature within the machine. As indicated in connection with FIG. 35, printer logic 243 includes two microprocessors 200 and 210. The first microprocessor 200 is included in the Communications adapter CMA 202 which accepts input and passes it to the second microprocessor 210 which is in the Control adapter CTA 211 that actually controls the printer. These will be discussed in connection with FIGS. 51A and 51B.

MICROPROCESSOR CONTROL—PRINTER SUBSYSTEM

Figure 51A:
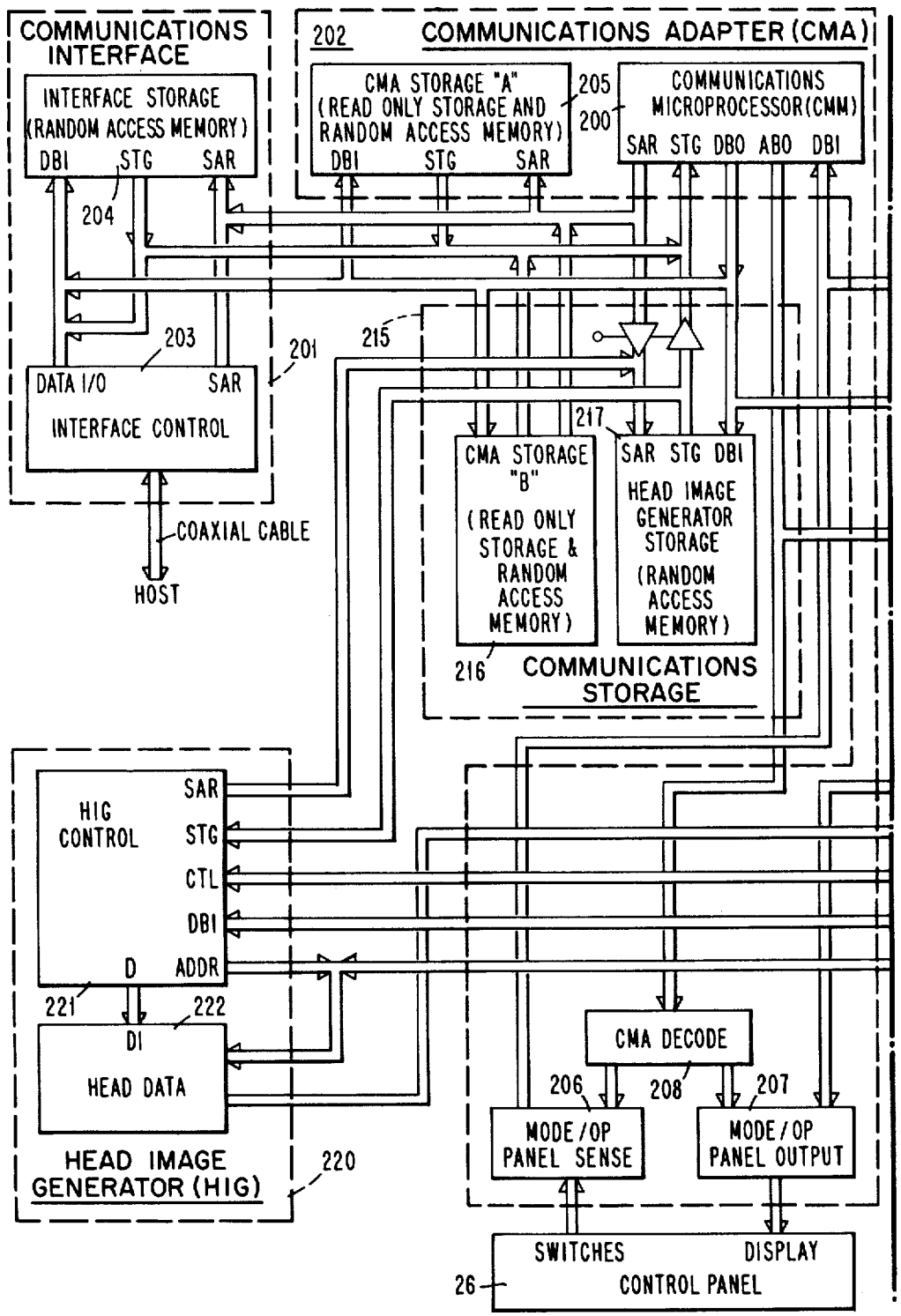
FIGS. 51A and 51B, when arranged as shown in FIG. 52, comprise a block diagram of the printer control unit including a Communications microprocessor (CMM) and a Control microprocessor (CTM) as well as a number of elements in the printer unit.
Figure 51B:
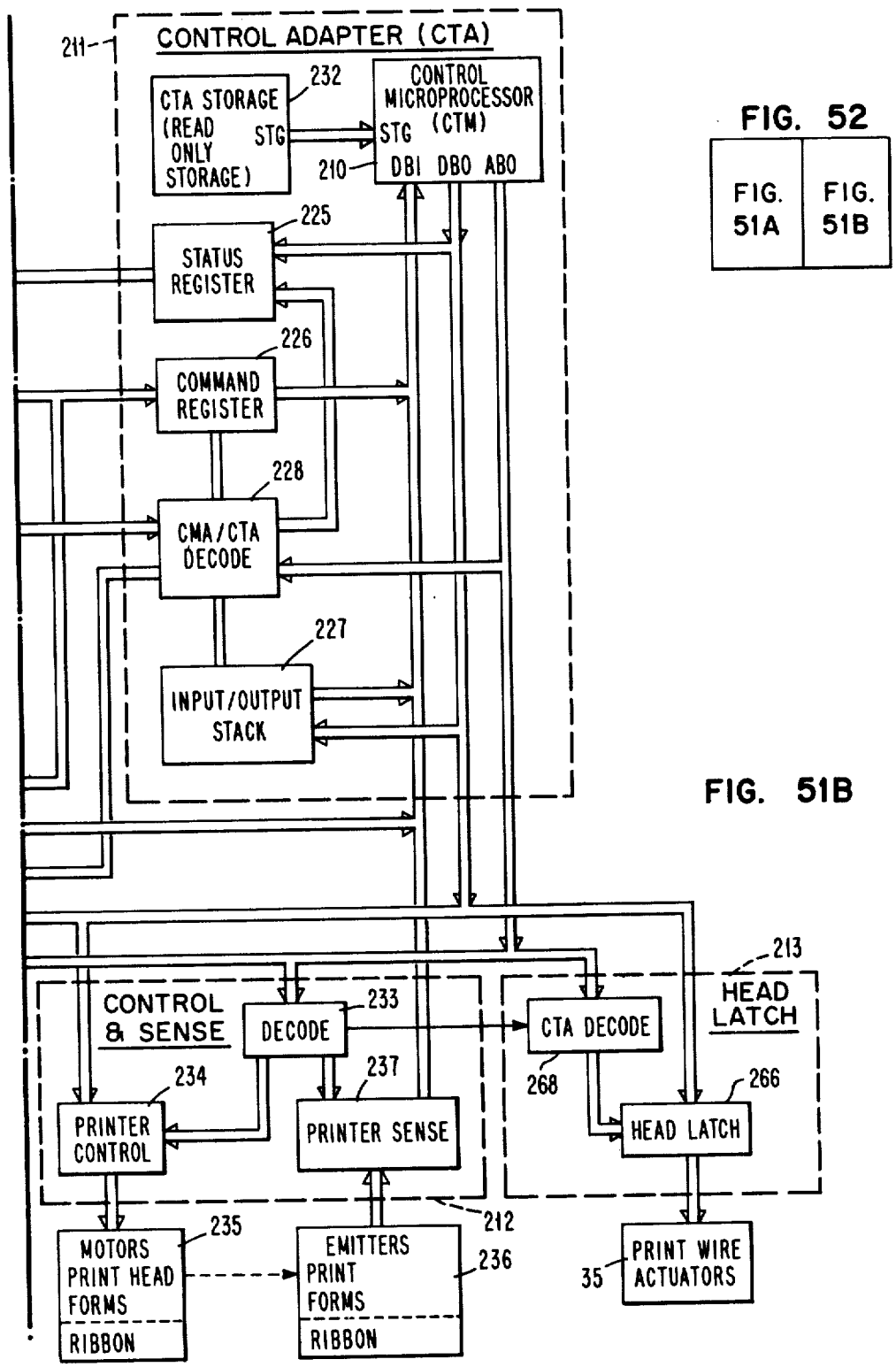

Two microprocessors 200 and 210 are provided for the printer subsystem 2, each having its assigned functions and both can operate concurrently to accomplish the required functions. FIGS. 51A and 51B join together as shown in FIG. 52 to illustrate the details of the Printer Control Unit 3 and Electronics 4, FIG. 1. Various abbreviations used herein are listed in Table III below:

TABLE III

| | | |
|---|---|---|
| ABO | — | Address Bus Out |
| CMA | — | Communications Adapter Card |
| CTA | — | Control Adapter Card |
| CTL | — | Control |
| D | — | Data |
| DI | — | Data In |
| DBI | — | Data Bus In |
| DBO | — | Data Bus Out |
| HIG | — | Head Image Generator |
| MODE/OP | — | Mode/Operation |
| ROS | — | Read Only Storage |
| SAR | — | Storage Address Register |
| STG | — | Storage Bus In |

There are actually seven main blocks comprising the Printer Control Unit 3 representing seven printed circuit cards. The first block is the Communications Interface 201 between the host system 1 and digital printer electronics 4. Interface 201 communicates with the Communications Adapter (CMA) 202 which is a microprocessor card that takes the host information and compiles it into a form that can be used by the rest of the printer. The CMA 202 includes Communications microprocessor CMM 200. From there, the information is passed on to the Head Image Generator 220 card for building images for the printer. There is another micropocessor card that is the Control Adapter Card (CTA) 211. The CTA 211 includes Control microprocessor CTM 210. The Control Adapter 211 handles the processed information from the Communications Adapter 202, controls all the mechanical elements of the printer, such as the motors 23, 76, and receives emitter signals indicating positions of the mechanical elements. Adapter 211 handles communication with the actual hardware through the Control and Sense card 212 and the Head Latch card 213 that stores the data to be outputted to the wire actuators 35.

Within the Communications Interface 201 are two blocks. One is the Interface Control block 203; the other is the Interface Storage block 204. The Interface Control block 203 interprets the information coming from the host system 1 in an analog signal form, processes it into digital form, and generates the necessary timing signals to be able to store this information in the Interface Storage 204. The Interface Storage 204 is a Functional Storage Unit (FSU) random access memory which is sized at one K (1K) bytes. All data and commands from the host system 1 go into this Interface Storage 204; it acts as a buffer for the Communications Adapter 202. Within the Communications Adapter card 202, there are five blocks. There is the Communications microprocessor 200 (CMM) and its corresponding storage 205 designated "A" which includes both random access memory and read only storage (ROS). There is a Mode/Op Panel and Sense block 206 that can read the panel 26, a Mode Op Panel Output block 207 to output displays to the panel 26, and Decode Logic 208 for these functions. The Communications Adapter 202 translates the information that the host system 1 has sent over through high-level or hand-shaking type procecedures and translates it into much more simple terms such as characters to be printed or carriage returns, or line feeds—any other mechanical type control that needs to be performed. Its program is stored in the Read Only Storage (ROS) of the CMA "A" storage 205. There are 6K bytes in this ROS. The CMA 202 also handles Hardware Operator commands involving printing the printer on-line, taking it off-line and displaying any type of status information through the display 59 on the Mode Operator Panel 26.

The Communications Storage 215 has two blocks entitled CMA Storage "B" designated 216 and Head Image Generator (HIG) Storage 217. Storage "B" block 216 contains up to 14K bytes of ROS storage in FSU technology for the Communications Adapter microprocessor 200. The random access memory storage 217 has 3K bytes for the Head Image Generator 220 and is where the Communications microprocessor 200 stores character images to be printed. The character images in storage 217 are used by the Head Image Generator 220 to generate actual images for the slanted heads 34. Also, in the block of Random Access Memory 217 are two text buffers and some scratch pad storage indicated in FIG. 58.

Because of the staggered slant geometry of the print heads 34 and the multiple head configuration, a fairly complex Head Image Generator 220 (HIG) is required to convert conventional character dot format to a slanted format. HIG 220 processes the character images as they would normally appear in a "straight-up" format, but slants them for the Head Latch block 213 to supply to the print wire actuators 35. This is done through hardware routines that are performed in the Head Image Generator 220. There are basically two blocks 221, 222 in the Head Image Generator 220, one block being the Control block 221 that actually performs the hardware routines to take the unslanted image and slant it. There is also a Data block 222 that is a small storage unit in which the Head Image Generator 220 stores the slanted information currently being worked on. The Control Adapter 211 can then read this storage 222 and output to the print wire actuators 35 through Head Latch 213. This is the slanted data.

The Control Adapter (CTA) 211 has six blocks within it. The Control microprocessor (CTM) 210 receives inputs from various sensors, e.g., ribbon reverse/jam, forms jam, head position, linear encoder, forms position encoder, as well as print commands and data from CMM 200 and HIG 220 and generates print wire firing signals and various control signals to control the forms feed assembly 20, print assembly 30 print wire actuators 35, and ribbon drive assembly 40. The Control microprocessor (CTM) 210 has a ROS storage 232 that is 12K bytes of FSU ROS to contain its programs or routines. Certain communication registers including Status register 225 and Command register 226 allow the Communications Adapter 202 and the Control Adapter 211 to communicate with one another. Through these registers 225,226 go commands such as Print commands, Forms commands, Carriage Returns, and the actual decoded messages that the host system 1 has sent over. An Input/Output stack 227 is used as a local storage, that is, it is a small random access memory for the Control Adapter 211 to store intermediate data and there is some associated decoding. The Decode block 228 handles the timing relationships for the Communications Adapter 202 and Control Adapter 211 to be able to talk to one another asynchronously.

The Control and Sense card 212 handles the information from the Control Adapter card 211 and interfaces with the actual printer electronics 4 to control by way of Decode block 233 and Printer Control block 234 the head motor 76, the forms motor 23, and the ribbon motors 49 and 50 represented by block 235. Through blocks 236 and 237 it senses the positional state of printer electronics 4 and mechanics such as the print emitters, forms emitters, etc.

The Head Latch card 213 is another interface card from the Control Adapter 211 that latches up the wire image data, the slanted data that is received from the Head Image Generator 220, and outputs it at the correct time to the print wire actuators 35 so that the dots get printed in the correct place on the form 15. It includes the CTA Decode block 268 and Head Latch block 266.

A typical print operation is now described. It is assumed that a single print line is provided by the host system 1 with a Forms Feed and Carriage Return at the end which is a typical situation. This information comes over in a serial stream from the host system 1 as analog signals into the Communications Interface 201 which digitizes the analog signal and stores it in its Interface Storage 204 in the form of characters to be printed. A command informs the Communications Adapter 202 that this is a line to be printed and that it has Line Feed and Carriage Return commands. The Communications Adapter 202 seeing this information appear, will take the characters to be printed out of the Interface Storage 204 and put them into a selected text buffer in CMA Storage 217a, 217b on Communications Storage card 215a, FIG. 56N. It then tells the Control Adapter 211 that it has information in a text buffer to be printed.

The Control Adapter 211, after receiving the information initially tells the Head Image Generator 220 (HIG) that there is data in the selected text buffer that needs to be slanted. Head Image Generator 220 then slants this information, while the Control Adapter card 211 starts the printer in motion; that is, it starts moving the print head carrier 31. It moves the carrier 31 through commands given to the Control and Sense card 212, and it looks for print emitter signals, or emitter signals which tell the Control Adapter 211 when to fire wires 33; it checks for these signals coming from the Control and Sense card 212. When these signals appear, the CTM 210 retrieves the slanted wire information from the HIG 220 and passes it to the Head Latch card 213 and fires the wires 33 to print dots. The Control Adapter 211 for each print emitter that it sees, asks the Head Image Generator 220 for a new set of slanted data. This is outputted to the Head Latch card 213 and is repeated until the entire text buffer has been printed, that is, all the information that the host system 1 sent over. Once the Communications Adapter 202 has seen that this has taken place, that is, the printing has been done, it passes the Forms command to the Control Adapter 211. Control Adapter 211 decodes this command and gives a command to the Control and Sense card 212 to move forms 15 a certain number of forms emitters. It senses these forms emitters through the Control and Sense card 212 again.

Figure 53:
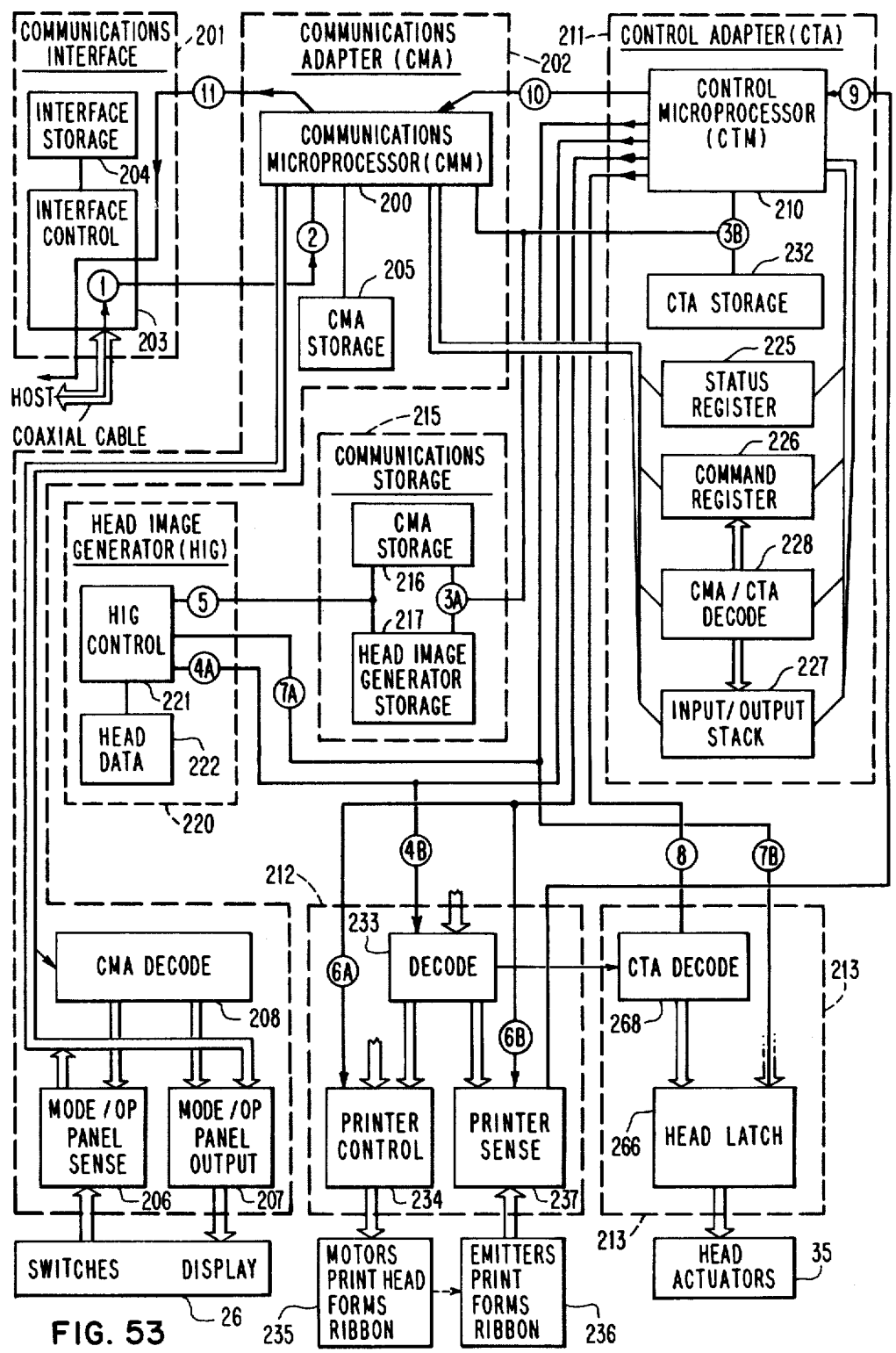
FIG. 53 illustrates a typical data transfer and printing operation in the printer subsystem.

This is further illustrated in FIG. 53. A typical operation is assumed to come from the host system 1 to the printer control unit 3. (Steps (paths) are illustrated by numbers in circles.) Path 1 represents receipt of the data and commands by interface 201. By path 2, the interface 201 prepares it and passes it on to the CMA 202. CMA 202, essentially in two operations, strips off printable characters and by the path labeled 3A transfers the characters to the text buffers in CMA Storage 216. Initially, font information is stored in HIG Storage 217. At the same time essentially by path 3B, the CMA 202 supplies print commands to the CTA 211 to start the operation. Next are two operations 4A and 4B. CTA 211 initiates operation 4A to HIG 220 which simply says there is data in the text buffer at a certain address, begin HIG operations. At the same time, the path 4B is effective to tell the Control and Sense card 212 to start any of a number of possible operations of the printer, such as: to move the heads 34 off the ramp, move the forms 15 as necessary, do not move the forms 15, move heads 34 to a certain absolute position or relative position, etc. Item 5 is a path from the HIG 220 to the storage blocks 216 and 217 over which is supplied the hexadecimal representation of the data and that font information HIG 220 is to operate on to start its wire image generation. Path 6A represents verification by CTA 211 of electromechanical printer operations. This involves checking out the emitters, for example, timing out on the print emitters, etc. to determine that the printer is prepared to print and ready to fire reported back by path 6B.

Item 7 (two paths, 7A and 7B) represents fetching of data from the HIG 220 which is the head latch image that is transferred to the head latch card 213 and some checking is done on it at that point by the CTM 210.

Item 8 represents CTA 211 signalling the head latch block 213 to fire. This is a pedestal signal to fire the wires 33. Prior to that point, CTA 211 has to have received a print emitter at step 6B in order to issue the pedestal firing signal.

Step 9 represents a feedback signal from the Control and Sense Card 212 and from the head latch card 213 back to CTA 211. CTA 211 will recheck the Control and Sense Card 212 verifying that the operation was performed that was expected to be performed.

Step 10 is communications from the CTA 211 to the CMA 202 indicating that the operation that the CMA 202 initiated was accomplished without errors. If there were errors, CMA 202 will be so advised. CMA 202 then compiles status or error information and presents it at Step 11 to the Interface 201 as a poll response to the host system 1.

COMMUNICATIONS MICROPROCESSOR (CMM) OPERATIONS

Figure 54:
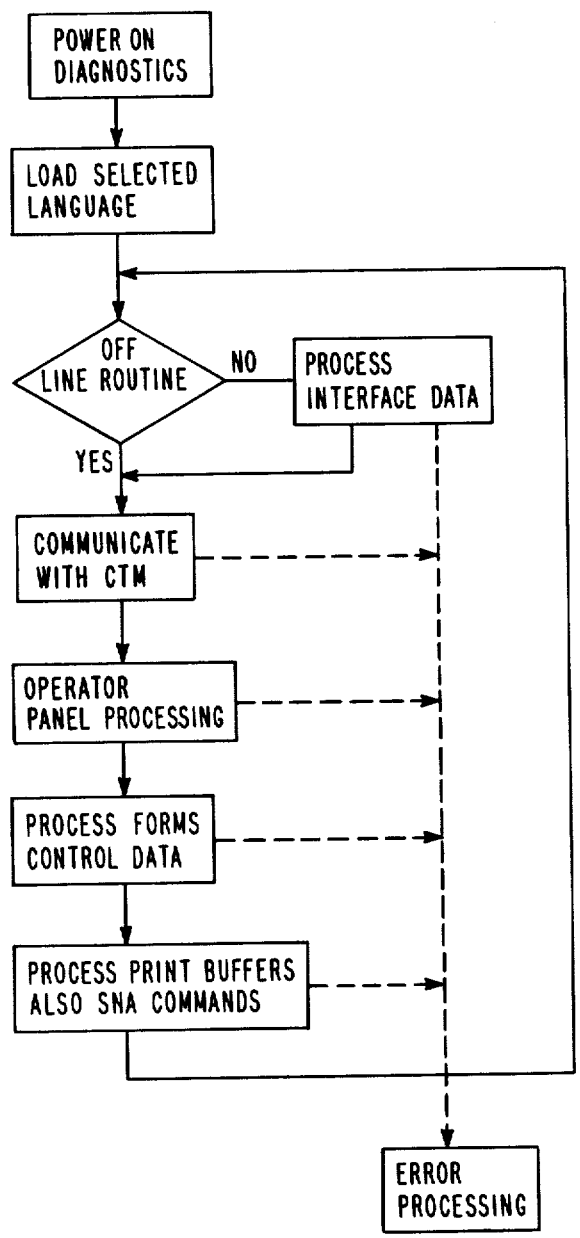
FIG. 54 is a generalized flowchart of the program routines for the Communications microprocessor (CMM) shown in FIG. 51A.

The Communications Microprocessor 200 (CMM) Flowchart, FIG. 54, represents its general operation and starts with the Power On Diagnostics being run. At the conclusion of the Power on Diagnostics, the selected language is loaded into a font section portion of Memory 216, FIG. 51A) for processing and printing. A decision is now made as to whether the Mode Switch 65 is in the off-line or on-line position. If it is in the on-line position, then the interface data is processed, or information coming from the host system 1 or going to the host system 1, is processed and prepared. If an off-line routine was indicated, then this process is skipped. In any case, the chart continues to the next block no matter which off-line routine is processed. This block represents communication with the Control microprocessor 210 (CTM). This allows the CMM 200 to receive any errors or information that needs to be passed to the host system 1 and it allows the CMM 200 to pass data and commands such as data to be printed, forms, spacing, etc. on to the CTM 210. Next, the Operator Panel 26 is accessed to determine whether the Start button 53, Stop button 52, or other buttons 51, 54, 55 or 60 have been depressed for entry of information from the Operator Panel 26. Next, the Process forms or Control data block is checked to determine the movement of forms 15 resulting from commands sent to the CTM 210. Next is to Process the text buffers which includes SNA commands or the off-line routines. The CMM 200 places them in the proper text buffer to be printed by the CTM 210 and directs the CTM 210 to pick this information up and place it on the paper as dots. All of these routines have a means of communicating with the error processing routine. At the end of the routine, the CMM 200 checks for on-line or off-line status and continues the process again.

CONTROL MICROPROCESSOR (CTM) OPERATIONS

Figure 55:
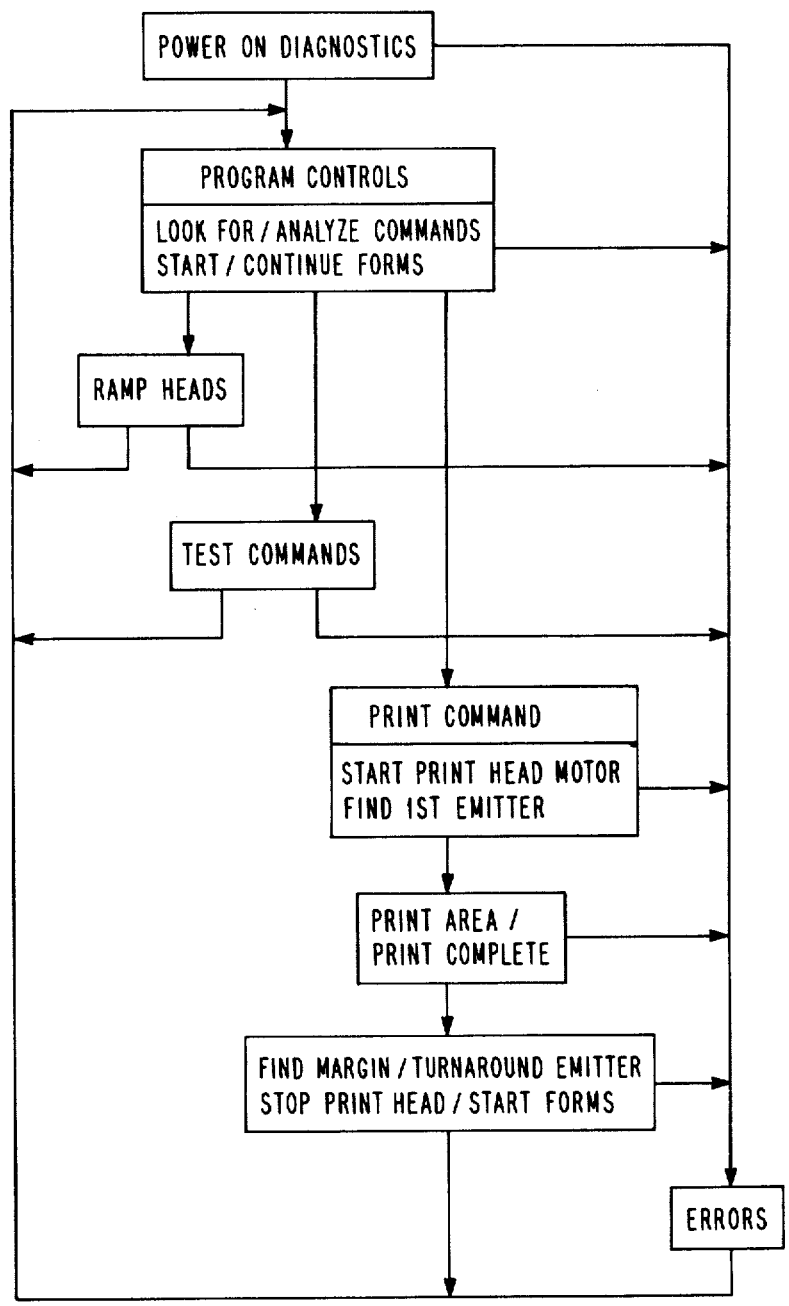
FIG. 55 is a generalized flowchart of the program routines for the Control microprocessor (CTM) shown in FIG. 51B.

FIG. 55 is an overall block diagram of the Control microprocessor 210 (CTM) operations. The CTM 210 goes through Power On Diagnostics upon Power Up and then upon successful completion of that proceeds to Program Controls. The function of this is to look for and analyze commands from the Communications microprocessor 200 (CMM) and start or continue forms operation. Initially, a check is made by the Ramp Heads block that print heads 34 are in the home or ramp position. A check is then made by Test Commands block for servicing or customer tests that may be required. When a command is determined, if it is a Print Command, CTM 210 starts the print head motor 76 and looks for the first print emitter. Upon finding the first print emitter, CTM 210 goes into the Print block and stays in that area printing the line of data until it reaches Print Complete representing complete printing of the line. Then CTM 210 goes into the margin routines to find the margins or a turnaround emitter. Once the margins or the turnaround emitter are determined, CTM 210 stops the print head 34, starts the forms 15 and returns to Program Control to look for and analyze further commands. If CTM 210 receives additional commands from the CMM 200, upon completion of the forms operation, it starts the next print operation. Out of any of these blocks, if an error is detected, CTM 210 exits and goes into an error routine to determine what and where the error is. It notifies the CMM 200 of the error. The CMM 200, based on the type of error, will either retry the command or stop the operation of the printer and notify the host system 1.

DETAILED DESCRIPTION OF PRINTER CONTROL UNIT—A DETAILED EMBODIMENT

Figure 56A:
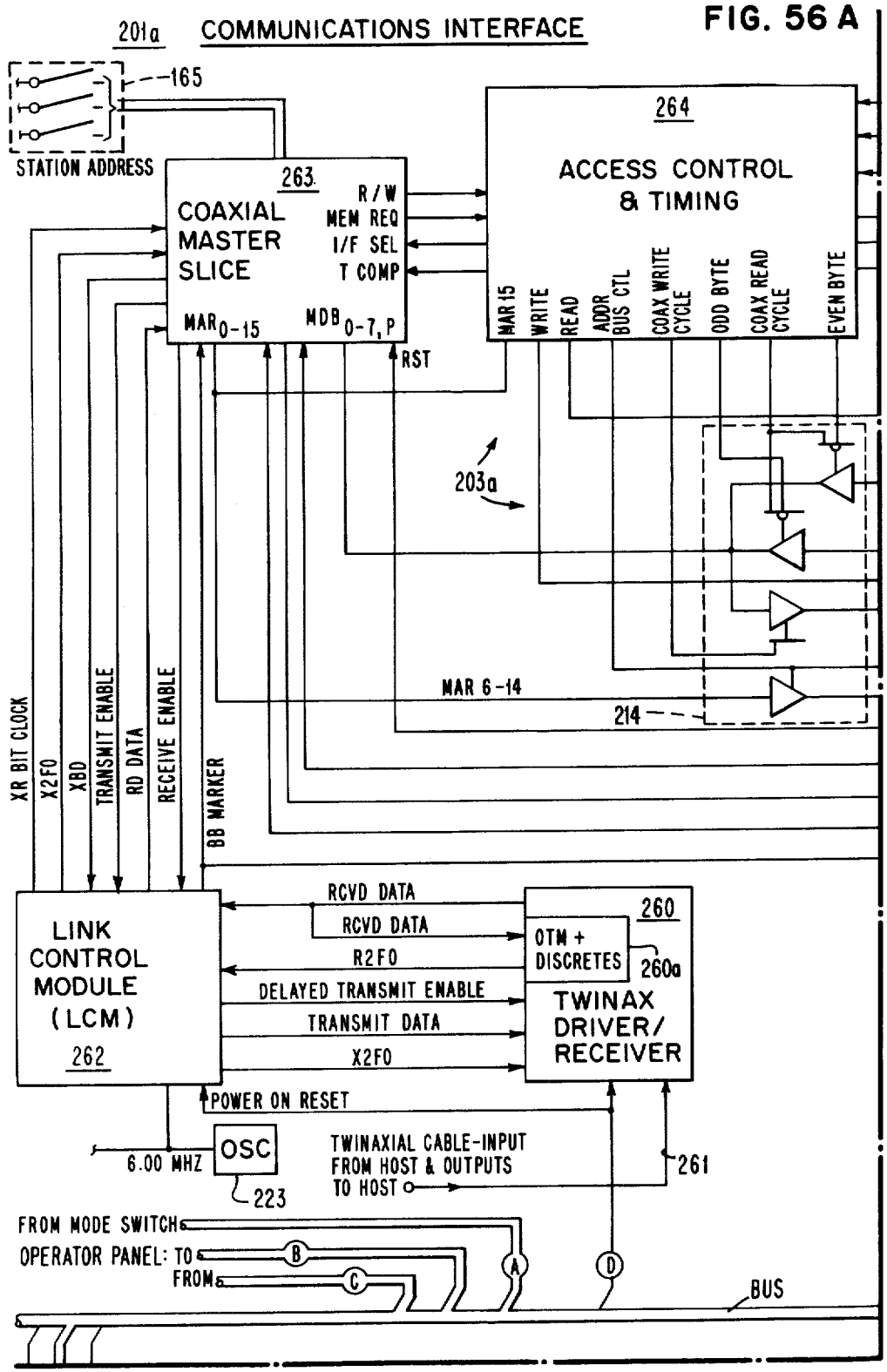
FIGS. 56A–56P, when arranged as shown in FIG. 57, represent a printer control unit that is generally based on the printer control unit shown in FIGS. 51A and 51B but which does have differences in some of the details of implementation.
Figure 56B:
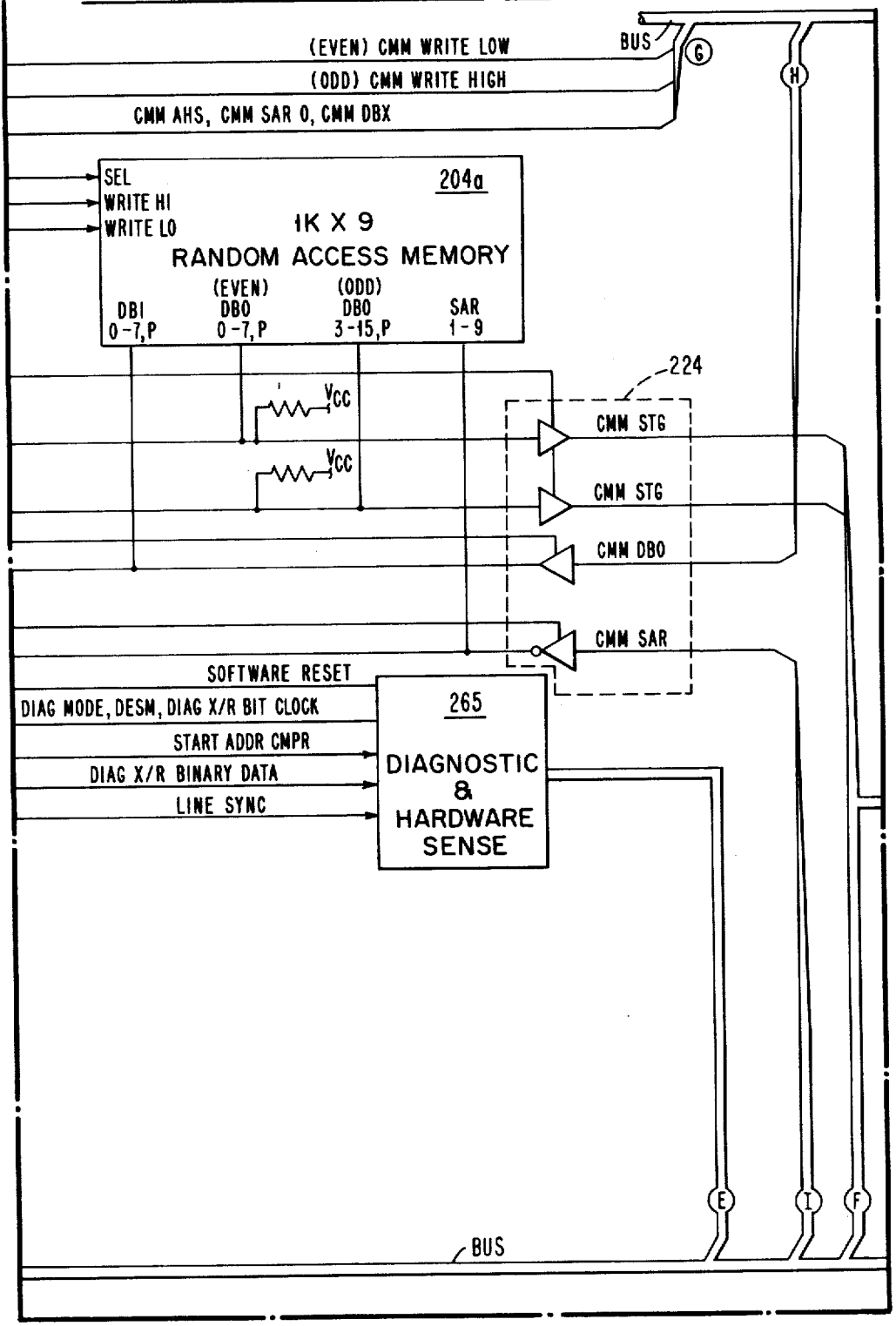

FIGS. 56A-56P represent detailed circuits for a printer control unit 3 useful in the printer subsystem 2 described herein and which is generally based on the block diagrams of the printer control unit 3 shown in FIGS. 51A and 51B but which differs in some of the details of implementation. FIGS. 56A-56B should be arranged as shown in FIG. 57 (on same sheet of drawing as FIG. 59).

As with the version shown in a general way in FIGS. 51A and 51B, the printer control unit 3 of FIGS. 56A-56P is assumed to be arranged on seven printed circuit cards having the same general headings as previously discussed in connection with FIGS. 51A and 51B. Table IV lists the seven circuit card titles and their figure number locations.

TABLE IV

| FIGURE NUMBERS | PRINTER CONTROL UNIT ITEM |
|---|---|
| 56A, 56B | COMMUNICATIONS INTERFACE 201a |
| 56C, 56D | COMMUNICATIONS ADAPTER (CMA) 202a |
| 56E, 56F | CONTROL ADAPTER (CTA) 211a |
| 56G, 56H | HEAD LATCH 213a |
| 56I, 56J, 56K | HEAD IMAGE GENERATOR (HIG) 220a |
| 56L, 56M, 56N | COMMUNICATIONS STORAGE 215a |
| 56O, 56P | CONTROL & SENSE 212a |

In addition, for convenience, reference numbers similar to those used in FIGS. 51A-51B will be used in the present description with an appropriate suffix to indicate that there are some differences in the circuit components and arrangements between the two embodiments described.

The circuit groups are used mainly when the related circuit lines are located in figures that are located some distance away within the collection of FIGS. 56A-56P. When circuit data or control lines are located in such a manner that they readily interconnect when the figures are lined up as shown in FIG. 57, then the circuit group designations are not used since the circuit connections may be readily seen by such arrangement.

ABBREVIATIONS USED

A variety of abbreviations are used in the figures particularly in FIGS. 56A-56P, and these abbreviations are set forth in Table V below:

TABLE V

| Abbreviation | Definition |
|---|---|
| ABO | Address Bus Out |
| ADDR W ADD | Address |
| ADDR | Address Bus |
| AHS | Address High Storage |
| ALT | Alternate |
| ATTN | Attention |
| B | Buffer (no invert) |
| BB | Bit - Byte |
| CH | Check |
| CHAR | Character |
| CK | Clock |
| CLK | Clock |
| CMA | Communications Adapter |
| CMD | Command |
| CMPR | Compare |
| COAX | Coaxial |
| CPI | Characters Per Inch |
| CS | Control Strobe |
| CTA | Control Adapter |
| CTL or CNTL | Control Microprocessor |
| CTM | Cycle |
| DB | Data Bus |
| DBBM | Diagnostic Bit Byte Mark |
| DBI | Data Bus In |
| DBO | Data Bus Out |
| DBX | Data Bit "X" |
| DEC | Decode |
| DET | Detect |
| DIAG | Diagnostic |
| DR | Driver |
| ENBL or EN | Enable |
| EOF | End of Forms |
| FF | Flip Flop |
| FMS | Forms |
| GTE | Gate |
| HI | High |
| HIG | Head Image Generator |
| HL | Head Latch |
| H/W | Hardware |
| I/F | Interface |
| INC | Increment |
| INIT | Initialize |
| INV | Inverter |
| K | 1000 |
| LANG | Language |
| LD | Load |
| LO | Low |
| LTH or LTCH | Latch |
| MAR | Memory Address Register |
| MDB | Memory Data Bus |
| MEM REQ | Memory Request |
| MHZ | Megahertz |
| MPLX or MUX | Multiplex |
| MTR | Motor |
| N | Inverter/Buffer |
| NO | Number |
| O.C. | Open Collector |
| P CHEK | Parity Check |
| PG | Page |
| POR | Power On Reset |
| POS | Position |
| R2FO | Two Times Receive Clock |
| RBD | Receive Binary Data |
| RCV | Receive |
| RCVD | Received |
| RD | Read |
| REG | Register |
| ROS | Read Only Storage |
| RST | Reset |

TABLE V-continued

| Abbreviation | Definition |
|---|---|
| RV | Reverse |
| R/W | Read/Write |
| SAR | Storage Address Register |
| SEL | Select |
| SING | Single |
| SPD | Speed |
| SS | Sense Strobe |
| ST | Start |
| STAT | Station |
| STG | Storage |
| SW | Switch |
| SYNC | Synchronization |
| SYS | System |
| T COMP | T Complete |
| TXTB | Text Buffer |
| WH | Write High |
| WL | Write Low |
| WR | Write |
| X2FO | Two Times Transmit Clock |
| XBD | Transmit Binary Data |
| XMIT | Transmit |
| X/R | Transmit/Recieve |
| XRBC | Transmit/Receive Bit Clock |

CIRCUIT TERMINOLOGY

To the extent that they are the same as the block diagram in FIGS. 51A–51B, the same reference numerals will be applied to those circuit modules in FIGS. 56A–56P. However, a number of additional circuit elements are shown in FIGS. 56A–56P not previously discussed before in connection with FIGS. 51A and 51B.

In contrast with the circuit diagram of FIGS. 51A and 51B where individual cables are shown interconnecting the various blocks, FIGS. 56A–56P have a single bus structure which accommodates all cabling in the printer control unit 3 shown in those figures. This is simply designated by the term "BUS". The inclusion of the single bus structure in FIGS. 56A–56P is done for convenience in presentation of the printer control unit 3 described therein, it being understood that a single bus structure in actual hardware would not necessarily be as desirable as separate cabling or buses as may be required to route the wiring to the different components of the printer subsystem.

Also as a convenience, groups of circuit connections for data and/or control signals that are somewhat related have been arranged into circuit groups A–Z in FIGS. 56A–56P. Thus, the cabling designated "B", To Operator Panel, in FIG. 56A is routed through the primary bus and is found connected to the logic in/out wrap block 208a in FIG. 56D. Some of the circuit groups may be found on more than one sheet of the drawing. The circuit groups A–Z, their definitions, and locations in the figure numbers are indicated in the following Table VI.

TABLE VI

CIRCUIT INTERCONNECTIONS - FIGS. 56A–56P

| Circuit Group | Definition | Found In FIG. NOS. |
|---|---|---|
| A | From Mode Switch | 56A, 56D |
| B | To Operator Panel | 56A, 56D |
| C | From Operator Panel | 56A, 56D |
| D | Power On Reset | 56A, 56C, 56E, 56G, 56I, 56L, 56O |
| E | Interface Diagnostics | 56B, 56N |
| F | CMM Storage | 56B, 56N |
| G | CMM Write Low | 56B, 56D, 56E |
| | CMM Write High | 56I, 56L |
| | CMM Address High Storage (AHS) | |
| | CMM Storage Address Register (SAR) | |
| | CMM Data Bit X (DBX) | |
| H | CMM DBO | 56B, 56D, 56E, 56L |
| I | CMM Storage Address Register (SAR) | 56B, 56D, 56L |
| J | 16 MHZ Oscillator | 56D, 56E, 56I |
| K | CMM Data Bus In (DBI) | 56C, 56E |
| L | CMM Address Bus Out (ABO) | 56D, 56E, 56L |
| M | CMM Select 001, 110, 111 STG | 56D, 56L |
| MD | Main Page Disable | 56C, 56N |
| N | CTM Reset Storage (RST STG) | 56E, 56P |
| O | CTM Error | 56E, 56G |
| P | CTM Control Strobe | 56E, 56G, 56P |
| Q | CTM Address Bus OUT (ABO) 0-7 | 56E, 56L, 56K, 56P |
| R | HIG Head Data 0-7 | 56E, 56K, 56L |
| S | HIG Error | 56E, 56K |
| | HIG Print Feedback | |
| T | CTM Data Bus Out (DBO) 0-7 | 56F, 56H, 56K, 56L, 56P |
| U | CTM Data Bus In (DBI) 0-7 | 56F, 56H, 56P |
| V | HIG Load Character No. | 56F, 56G, 56K |
| | HIG Load Control | 56L |
| | HIG Print Mode | |
| | Head Latch (HL) Enable | |
| W | HIG Select 110 | 56I, 56L |
| | HIG Select 111 | |
| | HIG Reset Storage | |
| X | HIG Storage | 56I, 56N |
| Y | HIG Storage Address Register (SAR) | 56J, 56L |
| Z | Head/Forms Overcurrent and Reset | 56D, 56O |

DATA FLOW AND COMMUNICATIONS—PRINTER CONTROL UNIT

As mentioned, the printer control unit 3 is divided into two primary sections, one being the control section and one the communications section. In the control section, most of the operations performed are on an Input/Output (I/O) basis. On the other hand, the communications side of the printer control unit 3, that is, Communications Interface 201a, Communications Adapter 202a, Communications Storage 215a, and the Head Image Generator 220a all perform communications on a memory basis, that is through a memory module. In this regard, Communications Adapter 202a can request infomation from the Communications Interface 201a, and the Communications Interface 201a thereupon searches through its memory 204a, FIG. 56B, looking for that information and presents it back to the Communications Interface 201a. The Head Image Generator 220a operates somewhat in the same manner. It can request information from the Communications Storage Random Access Memory (217a and 217b, FIG. 56N) and is time-sharing the memory 217a, 217b with the Communications Adapter 202a.

The Communications Interface 201a shares its memory 204a with the Communications Adapter 202a in a more asynchronous manner; that is, the Communications Interface 201a accesses its buffer Random Access Memory 204a at a higher speed than the Communications Adapter 202a accesses it and is not synchronized with it in any way except when the Communications Interface 201a requests some information from memory 204a. At that moment, the Communications Interface 201a syncs up with the Communications Adapter 202a until the information has been passed. Then, the Communications Interface 201a reverts back to its own speed and its own synchronization to interface with this buffer memory 204a. With regard to the Head Image Generator 220a, there is a more synchronous type of information transfer. The Head Image Generator 220a is synchronized with every memory cycle that the Communications Adapter 202a takes, whether or not it is to the Head Image or the Wire Image or Text Buffers in Memories 217a, 217b, FIG. 56N. Just prior to the Communications Adapter 202a taking any memory cycle, the Communications Storage 215a detects if the Communications Adapter 202a is going to the Wire Image or Text Buffer memory portions of memories 217a, 217b or whether it is not. If the Communications Adapter 202a is not going to these memory locations, it passes control to the Head Image Generator 220a to use if the Head Image Generator 220a needs it, at which time the Head Image Generator 220a will take two memory cycles, then stop and wait to see if the Communications Adapter 202a will require these memory portions of memories 217a, 217b on its next memory cycle. If the Communications Adapter 202a does require these memory portions of memories 217a, 217b including text buffers and wire images, then the Communications Storage 215a allocates them to the Communications Adapter 202a and locks out the Head Image Generator 220a for one Communications Adapter storage access interval.

PRINTER CONTROL UNIT CIRCUIT BLOCKS AND OPERATION

COMMUNICATIONS INTERFACE

The Communications Interface 201a, FIGS. 56A and 56B, consists of six major blocks. The first block is the Twinax Driver/Receiver block 260 between the host input on twinaxial cable 261 and the digital portion of the card. Block 260 consists of drivers and receivers of an analog nature that receive and buffer the analog signals coming from the host system 1 and that drive the analog signals going back to the host system 1 on cable 261. Block 260 includes a portion 260a with OTM (Oscillator Timing Module) and Discretes that are circuit components for handling received data signals. Out of this driver-receiver network the signals that are obtained are phase encoded. These go to the Link Control Module 262. Link Control Module 262 decodes the encoded data, that is, separates out the clock and the data information into separate lines that can now be used by the Coaxial Master Slice block 263. An oscillator 223 provides basic timings for block 262, typically at a 6 megahertz rate (6.00 MHZ). Master Slice block 263 is a digital control block that controls the writing of information to Random Access Memory 204a and that controls the receiving and transmitting of data to and from the host system 1. It obtains inputs from Link Control Module 262 and is also responsive to inputs from station address switches 165. It receives input from Random Access Memory 204a and supplies outputs to the Random Access Memory 204a. The Access Control and Timing block 264 which comprises Interface Control 203a exists to interface Random Access Memory 204a between the Coaxial Master Slice block 263 and the Communications Microprocessor 200a on a time-shared basis. The triangular shaped circuit elements in block 214 are gated amplifier circuits used for buffering purposes that are gated from block 264. Random Access Memory 204a has 1K bytes of storage and is a buffer for information coming over from the host system 1 and is written to and read by the Coaxial Master Slice block 263. It can also be written to and read by the Communications Microprocessor 200a. The triangular-shaped circuit elements in block 224 are gated amplifier circuits used for buffering of signals between the Communications Interface 201a and the Communications Adapter 202a. The Diagnostic Hardware and Sense block 265 controls diagnostic hardware within Coaxial Master Slice block 263 that can be used at card tasks and also may be used in on-line diagnostics within the printer. Note connection by way of the Bus and cable group E to FIG. 56N.

COMMUNICATIONS ADAPTER

Figure 56D:
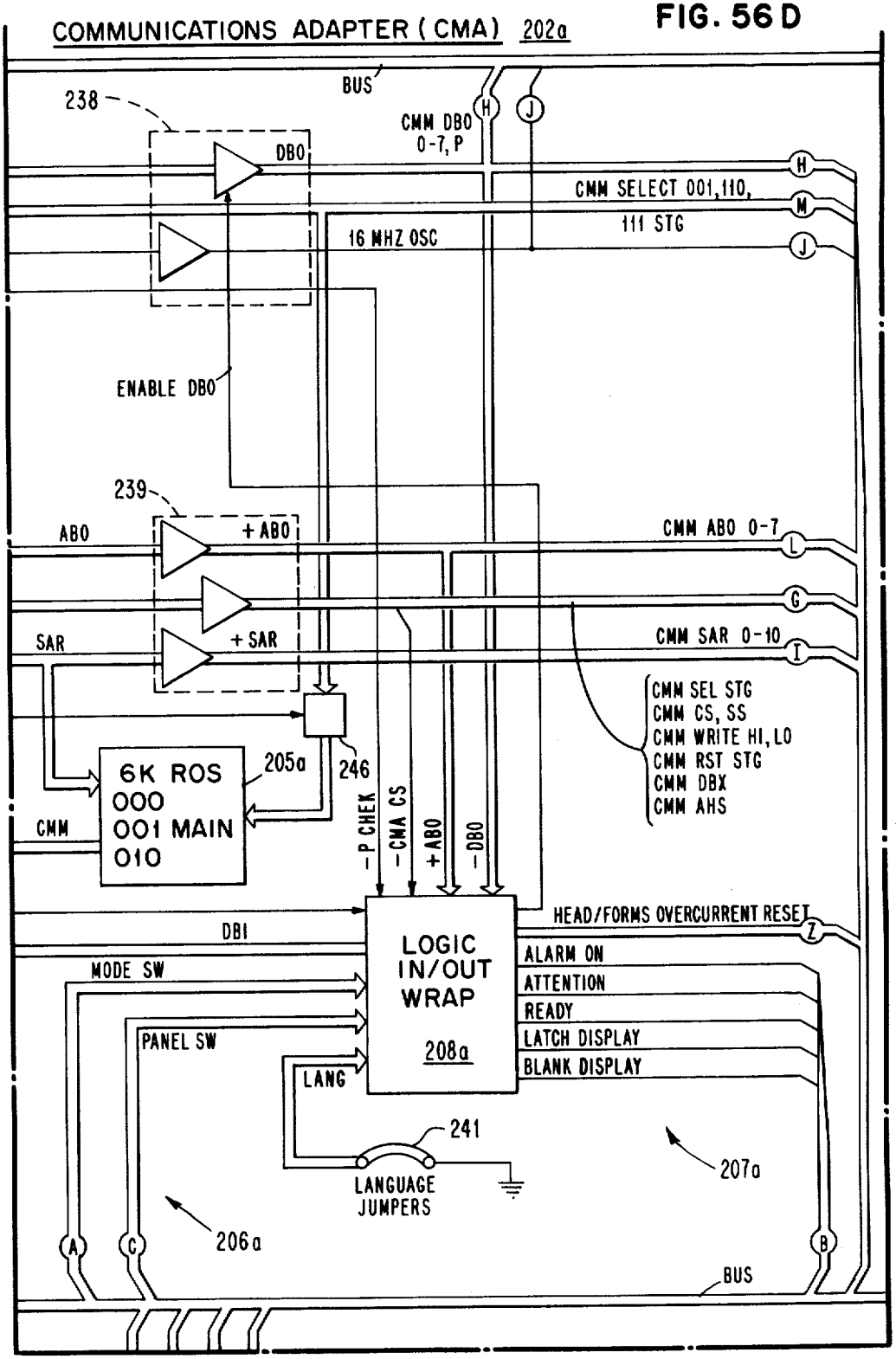

The Communications Adapter 202a, FIGS. 56C and 56D, has four major blocks within it. Two blocks 200b and 200c comprise the microprocessor 200a. Each block 200b, 200c has a respective diagnostic test point 218, 219. A 16 megahertz (oscillator 244 supplies basic timing signals for microprocessor 200a (and microprocessor 210a, FIG. 56E, and the cycle counter 271, FIG. 56I, for example). The Communications Microprocessor 200a obtains its program from the FSU Read Only Storage (ROS) Module 205a, FIG. 56D. There are six K bytes of program storage in ROS module 205a. Microprocessor 200a fetches its instructions from ROS Module 205a, and communicates with the Communications Interface 201a, the Control Adapter 211a and the Communications Storage 215a. Block 246 controls selection of ROS Module 205a and receives a Main Page Disable signal via cable MD from Page Select block 275, FIG. 56M, to disable Page 0 of Module 205a. The Logic Input/Output block 208a. FIG. 56D is utilized for diagnostics and also contains the logic required to output information to the operator panel 26 and receive information from the printer subsystem 2. Element 241 represents jumpers used to pre-select various language fonts for use by the printer subsystem 2. The triangular-shaped elements in block 238 and 239 are amplifier circuits serving as buffer elements in the buses and lines for signal transmission.

There are several major cables on the Communications Adapter 202a that cross card boundaries and that are of interest. The Storage Address Register (SAR) lines are memory address lines that originate from the Communications Adapter 202a. The CMA 202a goes to its own memory 205a and also addresses the memories 216a and 217a on the Communications Storage 215a and the Communications Interface memory 204a. The Data Bus Out (DBO), Cable H, is the bus on which all information to memory travels. It originates on the Communications Adapter 202a, travels to block 208a, travels to Memories 217a and 217b on the Communications Storage 215a, FIG. 56N, and to Memory 204a on the Communications Interface 201a, FIG. 56B. The Communications Storage Cable F, FIGS. 56B and 56C, as examples, has many sources, but just one control source, the Communications Adapter 202a. The output of the Communications Storage 215a, FIG. 56N, drives cable F. Also the output of the Communications Interface Memory 204a drives cable F. The Address Bus Out (ABO) cable L, FIG. 56D, from the Communications Adapter 202a supplies input/output addresses to Communications Storage 215a and to Control Adapter 211a.

Also emanating from the Communications Adapter 202a by way of cable B are various control type signals that go to the operator panel 26, such signals being derived from Mode/Op Panel Output 207a as turning the Attention light 56 on, turning the Ready light 57 on, latching the display 59, blanking the display 59, turning the alarm on. There are also inputs derived from Mode/Op Panel Sense 206a from the operator panel 26 by way of cable C so that the Communications Adapter 202a can tell when an operator panel 26 pushbutton, such as pushbuttons 51-53, have been pushed. It also can sense the status of the Mode Switch 65 by way of cable A for various diagnostic routines that are to be run on the printer.

There are also some general control type signals; that is, Select Storage, Control Storage, Write High and Low Storage, Reset Storage, Data Bit X and Address High Storage (AHS) signals that emanate from the Communications Adapter 202a by way of cable G that aid in the control of the memory read and write operations. These signals go to Communications Interface 201a, Communications Storage 215a and also to the Head Image Generator 220a. The Data Bus In (DBI) cable K has many sources, but only one control and that is the Communications Adapter 202a. This is the input line for I/O devices to pass information to the Communications Adapter 202a. It is driven by the Control Adapter 211a, FIG. 56E, and various other devices on the Communications Adapter 202a itself.

CONTROL ADAPTER

Figure 56E:
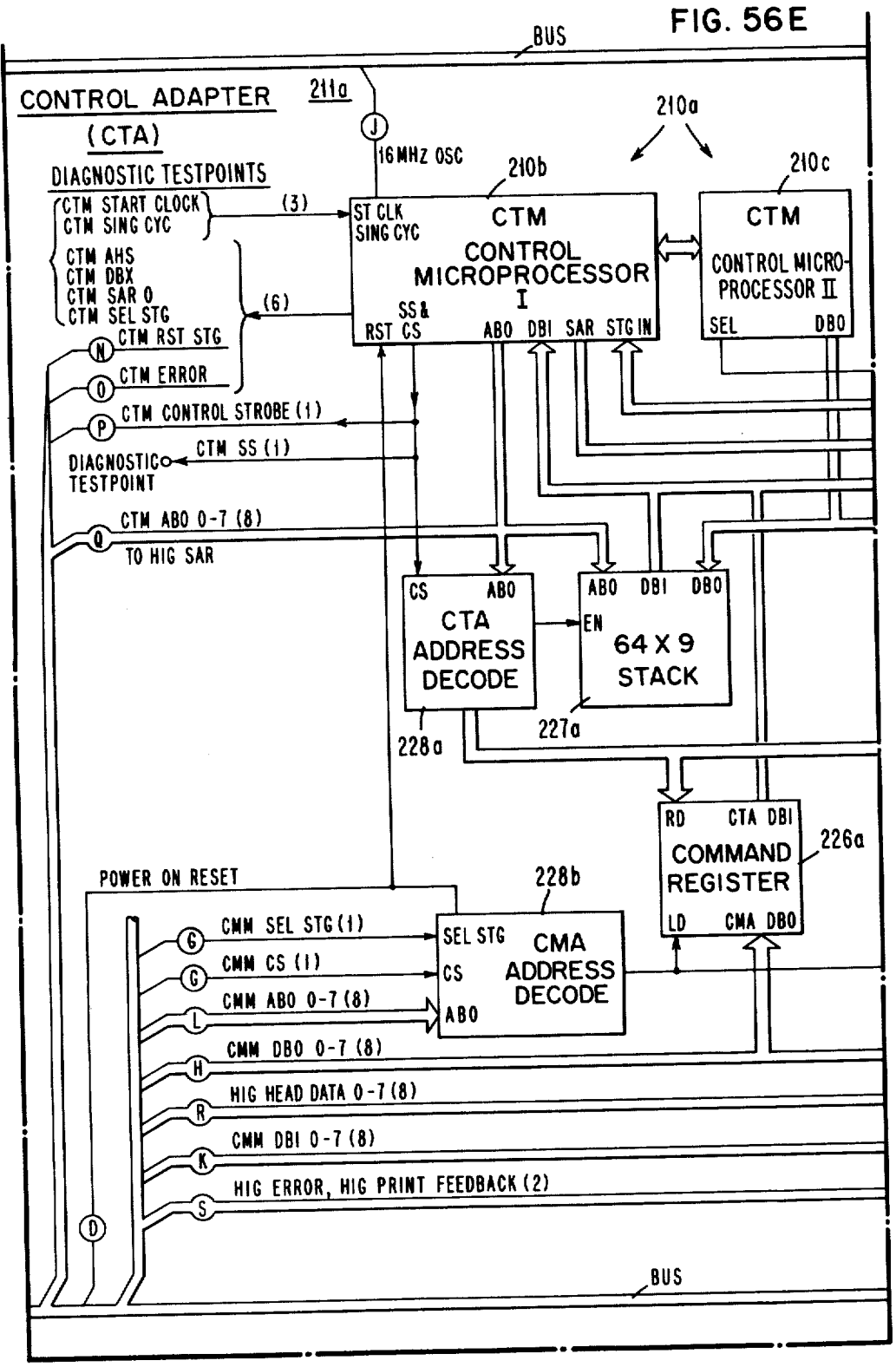
Figure 56:
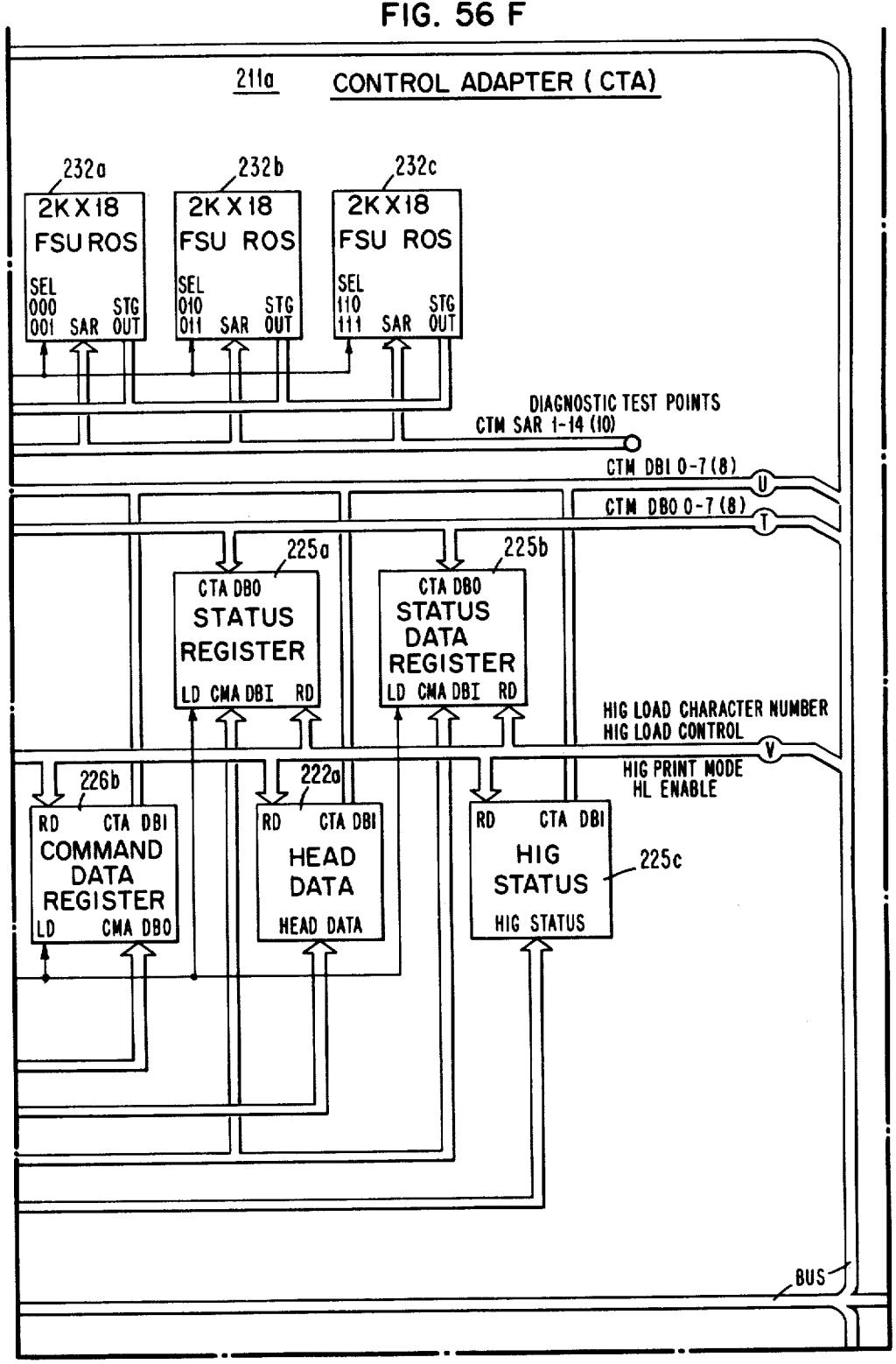

The Control Adapter 211a, FIGS. 56E and 56F, includes a microprocessor 210a comprising blocks 210b and 210c. It has 12K bytes of FSU Read Only Storage (ROS) modules 232a-232c that are dedicated to program and data that do not change. Within the control adapter 211a exist communications registers 226a, 226b, 225a, 225b, and 225c that allow the Communications Adapter 202a, FIGS. 56C and 56D, to talk to the Control Adapter 211a or to pass on information as to commands, such as print commands and forms commands. The status registers 225a and 225b Control Adapter 211a enable it to store information concerning printer status—if there has been an error out in the printer, a mechanical or an electrical error, or at what stage a command may be in. Controlling all of this are two address decode blocks 228a and 228b. Block 228a generates the signals to enable the use of the Communications Registers 225a, 225b, 226a, and 226b and allows the Control Adapter 211a to use a small scratch pad memory 227a. Memory 227a has 64 locations by 9 bits wide (that includes parity checking). Block 228a enables the Control Adapter 211a to input head data from the Head Image Generator 220a (HIG) by way of block 222a and to read the Head Image Generator 220a status (225c) as to whether or not there has occurred a Head Image Generator 220a error, which is a parity error. This may occur while the Head Image Generator 220a is reading from the Communications Storage card 215a, FIGS. 56L-56N, or in what is called a "print mode". This allows printing of every dot, whereas the Head Image Generator 220a normally only prints every other dot. In summary, Decode block 228a controls the Communication Adapter's access to these communication registers 225a, 225b, 226a and 226b. The Command Register 226a and Command Data Register 226b are the two registers through which commands pass from the Communications Adapter 202a to the Control Adapter 211a. The Status Register 225a and Status Data Register 225b pass the error codes or status information from the Control Adapter 211a to the Communications Adapter 202a. Registers 225a, 225b, 226a, 226b, and 226c have hand-shaking logic so that each processor 200a, 210a can asynchronously talk or pass information from one to the other.

There are many cables originating and returning to Control Adapter 211a, FIGS. 56E and 56F. There are Storage Address lines that are not used by any other card, but are for diagnostic purposes. These include Storage Address lines (See FIG. 56F, for example) going to the FSU ROS 232a-232c on the Control Adapter 211a. Also, it is the Control Adapter 211a Data Bus Out (DBO) cable T that contains the information going to output devices such as the Control and Sense 212a (FIG. 56P), Head Latch 213a (FIG. 56H), and the Head Image Generator 220a (FIG. 56K). Cable T is also used by devices on the Control Adapter 211a itself for purposes such as accessing the Communications Registers 225a, 225b, 226a, and 226b.

Figure 56H:
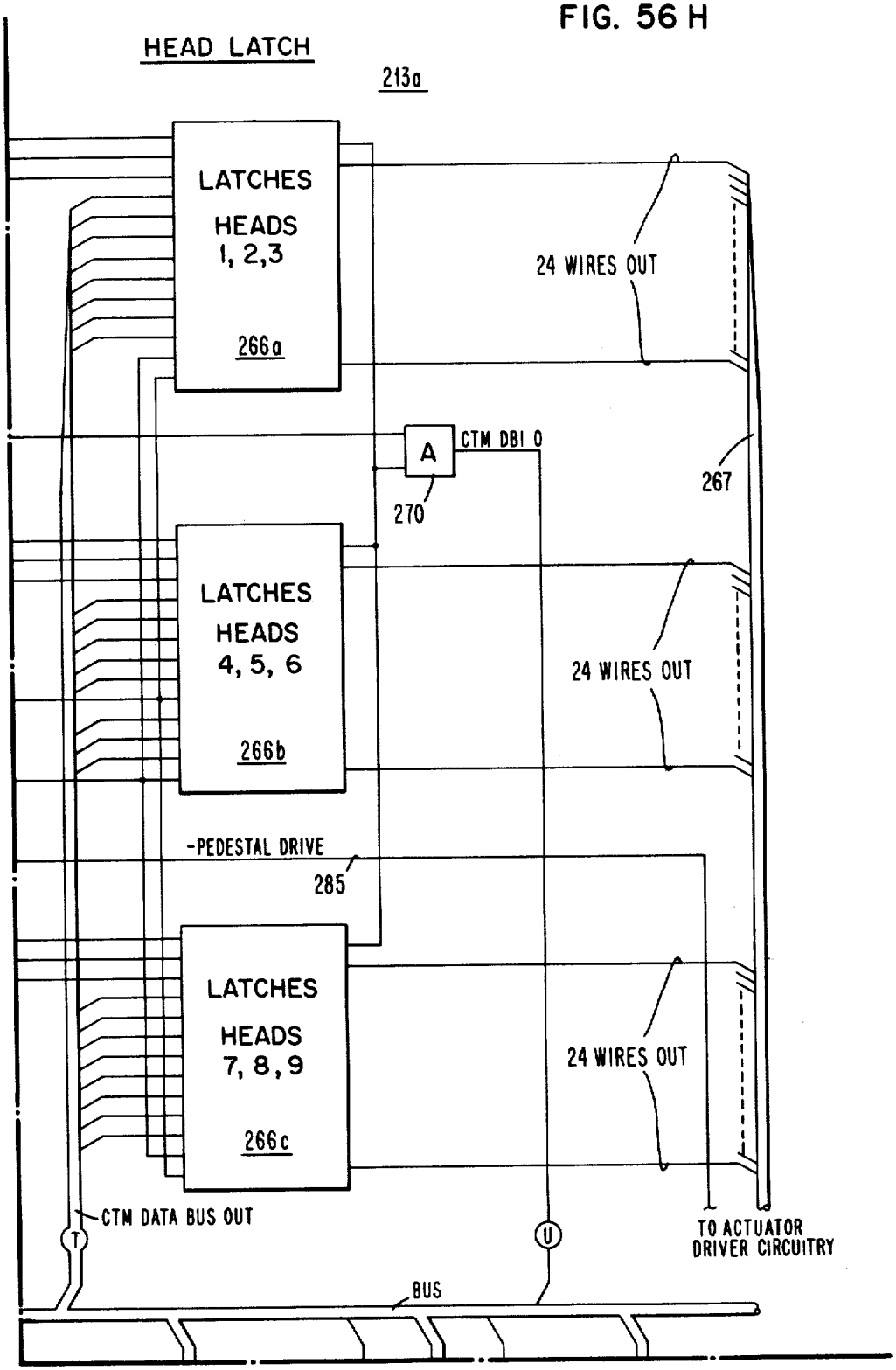
Figure 56:
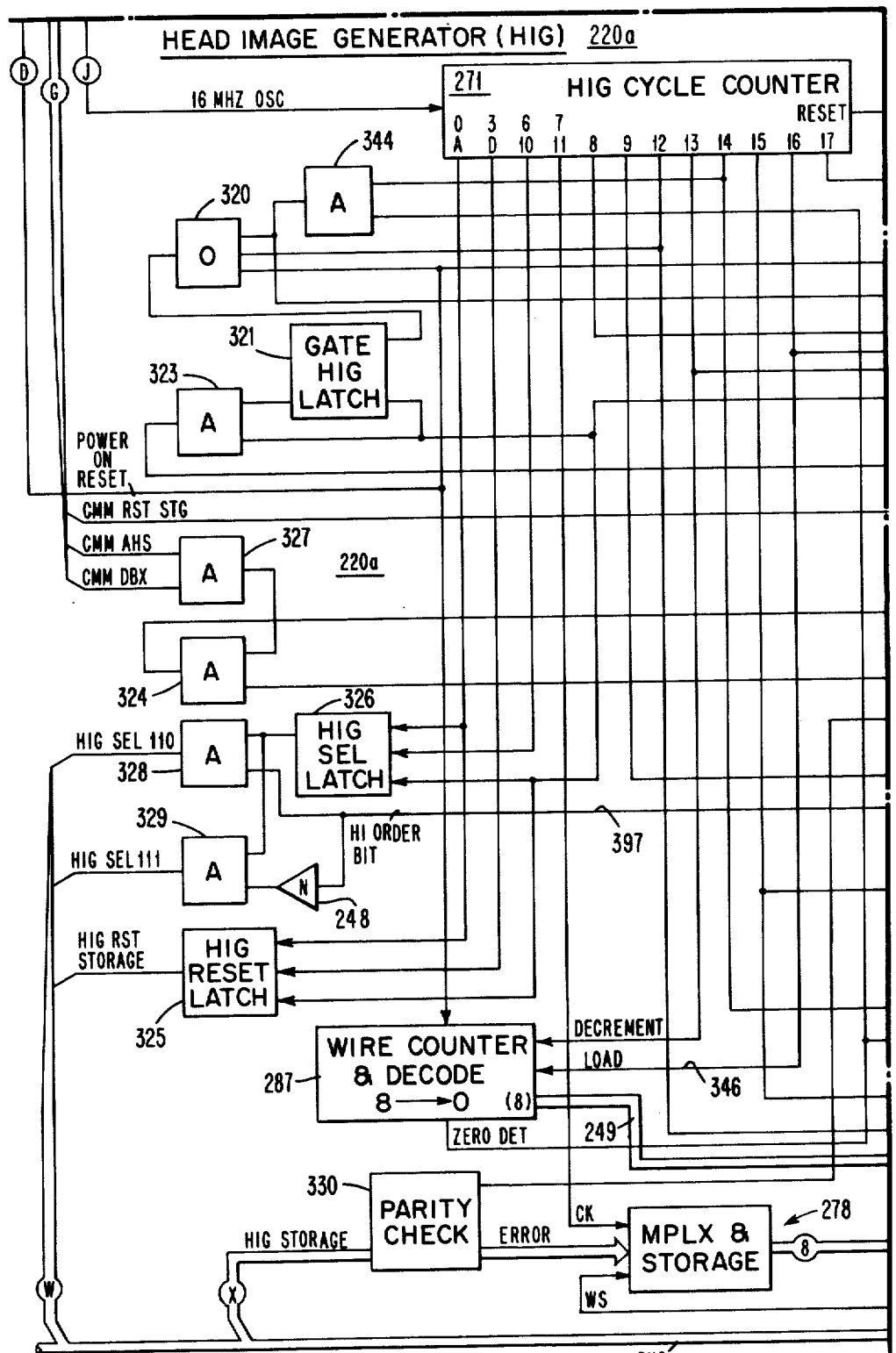
Figure 56:
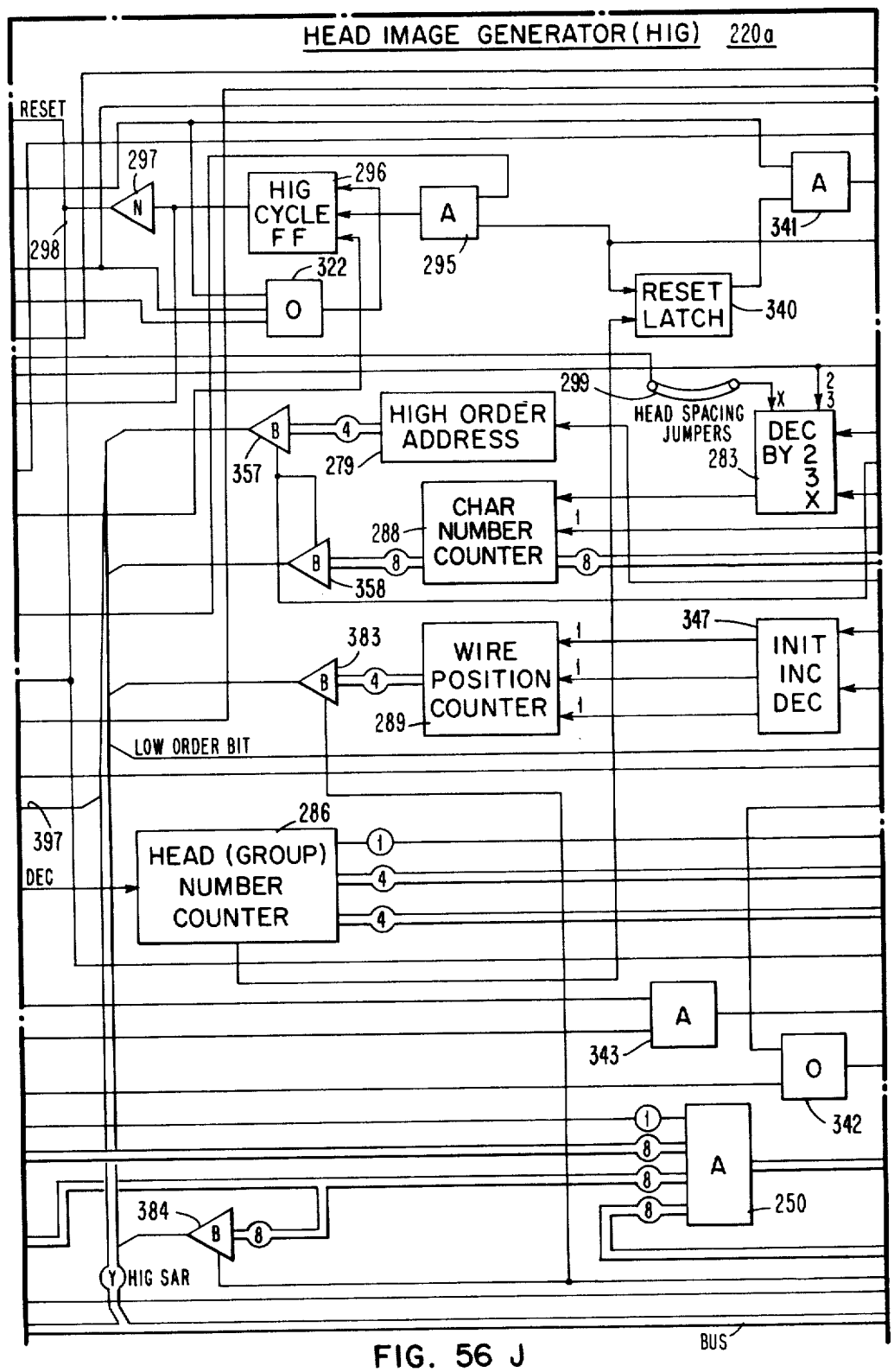
Figure 56:
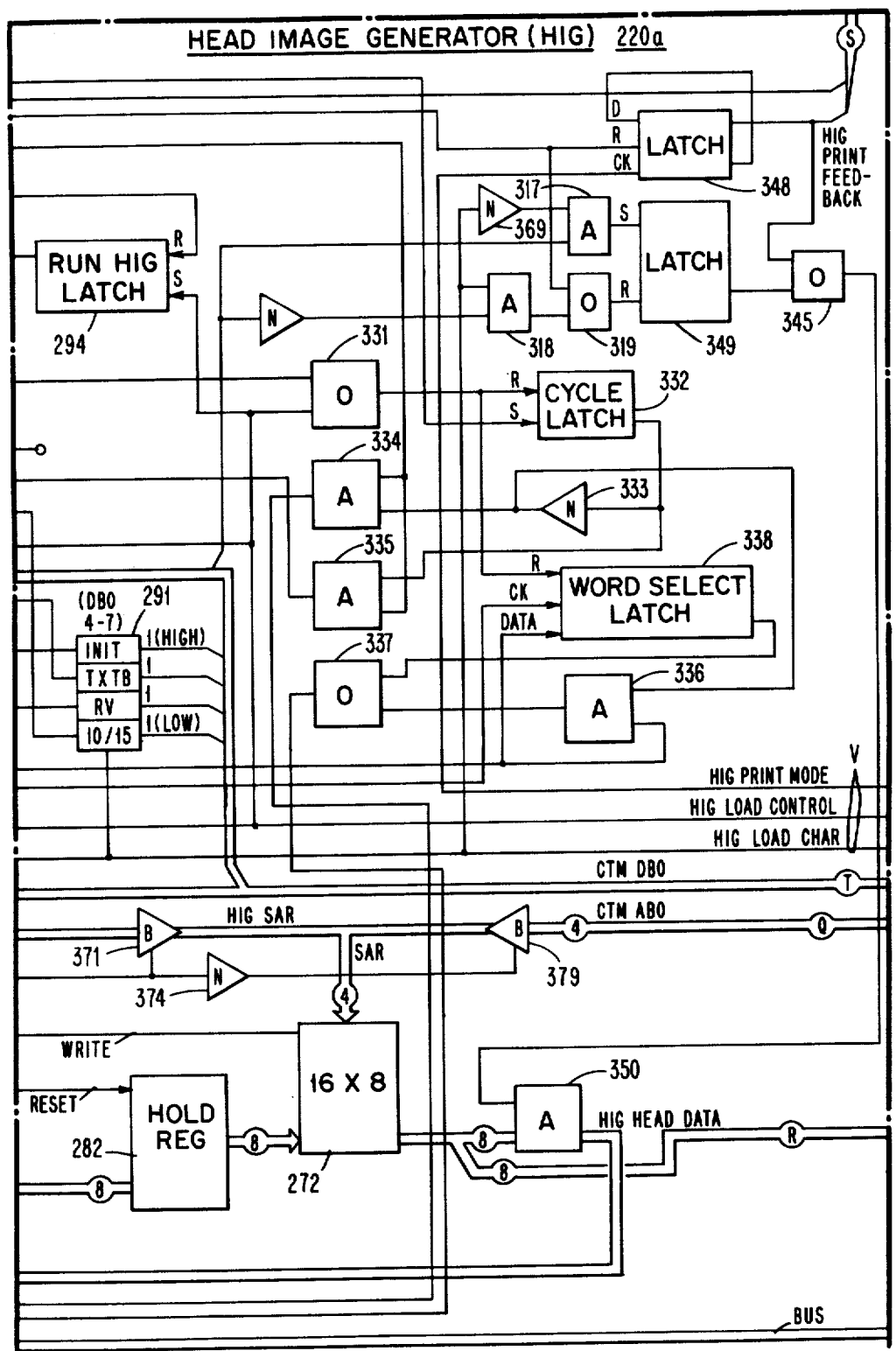
Figure 56:
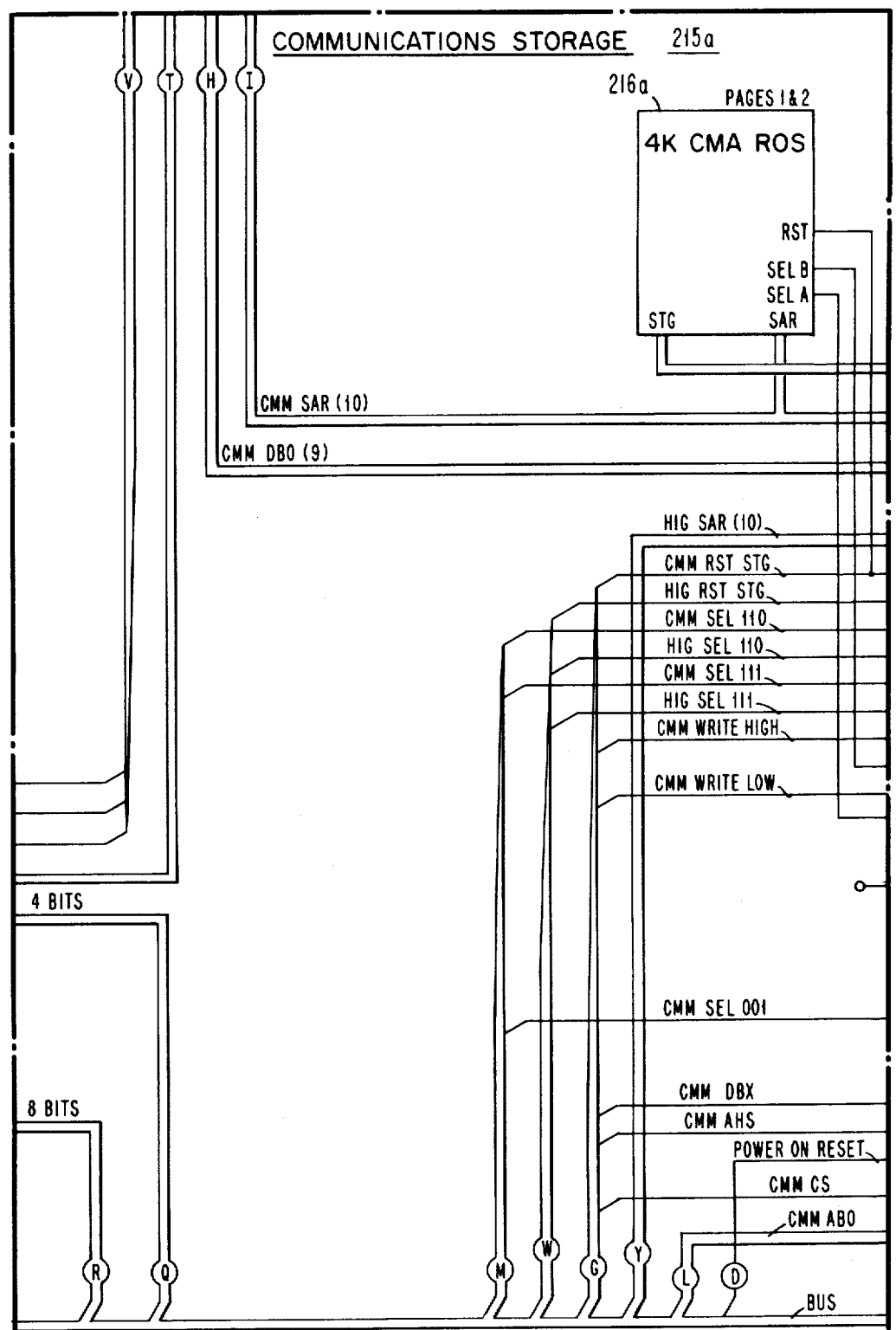

The Control Adapter Data Bus In (DBI), cable U, is a cable on which information is given to the Control Adapter 211a by various cards such as the Control and Sense 212a (FIG. 56P) and the Head Latch 213a (FIG. 56H). Also, devices on the Control Adapter 211a use it. The Control Adapter Address Bus Out (ABO), cable Q, carries the device address which the Control Adapter 211a is presently working with.

Also present on the Control Adapter 211a are various control signals on cable V that are routed to devices such as the Head Image Generator 220a to tell the Head Image Generator 220a which character it should start looking for in the Text Buffer or for loading control lines into the Head Image Generator 220a for the ten or fifteen characters per inch or the head direction. Other signals going to the Head Latch 213a enable it to perform operations at the specific times it is supposed to. The CMM Select Storage, cable G, is a gating signal that is specifically used after the Control Adapter 211a has received a Hardware Reset on cable D from the Communications Adapter 202a and after activation of the Address Decode 228b by signals on cable L. The signal releases the Hardware Reset to the Control Adapter 211a thus allowing it to start executing instructions at Address 0. Control Strobe (CS) coming from the Communications Adapter 202a, cable G, is a gating signal that controls when data is written into the Command Register 226a and Command Data Register 226b and also controls which register 226a-226b is chosen depending upon the state of the Address Bus Out, cable L.

HEAD LATCH

The function of Head Latch 213a, FIGS. 56G and 56H, is to interface between the Control Adapter 211a and the Actuator Driver cards. It contains three modules 266a-266c that contain registers in the form of latches. Control Adapter 211a receives the head data information from the Head Image Generator 220a, FIGS. 56I-56K, and passes it directly to the Head Latch card 213a into the individual latches in modules 266a-266c by cable 267.

The Address Bus Out, cable Q, coming into the Head Latch 213a, FIG. 56G, comes from the Control Adapter 211a. This is the address information to control which print head 34 is getting which head latch register within the head latch modules 266a-266c, FIG. 56H, which are provided information off of the Data Bus Out, cable T, coming from the Control Adapter 211a also. There can be up to eight print heads 34; so the procedure starts with head 1. Head 1 address is supplied to the head latch decode block 268 and head 1 wire data is provided on the CTM Data Bus Out cable T. Data Bus Out Bit 0 is the information for wire 1; Data Bus Out Bit 1 is the information for wire 2 within the head selected on the Address Bus cable Q. A gating pulse called Control Strobe coming from the Control Adapter 211a, cable P, tells the Head Latch modules 266a-266c when to latch the data information. Outputs go directly to the Actuator drive circuitry such as the actuator driver circuitry illustrated in FIG. 70 and on command from Control Adapter 211a, the Head Latch 213a decodes the command by way of Decode block 268 and Latch Wire Fire block 249, FIG. 56G, to fire the actuators 35 or not fire them so that the dots are printed in the proper character positions. There is, in addition, a Pedestal Drive signal on line 285 from Latch Pedestal block 259, FIG. 56G, that is used to start all actuators 35 at the same time. Latches 249 and 259 are reset at appropriate times by reset signals from respectively associated And circuits 273 and 274.

For diagnostics, there is a feedback by way of cable U from the output of all of latch modules 266a-266c controlled by blocks 269 and 270 so that all latch modules 266a-266c can be reset. This one feedback will tell if any latches in latch modules 266a-266c are still on. From there, one latch in modules 266a-266c is turned on at a time in this feedback check to be sure that the latch does come on.

HEAD IMAGE GENERATOR

The Head Image Generator 220a, FIGS. 56I-56K, has many sub-blocks within it. Its major function is to take unslanted character information and slant it and distribute it across all print heads 34 to be able to print it in the slanted head and image format. It consists of a master HIG cycle counter 271, FIG. 56I, and it also has some internal registers, such as Character Number register 288, FIG. 56J, and counters, such as Head (Group) Number Counter 286, FIG. 56J, that keep control of which character it is dealing with and at what time and at what location in the printline it is generating the information for. HIG 220a accesses the Communications Memories (217a and 217b) twice for each single memory cycle that the Communications Adapter 202a will take. Thus, storage access is interleaved with the Communications Adapter 202a. The HIG 220a can only access memories 217a, 217b when the Communications Adapter 202a is not going to access them. It makes these decisions through logic on the Communications Interface 201a, and the timing is controlled by the HIG cycle counter 271. Basically, the HIG 220a pulls out information from the text buffer in Memories 217a or 217b first to find out what character it needs to look up the information, and then it will obtain information from the wire images in memories 217a or 217b. It takes this information, selects the one print wire 33, or one bit worth of information, that it needs to load for a particular wire 33 within a particular head 34 and stores this in a small scratch pad Memory 272, FIG. 56K. Memory 272 is later read by Control Adapter 211a and outputted by Cable T to the Head Latch modules 266a-266c, FIG. 56H, for the print wire actuators 35 to be fired. Memories 217a and 217b on the Communications Storage card 215a store two lines of text to be printed in an alternate fashion. One line of text can be received from the Communications Adapter 202a and the Head Image Generator 220a can then start pulling characters from that line of text while the Communications Adapter 202a stores characters of another line of text. Normally, this will alternate back and forth. While the Head Image Generator 220a is reading one line of text, the Communications Adapter card 202a is writing another line of text into the memories. The Head Image Generator 220a is informed by the Communications Adapter 202a which line of text to work onto build the slanted infomation and also what character density the printer is currently printing in, that is, ten characters per inch or fifteen characters per inch. Text information and characters-per-inch information is sent by the Control Adapter 211a to the Head Image Generator 220a. One other piece of information that is necessary for the Head Image Generator 220a is the number of print heads 34 or actually the character spacing between heads 34 for each printer configuration. These are Head Spacing jumpers 299, FIG. 56J, that are pre-wired. They are in the "X" control line to block 283, FIG. 56J. Once these jumpers 299 have been selected, then the Head Image Generator 220a will always build character information, that is, slanted information, for the pre-wired number of heads 34 and the particular distance between the heads 34. The HIG Head Data, cable R, carries slanted wire information coming from the Head Image Generator 220a to the Control Adapter 211a. The HIG cable S coming from the Head Image Generator 220a carries signals indicative of HIG Error and HIG Print Feedback.

COMMUNICATIONS STORAGE

Figure 56M:
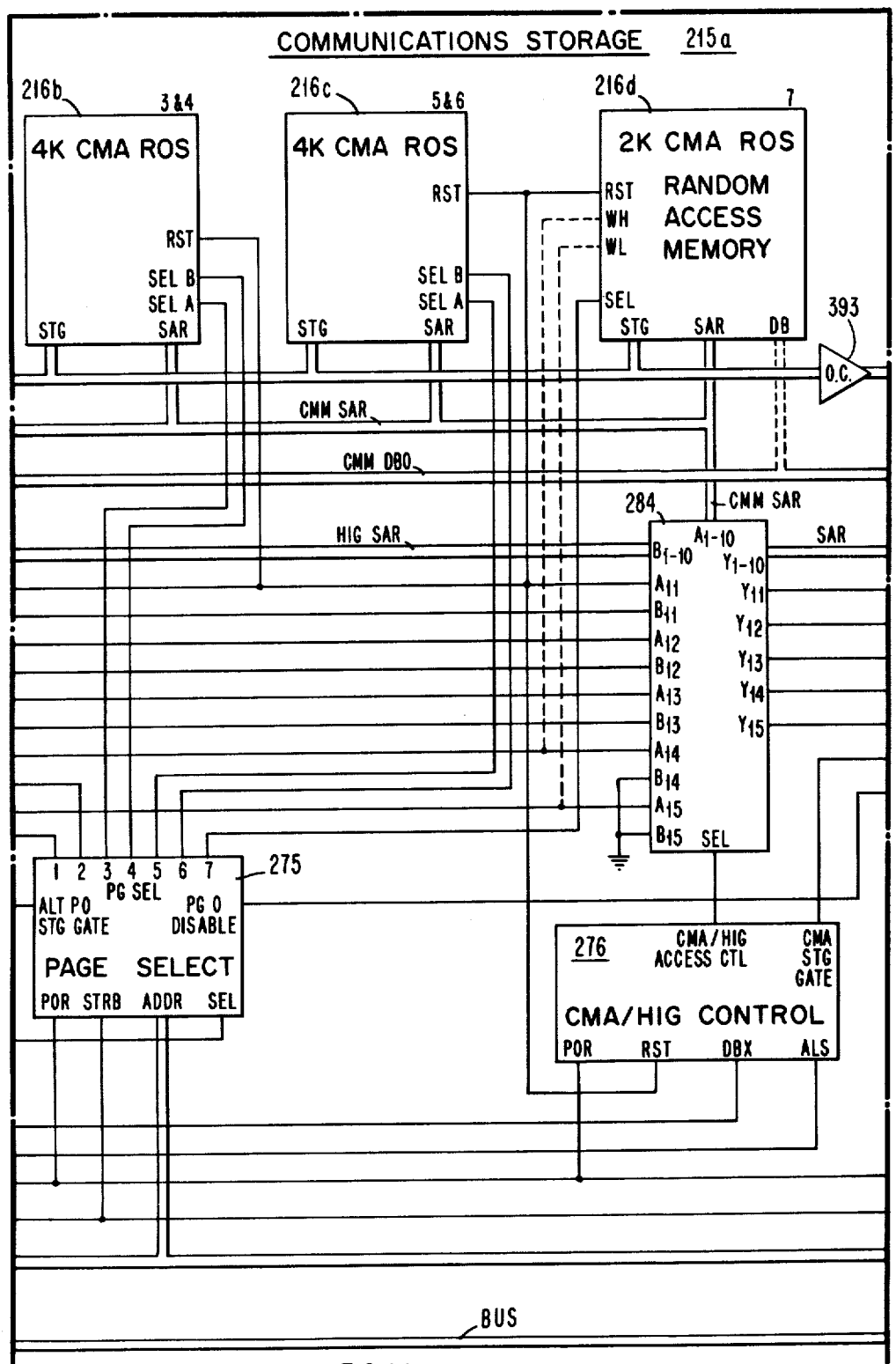
Figure 56:
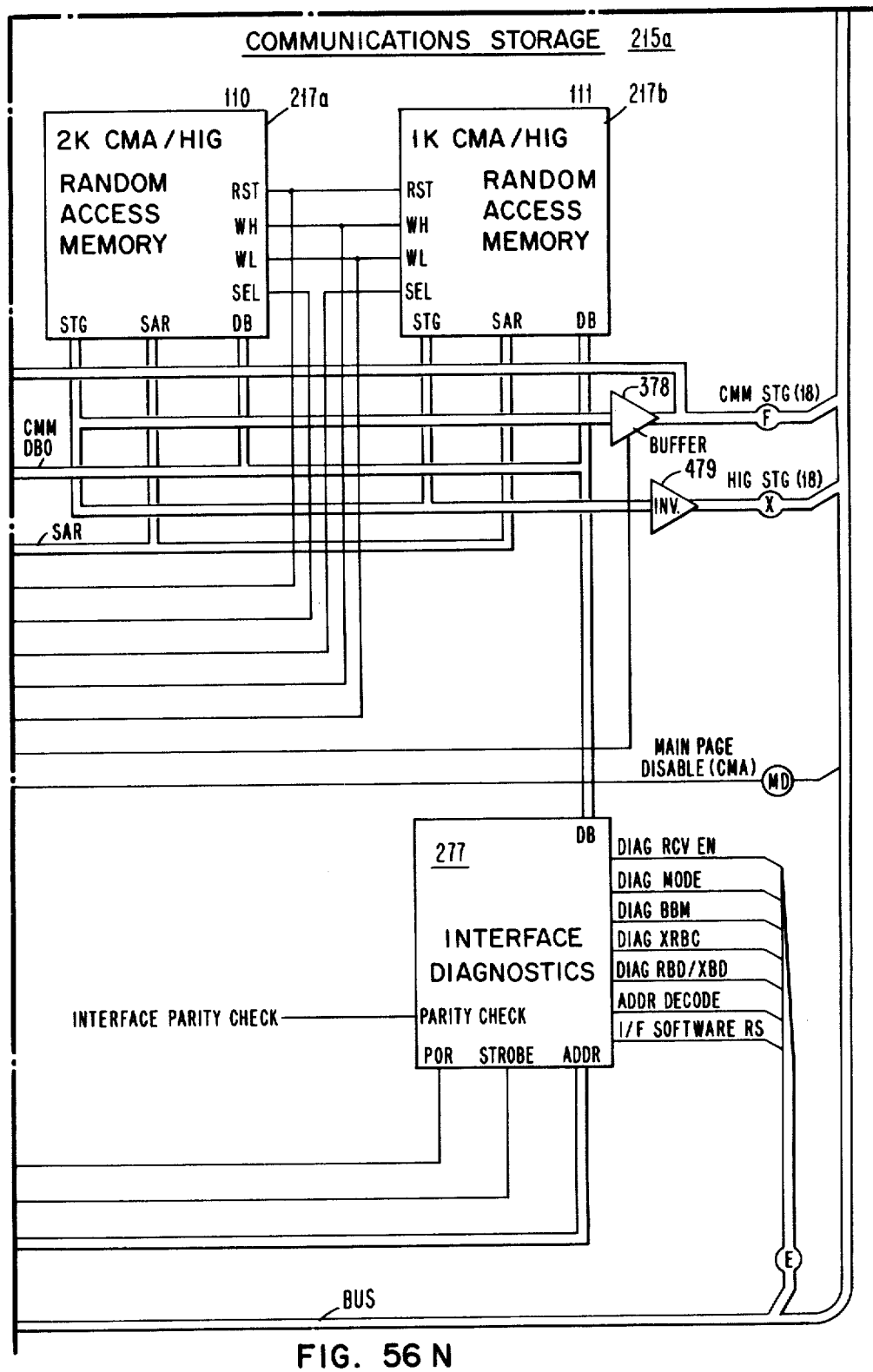
Figure 56:
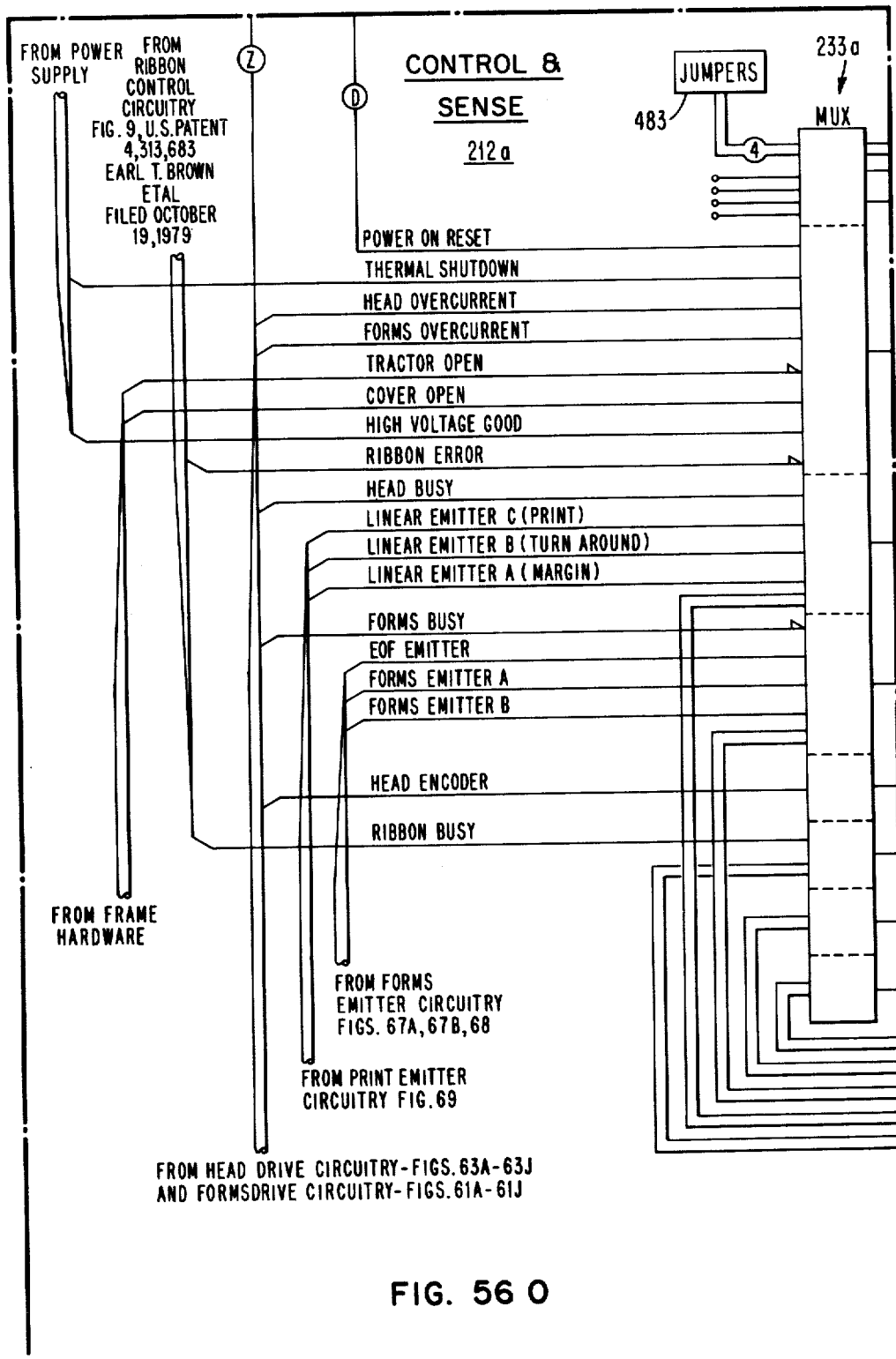
Figure 56:
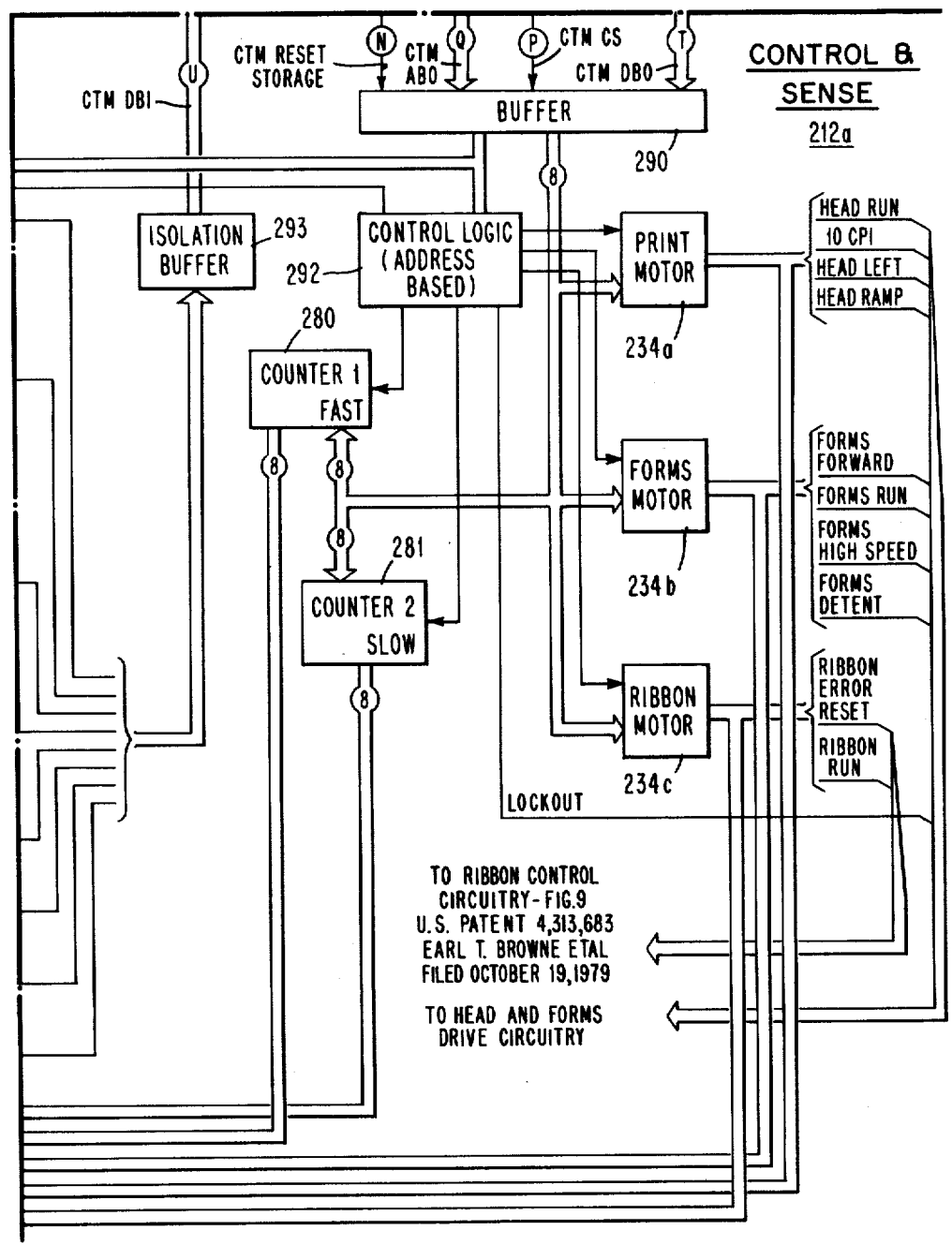

The Communications Storage 215a, FIGS. 56L-56N, mainly consists of program storage in Read Only Storage (ROS) modules (216a-216d) and some Random Access Memory modules (217a, 217b) for scratch pad type information and control signals interfacing the Communications Adapter 202a with the Head Image Generator 220a. The layout of modules 216a-216d and 217a, 217b is shown in FIG. 58. Modules 216a-216d have 14K bytes of storage. Page select logic 275, FIG. 56M, can select any unit of 2K bytes out of the 14K bytes in modules 216a-216d to be used at any one time, that is, not all of memory is available constantly; the memory is paged. Storage output is through the O.C. (Open Collector) amplifier circuit 393 to cable F, FIG. 56M. Memories 217a and 217b, FIG. 56N, have 3K bytes of storage. Storage output is by way of amplifier circuit 478, FIG. 56N, serving as a buffer circuit, to cable F.

The way the memory pages are selected is on an Address Bus Out (ABO) type configuration; that is, the first page of ROS has a particular address value assigned to it and when that address is present from the Communications Adapter 202a and the Communications Adapter 202a Control Strobe becomes active, it will select the particular page that is assigned that address number. The Communications Adapter 202a keeps track of which page it is in, and advises when another page of memory is needed. The highest 2K bytes in ROS 216d store all font images that are available for use by the printer.

The Communications Adapter (CMA) HIG Control block 276, FIG. 56M, allows the HIG 220a to access the wire image memories 217a and 217b that contain the unslanted character information and also the text buffers which have the characters to be printed. This is done by Select block 284, FIG. 56M, which selects the HIG storage address lines in this case and which otherwise selects the Communications Adapter Storage Address lines. It allows the HIG 220a to select Memories 217a, 217b as needed without interfering with the Communications Adapter 202a. The Communications Adapter 202a can write or read from memories 217a, 217b at any time it is necessary, and the HIG 220a is interleaved within these accesses with the Communications Adapter 202a.

Interface Diagnostic block 277 allows the Communications Adapter 202a to run diagnostics on-line or off-line, by way of cable E, FIGS. 56N and 56A, any mode that it wishes, referring against the Communications Interface diagnostics, block 265, to determine if there are any problems.

Storage, cable X, via amplifier circuit (INV.) 479 carries data going to the Head Image Generator 220a. This is the output from the wire image and text buffer memories 217a and 217b transferred to the Head Image Generator 220a when the Head Image Generator 220a requests information for its wire image operation. Input from the Head Image Generator 220a to the Communications Storage 215a is by way of the HIG SAR cable Y, FIGS. 56L and 56M, which are the Address Lines for memories 217a, and 217b when HIG 220a has access, and the HIG Select Storage lines, cable W, which informs the Communications Storage 215a which of the two memories 217a or 217b the Head Image Generator 220a needs to access.

CONTROL AND SENSE

The major function of Control and Sense 212a, FIGS. 56O and 56P, is to interface between the Control Adapter 211a and printer electronics 4 signal lines shown in FIG. 56O. It performs control and sense functions in that it can read status information from the printer subsystem 2, from the power supply 245, from the mechanics (such as the covers 11,12) and also electrical information (such as linear emitters and forms emitters and busy signals or ribbon error). Such signals are fed through Control and Sense 212a back to the Control Adapter 211a through the Multiplexer 233a. Inputs are also supplied to Multiplexer 233a by way of jumpers 483 as to the number of print heads 34, being in s representative case two, four, six or eight print heads. Control and Sense 212a also handles command information from the Control Adapter 211a going out to the electromechanical parts of the printer subsystem 2. These include commands telling the print heads 34 to move, at what direction and what speed; telling the forms 15 to move, at what direction and what speed; and also telling the ribbon 41 to run or to reset an error condition. Within Control and Sense 212a there are two interval timers 280 and 281. Timer 280 steps and counts on a three microsecond clock speed, for example, that is, at three microsecond intervals. It can be loaded from the Control Adapter 211a, and it can be read by the Control Adapter 211a. This is to aid in the realtime functions of Control Adapter 211a, such as error detection of emitters (are they too soon or too late or are they just at the right time). It also aids in scheduling functions before it has to perform another function. The second counter 281 is a slower counter. It steps and counts at a millisecond rate, for example. It is for other functions such as timing the print heads 34 off of the ramp.

Signals emanating from the Control and Sense 212a, FIGS. 56O and 56P, go to a number of different circuits for controlling the print heads 34, forms 15, and ribbon 41. See FIG. 56P especially. For the print head 34 there exist signals to tell the electronics 4 to initiate head run, the character per inch speed to run the print heads 34, in which direction, or if it is going on to the ramp. Signals are provided to control the forms 15 to run, whether forms 15 should be in high speed and in which direction they should move. As to the ribbon control circuits, there exist basically just two signals. One advises the ribbon 41 to run, the other to reset an error if the ribbon circuits report one.

Signals coming into and terminating at the Control and Sense 212a, FIG. 56O come from various sources. For example the Frame Hardware provides signals to indicate Tractor Open or Cover Open. The print circuitry, FIG. 69, emitter presents signals from the print emitter assembly, FIG. 7. From the Head and Forms Drive circuits, FIGS. 63A–63J and FIGS. 61A–61J, come feedback information on the head drive phases advising that the print heads 34 are busy, Head Busy. Forms Busy advises that forms 15 are in movement and Forms and Head Overcurrent occurs if mechanical binding or some failure has occurred. The overcurrent status is reported back to the Control Adapter 211a. From the forms emitter circuits, FIGS. 67A, 67B, and 68 are presented Forms emitter A and B signals and an End of Forms (EOF) emitter signal which advises that the printer needs more paper. From the Ribbon Control circuitry, such as shown in FIG. 9 of the U.S. patent application Ser. No. 086,567 cross-referenced above, is reported Ribbon Error and/or Ribbon Busy if the ribbon 41 is currently running. On the Control and Sense 212a, the Data Bus Out contains individual bits of information that are latched up and that go out to the electronics 4. As an example, for a particular Address Bus Out (ABO) address on cable Q indicating Print Motor block 234a the corresponding data on cable T is entered in Buffer 290 to indicate head run information, character density information, head direction, or head ramp. Four bits of data are set in buffer 290. The Control Logic 292 recognizes the occurrence of a Control Strobe Signal, cable P and controls the Print Motor block 234a to latch the information when it is all present. The same applies to the Forms Motor block 234b which has a different ABO address. The Control Logic 292 operates in a similar way for blocks 234b and 234c.

Information coming back from the printer electronics 4 is grouped according to an address on the ABO lines again. The Control Adapter 211a presents a particular address on cable Q. This gates the information from either the Emitter circuitry, FIG. 69, or the Head Drive circuitry, FIGS. 63A–63J or the Forms Drive circuitry, FIGS. 61A–61J through Multiplexer 233a—whichever device is specifically selected by the address on the Address Bus Out lines. This information is transferred through the Isolation Buffer 293 to the Control Adapter Data Bus In cable U so that the Control Adapter 211a can read the status. The Address Bus Out lines, in this case, are not gated by any special signal, but become effective as soon as they are activated.

FIG. 58 shows the layout of the Read Only Storage (ROS) and Random Access Memory locations utilized by Control Adapter 202a and primarily located in the Communications Storage 215a. Some of these locations are also utilized by the Head Image Generator 220a.

On the left part addresses are shown as they would apply in the machine. These are four-digit hexadecimal (Base 16) addresses. The microprocessor 200a uses the three low order digits. The first addresses are 0000 to 0800 which would indicate a 2K or 2048-byte segment of memory. This is executable code containing the main program entry point. From 0800 to 1000, there are multiple segments of code by the same address called "overlays". Each overlay is accessed by an OUT command with a number associated with it. There are five separate overlays that can be accessed within the addresses 0800 to 1000; the first overlay being the main overlay of 80; the second one, overlay 81; the third one, 82; the fourth one, 83; and the fifth one, 84. Only one of these overlays 80–84 may be accessed at a specific time until another OUT command selects another overlay.

The addresses 1000 to 1800 are basically still addresses 000 to 800, but serve as data memory versus executable memory. This is where the 2K (2048) bytes of wire image ROS are placed. This is the compressed images used for printing and is where all 16 fonts, or representative images, are stored in the compressed mode to be uncompressed later into Random Access Memory. Starting at location 1800 is where the Interface Random Access Memory Buffers are located, Buffer 1 being at 1800, Buffer 2 at 1900. Each buffer is 256 bytes long. No memory is located from locations 2000 to 3000. A select byte called the X-byte, if off, will select locations 0000 to 2000, and if on, will select locations 2000 to 4000. There are data bytes and instruction bytes in the machine, with the X-byte affecting both data and instructions. With this capability, the Interface Buffer is selected with the X-byte off; the Text Buffer is selected with the X-byte on. By internal wiring, any access to any memory in locations 2000 to 3000 will access locations 0000 to 1000. This prevents having to duplicate code when the X-byte changes. Otherwise, it would be necessary to have another Read Only Storage with exactly the same code in both places. By wiring one ROS as if it were in both places, the microprocessor 200a executes this code independently of the X-byte.

Starting at 3000, there are 3K (3072) bytes of Random Access Memory 217a, 217b in which the wire images are built from the 2K bytes of wire image ROS located at 1000. The addresses starting at 3000 are the addresses used for all wire images. In effect, the subsystem is using three digits, which would be 000 to 8FF in this wire image random access memory 217a, 217b. All images are stored as 9 slices. By using the first of the three digits to indicate the slice, the next two digits represent the EBCDIC or Extended Binary Coded Decimal Interchange Code value of the characters as sent over by the host system 1 or other source. For example, if the first slice of the letter "C" is required, which is an EBCDIC C3, then the subsystem 2 looks in location 0C3 for the first slice of the image, 1C3 for the second slice of the image, etc. for the letter "C". The last portion of the memory is not used.

This is basically the layout of memory, both random access memory 217a, 217b and Read Only Storage (ROS) 216a–216d for use of the Communications microprocessor 200a and Head Image Generator 220a.

DETAILED OPERATION OF HEAD IMAGE GENERATOR

The Head Image Generator 220a functions to generate wire images at high speeds for the printer previously described having the slanted serrated wire arrangement. A printer of this nature typically will have anywhere from two to eight print heads 34, each with a plurality of print wires 33, such as eight in number. Reference is again made to FIG. 35 which depicts generally the relationship of the Head Image Generator 220 with respect to the two microprocessors 200 and 210 as well as a Random Access Memory 217. Memory 217 in a representative system is 3K bytes in size.

The Head Image Generator 220a interfaces with the two microprocessors 200a, 210a and receives all its control data for initializing and loading the necessary information in order to start the cycles to create unique wire images for the slanted print wire head configuration.

In order to grasp the nature of the Head Image Generator (HIG) function, it is important to understand the transition from the traditional concept of matrix printing to the slanted group configuration. Conventionally, the print heads heretofore known are moved one step at a time horizontally across the character matrix with the option of firing all wires in such heretofore known print heads within each vertical slice of that character's image. Therefore, in order to print the character H (FIG. 33A), a known head carrier sweeps along the print line and leaves 7 dots on slices 2 and 8 and 1 dot on slices 4 and 6. Other characters such as those in FIG. 30 are handled in a similar fashion.

To print the same character with the slanted arrangement of the present system, there is a much wider sweep across the character. Instead of having all the wires 33 within each character slice, each wire 33 is two characters apart, as illustrated in FIG. 37. Therefore, the printer fires only one wire 33 at a time within any given character.

To implement this function and considering FIGS. 56A–56P, but especially considering FIGS. 56I–56K, the Head Image Generator 220a goes through two storage access cycles to generate each individual dot or option. In order to keep track of the different characters on a given line, wire matrix positions and number of groups, the Head Image Generator 220a uses a diversity of counters such as counters 286 and 289, FIGS. 56J. The final slanted wire image data corresponding to one machine wire fire is stored in the small memory 217a and 217b, FIG. 56N, and finally addressed by Control microprocessor 210a, FIG. 56E, to later command the firing of the wires 33. A Power On Reset signal by way of cable D (in circle), FIG. 56I, prepares the HIG circuits for operation by providing a signal to reset Wire Counter and Decode block 287 and by way of Or circuit 320 to reset the Gate HIG latch 321 and HIG Cycle Flip-Flop 296 (through Or circuit 322). Also, latches 348 and 349, FIG. 56K, are reset.

Normally, output from And circuit 350, FIG. 56K, feeds back to the lowermost input of And circuit 250, FIG. 56J, to prevent printing of dots in two adjacent columns. If it is desired to enhance the printing by printing dots in every column then latch 348 is set by a signal on the HIG Print mode line. The output of latch 348 by way of cable S (in circle) verifies its status. The output through Or circuit 345 to And circuit 350 results in a "1" input to And circuit 250, FIG. 56J, to allow the printing of dots in every column. Latch 349 is set at the beginning of every print line to allow printing of the very first print column or option in the succeeding line of printing regardless of what style of printing occurred in the previous line. Set and Reset of latch 349 involves blocks 317, 318 and 319. Block 369 is a Nand circuit which provides an inverted input to block 317.

HIG INITIALIZATION

First, the Communications microprocessor 200a loads the information into text buffers contained within the 3K memory area, FIGS. 56N and 58. Control microprocessor 210a has the task of loading the Head Image Generator 220a with two bytes of information provided on the CTM Data Bus Out cable group T, FIGS. 56F, 56J and 56K. The first byte, bits 4–7, goes to register 291, FIG. 56K includes an initialization bit (INIT) to initialize Wire Position counter 289, a text buffer bit (TXTB) to select which text buffer is the source of data, by way of High Order Address block 279, and also contains information as to character density (10/15), head direction (RV), and other bits go to Counter 286, FIG. 56J, to indicate the number of groups found in that machine. The second byte loads the Head Image Generator 220a in counter 288 with the rightmost character to be printed, which always corresponds to wire 8 of the rightmost group (the Head Image Generator 220a works from right to left.) The loading of these characters is controlled by load control and load character signals in the cable group V, FIGS. 56F, 56K and 56J. After the two bytes are loaded, the HIG 220a waits for the Communications microprocessor 200a to allow it to start the memory cycles under control of Cycle Counter 271, FIG. 56I, and CMA/-HIG Control 276, FIG. 56M.

A signal on the Head Image Generator Load Control line, cable group V, FIG. 56K, resets Cycle Latch 332 and Word Select Latch 338 through Or circuit 331 and also sets the Run HIG Latch 294 and in turn conditions And circuit 295 in FIG. 56J and presets HIG Cycle Flip Flop 296 which by way of the Nand circuit 297 and line 298 resets the HIG cycle counter 271, FIG. 56I in readiness for a complete HIG operating cycle. Another input to And circuit 295 is from And circuit 324, FIG. 56I, which has further inputs from And circuit 327, FIG. 56I. The two inputs to And circuit 327 plus the CMM Reset Storage (RST STG) signal, FIG. 56I actually control the counting of HIG Cycle Counter 271. Also, Gate HIG Latch 321, FIG. 56I, is set on by the signal from the HIG Cycle Flip-Flop 296 and latches And circuit 323 which provides gating inputs to And circuits 334 and 335, FIG. 56K. The outputs of And circuits, such as And circuits 334 and 335, are used to control tri-state circuits (B) such as circuits 357 and 358 in FIG. 56J. The output from Run HIG Latch 294 is further supplied to a Reset Latch 340 which conditions one input of And circuit 341 so that later, a signal from output 17 of HIG Cycle Counter 271, FIG. 56I, can be utilized to reset Run HIG latch 294.

The operating cycles of the Head Image Generator 220a and the cycle counter 271 are as follows:

OPERATING CYCLES HIG CYCLE COUNTER

| Cycle | Action |
|---|---|
| 0 or A | Both of these pulses turn "on" HIG Reset Latch 325 and the HIG Select (SEL) Latch 326 to enable access of the 3K random access memory and to initiate the HIG memory selection cycles by way of And circuits 328 and 329 and the output of Latch 325. A "Hi (High) Order Bit" signal on line 397 further gates And circuit 328 and the inverse of that signal through Nand circuit 248 gates And circuit 329. |
| 3 or D | Both pulses turn off HIG Reset Latch 325. |
| 6 or 10 | Pulses turn off HIG Select (SEL) Latch 326. |
| 7 or 11 | Pulses gate valid data to Multiplex and Storage block 278 in conjunction with Parity Check block 330 for use by HIG 220a in generating proper wire images. |
| 8 | pulse sets the cycle Latch 332, FIG. 56K, to start the second memory cycle. Also involved are blocks 333–335, FIG. 56K. |
| 9 | Pulse gates wire image address to bus by way of Word Select Latch 338, FIG. 56K, an output of which through Or circuit 337 provides another input to the Multiplex & Storage block 278, FIG. 56I. Outputs of block 278, FIG. 56I, go to And circuit 250, FIG. 56J, and also by way of gated amplifier circuit 384, FIG. 56J, serving as a buffer circuit, to cable Y, HIG Storage Address Register. |
| 12 | Pulse gates the masked bit from the Gate 250, FIG. 56J, to the Hold Register 282, FIG. 56K. It also resets Gate HIG latch 321 through Or circuit 320. |
| 13 | This pulse gates Text Address to bus by setting the HIG 220a back to Memory cycle 1 (Resets Cycle Latch 332 through Or circuit 331, FIG. 56K), decrements Wire counter and Decode block 287 by one and decrements Character Number counter 288, FIG. 56J by 2, for 10 CPI and 3 for 15 CPI by way of block 283. |
| 14 | Pulse gates hold register 282 to buffer 272 utilizing And circuit 343, FIG. 56J, or branch to start (0). Also, HIG Cycle Flip-Flop 296 and Gate HIG Latch 321 are reset using And circuit 344 and Or circuit 320, FIG. 56I, and further using Or circuit 322, FIG. 56J. And circuit 344 is conditioned by "Zero Detect (Det)" line from Wire Counter and Decode block 287 not being in a zero state. If the "Zero Detect (Det)" line is zero, then Gate HIG Latch 321 will not be reset at Cycle 14 time. |
| 15 | Pulse decrements Head (Group) Number Counter 286 by "1"and resets Hold Register 282 utilizing Or circuit 342. |

MEMORY CYCLES

The Head Image Generator 220a cycles memories 217a, 217b using an oscillator pulse, cable J, FIG. 56I, and control lines from the Communications microprocessor 200a, FIG. 56C, and decides whether or not a particular wire 33 is fired for a given print option. In a first cycle, it addresses and fetches the EBCDIC value of the character in which the wire 33 is positioned. The address needed is created from the character number on the print line as stored in counter 288, FIG. 56J.

In the second cycle, the Head Image Generator 220a finds the corresponding wire image slice for that character. A vertical slice now has only one possible wire 33. Using a masking technique, one of the eight possible wires 33 is selected and stored in the Hold Register 282, FIG. 56K, and transferred subsequently to the small stack 272, FIG. 56K.

The masking technique involves the decode portion of the wire counter and decode block 287, FIG. 56I, which supplies outputs on cable 249 to activate one of eight AND Circuits in block 250 which in turn controls entry of the data representing each of eight wires 33 in sequence and only one at a time into the Hold Register 282. The memory access cycles repeat until all wires 33 in all of the groups are loaded in stack 272, FIG. 56K. Some clock pulses during these cycles are used for loading, incrementing, setting or resetting the logic in FIGS. 56I-56K which constitutes the Head Image Generator 220a.

HIG COUNTERS

From FIG. 37 it can be seen that to describe any of the print wires 33 in the print heads 34, such as print head 2, four pieces of information are needed. Referring to FIGS. 56I and 56J, the Head Image Generator 220a has information as to which text buffer to work with determined by TXTB status 1 or 0 from register 291 to High Order Address block 279; which group it is working with, Head or group counter 286; which wire 33 within the group, wire counter portion of wire counter and decode block 287, FIG. 56I; to which character that wire 33 is pointing to on the print line, character counter 288, FIG. 56J; and finally in which slice of that character is the wire 33 positioned, wire position counter 289, which is initialized (INIT), incremented (INC), and decremented (DEC) by block 347, FIG. 56J. Outputs from Wire Position Counter 289 are buffered by a gated amplifier circuit 383.

All counters, except the wire position counter 289 and wire counter and decoder block 287, are loaded by Control microprocessor 210a for every machine print option. The Head (group) counter 286 is loaded with the total number of print head groups and decremented by one after the wire counter and decode block 287 decrements, from wire 8 down to wire 1 and gets ready to start on wire 8 of the adjacent print head 34. At the same time that the wire counter and decode block 287 is decremented, the character counter 288 is also decremented. As illustrated in FIG. 37, the distance between the wires 33 is two characters, so every time the Head Image Generator 220a moves from one wire 33 to the next wire 33, the character counter 288 is decremented by two. Also from FIG. 37, the space between wire 8 of one print head 34 and wire 1 of its adjacent print head 34 group is four characters, so the character counter 288 must be decremented by four between print heads 34. Both decrements to the character counter 288 are dependent on character density and group spacing. These are hardware programmable by use of the Head Spacing Jumper 299 and block 283, FIG. 56J, and output 16 of the HIG cycle counter 271 as well as output 13 which controls decrementing of two (2) or three (3) characters and all other selected combinations of group spacings for the printer, depending on how many print heads 34 it has.

Decrementing the counters such as counters 287 and 288 in the manner described enables the Head Image Generator 220a in stack 272, FIG. 56K, to obtain the information from wire 33 to wire 33 and from group to group until all wires 33 are optioned, masked and stored for one machine print option. Access of stack 272 is provided from gated amplifier circuit 371 representing print head groups and the CTM Address Bus Out (ABO) cable Q by way of gated amplifier circuit 379. Gating of circuits 371 and 379 is controlled by Nand circuit 297, FIG. 56J, and Nand circuit 374, FIG. 56K.

OPERATION CODES

A number of operation codes are utilized by the microprocessors 200a, 210a. These are listed below.

| ALU OP CODES | | |
|---|---|---|
| -- MODE VALUE -- | | |
| REG TO REG 0. | | |
| DAR TO DAR 1. | | |
| REG TO DAR 2. | | |
| DAR TO REG 3. | | |
| MSK TO REG 4. | | |
| MSK TO DAR 5. | | |
| Function OP Codes | | |
| Add | A | .0. |
| Add Carry | AC | .1. |
| Move | M | .2. |
| Clear (0) | CLR | .2. |
| Subtract/Borrow | SB | .3. |
| Subtract | S | .4. |
| Compare | C | .5. |
| Subtract Summary | SS | .6. |
| Compare Summary | CS | .7. |
| And | N | .8. |
| Set Bit Off | SBF | .8. |
| Test | T | .9. |
| And Summary | NS | .A. |
| Test Summary | TS | .B. |
| Or | O | .C. |
| Set Bit On | SBN | .C. |
| Shift Right | SR | .D. |
| Exclusive Or | X | .E. |
| Shift Right Circular | SRC | .F. |
| Conditional Branches | | |
| Branch Not Carry, Branch High | BNC,BH | C.ODD |
| Branch Carry, Branch Less Than Or Equal | BC,BLE | D.EVEN |
| Branch Not Zero, Branch Not Equal, Branch True | BNZ,BNE,BT | E.ODD |
| Branch Zero, Branch Equal, Branch False | BZ,BE,BF | F.EVEN |
| Unconditional Branches | | |
| Branch and Wait | BAW | C.EVEN |
| Branch | B | D.ODD |
| Branch and Link | BAL | E.EVEN |
| Branch Via Link | RTN | F001 |
| Return and Link | RAL | F201 |
| Branch Via DAR | BVD | F301 |
| Select Data Address Registers (DAR's) and Storage (STG) | | |
| Select Memory Data Low | SDL | FC01 |
| Select Memory Data High | SDH | FE01 |
| Select Memory Inst Low | SIL | F481 |
| Select Memory Inst High | SIH | F489 |
| Select Data Bit X Off | SXF | F441 |
| Select Data Bit X On | SXN | F445 |
| Select Main DARS | SMD | F501 |
| Select Aux DARS | SAD | F701 |
| Input/Output, Load/Store Ops | | |
| Input From Device | IN | 68. |
| Sense Device | SNS | 69. |
| Output To Device | OUT | 78. |
| Direct Input and Output | DIO | 7A. |
| Load Registers | LDR | 89XY |
| Load Registers and DAR+1 | LDRP | 8BXY |
| Load DAR | LDD | 84XY |
| Load DAR and DAR+1 | LDDP | 86XY |
| Load Memory Indexed | LDI | 8A0. |
| Memory to I/O Device | MIO | 8C. |
| Memory to I/O Device and DAR+1 | MIOP | 8E. |
| Load Link Register | LDL | 8000 E |
| Load Link Register and DAR+1 | LDLP | 8200 E |
| Load Absolute Address | LDA | 9. |
| Store Registers | ST | A9XY |
| Store Registers and DAR+1 | STRP | ABXY |
| Store DAR | STD | A4XY |
| Store DAR and DAR+1 | STDP | A6XY |
| I/O Data To Memory | IOM | AC. |
| I/O Data To Memory and DAR+1 | IOMP | AE. |
| Store Memory Indexed | STI | AA0. |
| Store Link High Order (Even Byte) | SLH | A000 |
| Store Link High Order and DAR+1 | SLHP | A200 |
| Store Link Low Order (Odd Byte) | SLL | A100 |
| Store Link Low Order and DAR+1 | SLLP | A300 |
| Store In Absolute Address | STA | B. |

MICROPROCESSOR REGISTERS

Each of the microprocessors 200 (200a) and 210 (210a) has a number of internal registers listed below that are used for various purposes such as work registers. The register layout for the Control microprocessor 210 (210a) is shown in FIG. 59, and the register layout for the Communications microprocessor 200 (200a), while not shown in the drawing, is handled in a similar fashion.

Communications Microprocessor Registers

| Name | | Value | Description |
|---|---|---|---|
| WORK0 | EQU | R0 | Work Register |
| WORK1 | EQU | R1 | Work Register |
| WORK2 | EQU | R2 | Work Register |
| WORK3 | EQU | R3 | Work Register |
| WORK4 | EQU | R4 | Work Register |
| WORK5 | EQU | R5 | Work Register |
| WORK6 | EQU | R6 | Work Register |
| WORK7 | EQU | R7 | Work Register |
| WORK8 | EQU | R8 | Work Register |
| WORK9 | EQU | R9 | Work Register |
| WORKA | EQU | R10 | Buffer Indicator Register |
| WORKB | EQU | R11 | Work Register |
| WORKC | EQU | R12 | Work Register |
| POINT | EQU | R13 | Pointers Not in Load Mode |
| EBC | EQU | X'8' | Switch Set to Print EBCDIC |
| PASS2 | EQU | X'4' | Pass Count for Dummy Forms in SBI |
| DHOLD | EQU | X'2' | Hold LED Display |
| COVER | EQU | X'1' | Cover Platen Open Indicator |
| HOST1 | EQU | R13 | (Alternate Use) Host Country Selected Switch |
| HARD1 | EQU | R14 | Hardware Country Selected Switch |
| LOAD1 | EQU | R15 | Random Access Memory Type of Load Switch |
| | | 0 | Nothing Loaded to Random Access Memory and IPL Mode |
| | | 1 | Multinational Loaded to Random Access Memory |
| | | 2 | Country Overlay of Multinational |
| | | 4 | Mode Switch Modification to Character Set |
| | | 8 | Modification to Character Set |
| DATA0 | EQU | D0,D0 Aux | Address Registers |
| DATA1 | EQU | D1,D1 Aux | Address Registers |
| DATA2 | EQU | D2,D2 Aux | Address Registers |
| DATA3 | EQU | D3 | Buffer Pointer DAR |
| DATA4 | EQU | D4 | Work DAR |
| DATA5 | EQU | D5 | Work DAR |
| DATA6 | EQU | D6 | Work DAR |
| DATA7 | EQU | D7 | Work DAR |
| DATA8 | EQU | D8 | Work DAR |
| DATA9 | EQU | D9 | Work DAR |
| BFNUM | EQU | D10 | Buffer Pointer Indicator |
| GECK | EQU | X'8' | In Graphic Error Mode Indicator |
| BFUSE | EQU | X'4' | Buffer Cleared Indicator |
| BFN2 | EQU | X'2' | Text Buffer 2 Indicator (0 = 1, 1 = 2) |
| RAMP | EQU | X'1' | Rest for Ramp Indicator |
| LSCON | EQU | D11 | Last Console Setting /F = In Load Mode |
| FMIND | EQU | D12 | Forms Indicator |
| PGUP | EQU | X'8' | Page Up for Display Indicator |
| D2LD | EQU | X'4' | Mask To Test for 2nd Data Load |
| CAN | EQU | X'2' | Cancel Button Held Indicator |
| TRANS | EQU | X'1' | In Transparent Mode Indicator |
| IND | EQU | D13 | Indicators |
| NEG | EQU | X'8' | Negative Skip Indicator |
| XSKIP | EQU | X'4' | More To Skip Indicator |
| PTHLD | EQU | X'2' | Print One Line and Hold |
| PTDON | EQU | X'1' | Print of One Line Done |
| PTRST | EQU | X'3' | Above Two Bits Together |
| CMCTL | EQU | D14 | Command Control Byte |
| D1LD | EQU | X'8' | Mask To Test for 1st Data Load |
| D2LD | EQU | X'4' | Mask To Test for 2nd Data Load |
| D3LD | EQU | X'C' | Mask To Test 1st and 2nd Data Load |
| RESN1 | EQU | X'1' | Mask To Test for 1st Resend |
| RESN2 | EQU | X'2' | Mask To Test for 2nd Resend |
| RESND | EQU | X'3' | Mask To Test for Either Resend |
| NOLD | EQU | X'F' | Mask To Test for No Command |
| MVADJ | EQU | D15 | Adjustment Control Byte |
| RLRDI | EQU | X'9' | Roll and Ready Indicator Together |
| ROLLD | EQU | X'8' | Roll Display Indicator |
| CHGD | EQU | X'4' | Change To Next Sequence Indicator |
| ADJPI | EQU | X'2' | Change Density Mask |
| RDY1 | EQU | X'1' | Software Ready Indicator |
| RAMIN | EQU | X'0FFB | End of Random Access Memory in ROS Slot |
| I00 | EQU | R0 | Input/Output Register |
| I01 | EQU | R1 | Input/Output Register |
| | | R2 | Work Register |
| | | R3 | Work Register |
| | | R4 | Work Register |
| PEMT | EQU | R5 | Indicates Previous Emitters |
| PHF | EQU | R6 | Print Head Flags |
| FRMST | EQU | X'1' | Forms Start Flag |
| DNSCH | EQU | X'2' | Density Change Flag |
| PARK | EQU | X'4' | Ramp Command Flag |
| PRCMP | EQU | X'8' | Printing is Complete |
| FLG1 | EQU | R7 | Indicator Flags |
| CD15 | EQU | X'1' | Character Density Equals 15 CPI |
| RV | EQU | X'2' | Print Head is Going Left (Reverse) |
| TXBUF | EQU | X'4' | Head Image Generator Is to Use Text Buffer 2 |
| HIGST | EQU | X'8' | Head Image Generator Is to Start Print Lines |
| FLG2 | EQU | R8 | Ribbon Flags |
| FBFLG | EQU | X'1' | Wire Feedback Flag |
| RBMON | EQU | X'2' | Ribbon Motor Is On |
| FMSTM | EQU | X'4' | Forms Time Flag |
| TOK | EQU | X'8' | Turn Around Is OK |
| WIPOS | EQU | R9 | Wire Position Counter |
| FECT | EQU | R10 | False Emitter Counter |
| DIAGF | EQU | X'1' | Diagnostic Flag |
| FDRCT | EQU | X'2' | Direction of Forms Movement |
| FE2 | EQU | X'4' | False Emitter 2 |
| FE1 | EQU | X'8' | False Emitter 1 |
| PRERR | EQU | R11 | Printer Error Flags |
| | EQU | X'8' | Not Used |
| HHOME | EQU | X'4' | Head Home Flag |
| TEDGE | EQU | X'2' | Turnaround Edge Flag |
| HATNA | EQU | X'1' | Head Stopped At Turnaround Flag |
| CMDFL | EQU | R12 | Command Flags |
| PRCMD | EQU | X'1' | Print Command Flag |
| PRPND | EQU | X'2' | Print Command Is Pending |
| FMCMD | EQU | X'4' | Forms Command Flag |
| TSCMD | EQU | X'8' | Test Command Flag |
| EMCT1 | EQU | R13 | Emitter Counters - Used To Determine |
| EMCT2 | EQU | R14 | Head Position by |
| EMCT3 | EQU | R15 | the Number of Emitters From Left Margin |
| MAIN/AUX | EQU | D0,D0 Aux | Address Registers |
| MAIN/AUX | EQU | D1,D1 Aux | Address Registers |
| MAIN/AUX | EQU | D2,D2 Aux | Address Registers |
| RM1 | EQU | D3 | Indicates Right Margin |
| RM2 | EQU | D4 | When the Emitter |
| RM3 | EQU | D5 | Counter Attains This Value |

End of Forms Indicators

| Name | | Value | Description |
|---|---|---|---|
| EOFI | EQU | D6 | End of Forms Indicators |
| LASTD | EQU | X'8' | Last Forms Direction, 1 = Forward; 0 = Reverse |
| LBUSY | EQU | X'4' | Busy History Indicator |

-continued

| | | | |
|---|---|---|---|
| FBSEQ | EQU | X'2' | Busy Sequence Flag |
| EOFER | EQU | X'1' | End of Forms Detected Indicator |
| FMCT1 | EQU | D7 | 16 Bit Forms AB Emitter Counter |
| FMCT2 | EQU | D8 | |
| FMCT3 | EQU | D9 | |
| FMCT4 | EQU | D10 | |
| SIGN | EQU | X'8' | Counter Sign Bit |
| Emitter Status Register | | | |
| ESTAT | EQU | D11 | |
| LASTE | EQU | X'4' | Last End-of-Forms Emitter Value |
| LASTA | EQU | X'2' | Last Forms A Emitter Value |
| LASTB | EQU | X'1' | Last Forms B Emitter Value |
| | EQU | D12 | |
| FLECT | EQU | D13 | Forms Lost Emitter Counter |
| FMECT | EQU | D14 | Forms Missing Emitter Counter |
| PT1 | EQU | D15 | Program Timer 1/Forms Command Count |
| FLAST | EQU | X'8' | 8 or More Forms Commands Flag |

PRINTER ELECTRONICS

FIGS. 60A–72D illustrate circuitry that is utilized for the printer electronics 4. In some cases, alternative embodiments are illustrated.

OPERATOR PANEL ASSEMBLY AND CIRCUITRY

Figure 4:
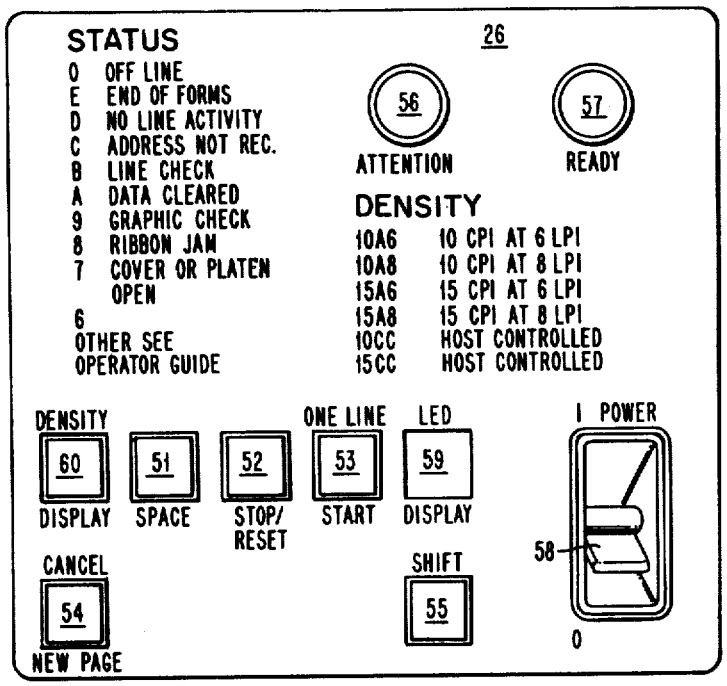
FIG. 4 illustrates an operator panel useful with the printer of FIGS. 1 and 2.
Figure 60A:
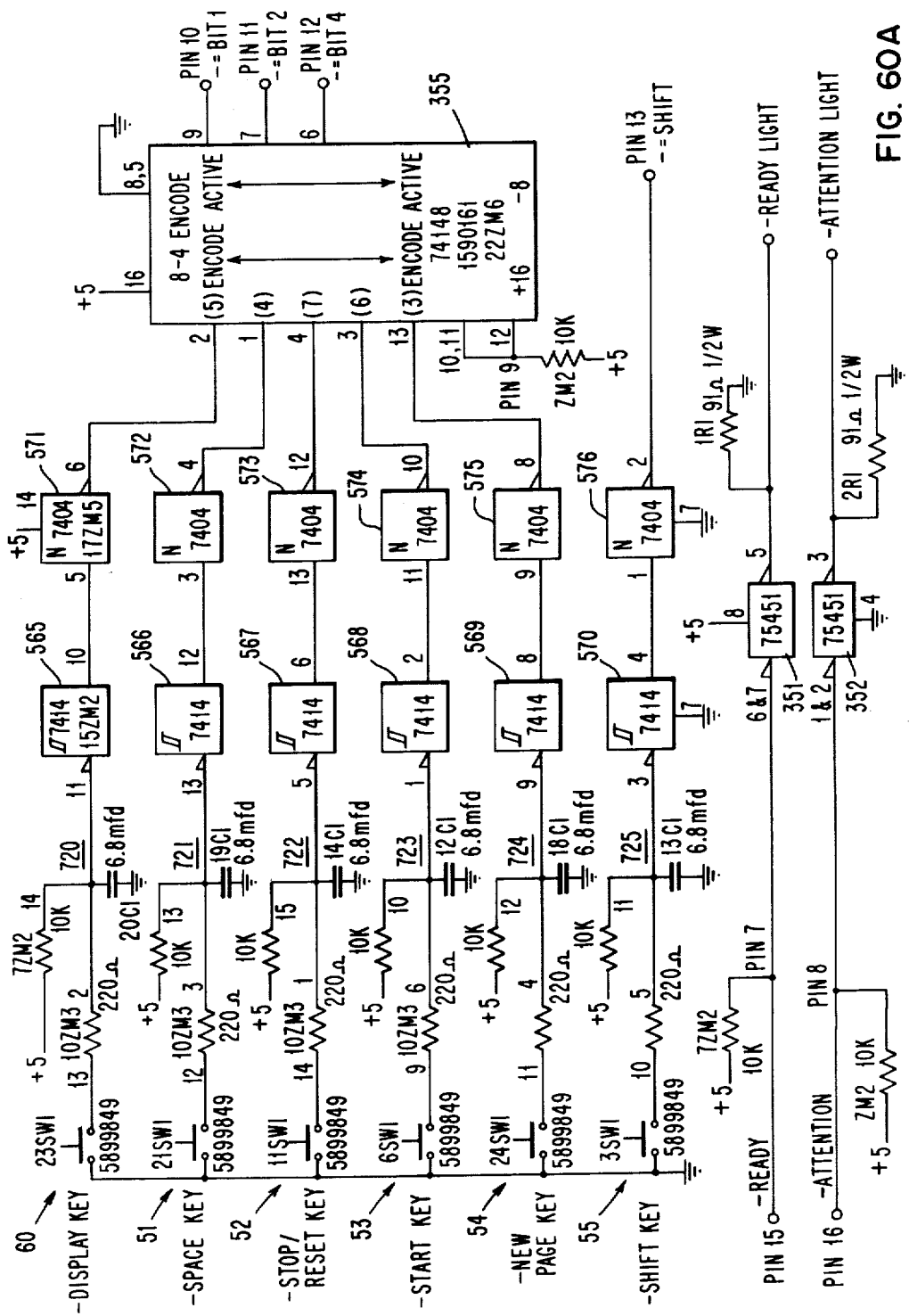
FIGS. 60A and 60B illustrate circuitry associated with the operator panel shown in FIG. 4.
Figure 60:
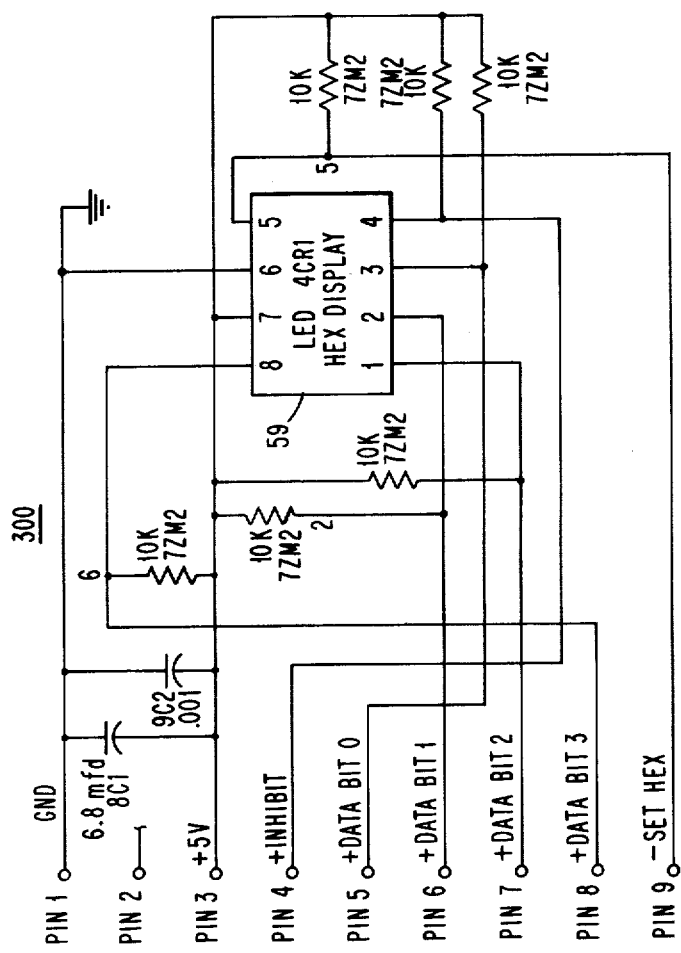

The circuitry for the operator panel 26 of FIG. 4 is illustrated in FIGS. 60A and 60B and contains six (6) pushbutton switches 51–55 and 60. The assembly includes debounce circuitry, encoding circuitry, a hexidecimal display 59 and two 300 ma lamp drivers 351, 352 (Attention, Ready) all discussed in detail below.

The six pushbutton switches 51–55 and 60 such as Start switch 53 and Stop/Reset switch 52 drive integrator circuits (20 C1, etc.) and Schmitt trigger inverter circuits 565–570 (7414/15ZM2) to eliminate switch contact bounce and circuits 565–570 in turn feed hex inverter circuits 571–576. Five (5) of the switches 51–54 and 60 are binary encoded to three output lines designated Bit 1, Bit 2 and Bit 4. The sixth switch 55 (Shift) is not included in the three encoded output lines, but interfaces via a single dedicated "Shift" line. Dual function for each of the five encoded switches 51–54 and 60 is accomplished by pushing the Shift pushbutton switch 55 at the same time as one of the encoded switches 51–54 and 60. Pushing two of the encoded switches 51–55 and 60 simultaneously will not give incorrect data, but will encode the higher (binary number) of the two switches from among switches 51–54 and 60 that are selected. As an example, the Stop switch 52 has a higher priority than other switches 51,53,54 and 60 since it is desirable that the stopping of the printer subsystem 2 be given preference over other actions in the subsystem 2.

OPERATION OF OPERATOR PANEL CIRCUITRY

When an individual pushbutton switch is depressed, FIG. 60A, the related debounce circuits 720–725 (20 C1, etc.) and Schmitt trigger inverter one of the circuits 565–570 circuits 565–570 (7414,15ZM2) become effective to eliminate contact bounce. In each case, when a pushbutton 51–55 and 60 is released (opened), the associated 6.8 ufd capacitor (19C1, etc.) charges to +5 V through its related 10K ohm resistor.

The time required to charge to +5 V is approximately equal to three time constants, with one time constant being T=RC where R=10K ohm and C=6.8 ufd. Here T would be equal to 68 milliseconds.

Upon closure, when the selected switch 51–55 or 60 is first depressed the 6.8 ufd (19C1, etc.) discharges though the 220 ohm resistor (10ZM3, etc) and the pushbutton contacts to ground. The discharge time is considerably faster than the charge time and in FIG. 60A the discharge time (3 time constants) is approximately 1.5 milliseconds. The discharged voltage will not be at a ground level, but will be elevated to 0.1 volts due to the 220 ohm resistor. With maximum current (1.6MA) due to the VTL load the output voltage (at the junction of the 10K ohm resistor and the 6.8 ufd capacitor) could be approximately 0.5 volts.

The outputs of the switch debounce circuitry 720–725 is fed into the Schmitt trigger invertes circuits 565–570 (7414), which accepts slow rise and fall input signals. The outputs of the 7414 circuits 565–570 are inverted by the 7404 hex inverter circuits 571–576 for proper input levels for the encode module 355 and the output interface for the Shift key 55.

The five (5) switches Display 60, Space 51 Stop/Reset 52, Start 53 and New Page 54 are encoded to 3 bits by the 74148 module 355. Module 355 allows priority encoding, that is, invalid data cannot be encoded. If two buttons of the group 51–54 and 60 are depressed at the same time, the output will not be a combination of both encoded outputs, but only the switch 51–54 and 60 with the highest priority. The outputs of the module 355 are negative active, and thus a binary output seven (7) is encoded as "000".

ENCODE SCHEME FOR THE PRINTER

The following is a list of the encoding of the switches 51–55 and 60 for the operator panel 26.

| KEY | ENCODE BITS (−=BIT) | | | |
|---|---|---|---|---|
| | SHIFT | 2 | 1 | 0 |
| DISPLAY/DENSITY 60 | | 0 | 1 | 0 |
| SPACE/UP 51 | | 0 | 1 | 1 |
| STOP/DOWN 52 | | 0 | 0 | 0 |
| START/ONE LINE 53 | | 0 | 0 | 1 |
| NEW PAGE/CANCEL 54 | | 1 | 0 | 0 |
| SHIFT 55 | 0 | X* | X* | X* |

*Indicates a don't care condition.

Normally without any buttons 51–54 and 60 pushed all the Encode Bits are at an up level (1). The Shift Key 55 always encodes a down level (0) in the shift position, regardless of the operation of the other keys 51–54 and 60.

Two lamp driver circuits 351 and 352 drive the Ready lamp 57 and Attention lamp 56 on the Operator Panel 26. The two lamp driver input pins 15 and 16 are negative active. The driver modules 351 and 352 (75451) are non-inverting. Therefore, when the input is pulled to a down level, the output also goes to a down level and can drop a maximum of 300 ma. The outputs of modules 351 and 352 have 91 ohm resistors (1R1 and 2R1) to ground. These serve as a pre-heat for the incandescent bulbs, heating the filament to just under visible emission temperature, and thus increasing the life of the bulbs by reducing the thermal shock.

The light emitting diode (LED) display 59 (FIG. 60B) provides a hexadecimal output used for diagnostics and to indicate errors and conditions in the printer subsystem 2. The module designated 300 has the matrix decode, LED's and LED driver combined in one package. The various voltage lines, data input lines, inhibit lines, and set lines at pins 3-9, as examples, are controlled by the Control microprocessor 210a in the subsystem 2. The display 59 will indicate the appropriate hex display when data is presented to the four Data Bit lines. Pin 5 "Data bit 0" is the high order bit (most significant bit) and Pin 8 "Data bit 3" the low order bit (least significant bit). Card Input Pin 4 is used to blank the display 59, that is, turn the LED's off. A positive input to Card Pin 9 allows the LED display 59 to follow the input data bits 0-3. If Card Pin 9 is held at a down level, the LED display 59 will latch the last data bits when Pin 9 goes from a positive level to a down level and display that character.

Drive Circuitry

Figure 61A:
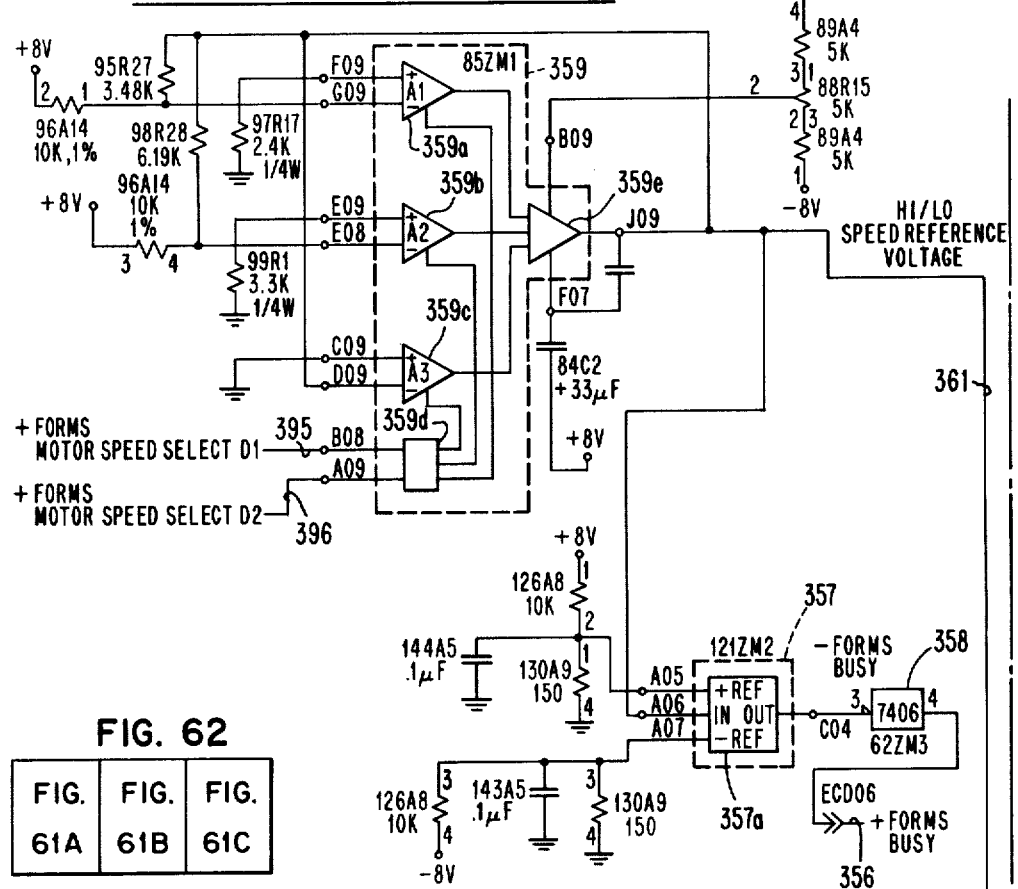
Figure 62:
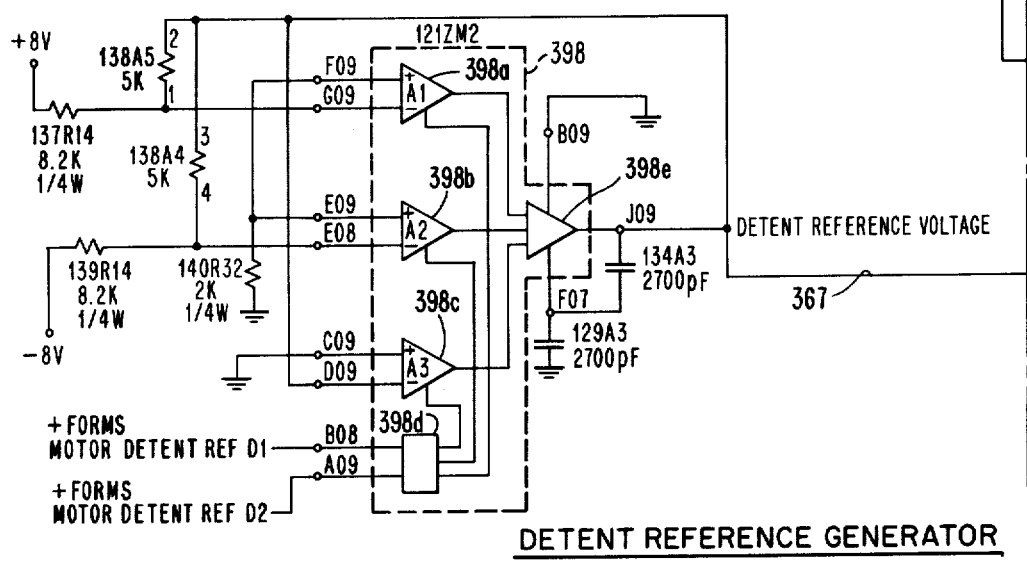
Figure 61B:
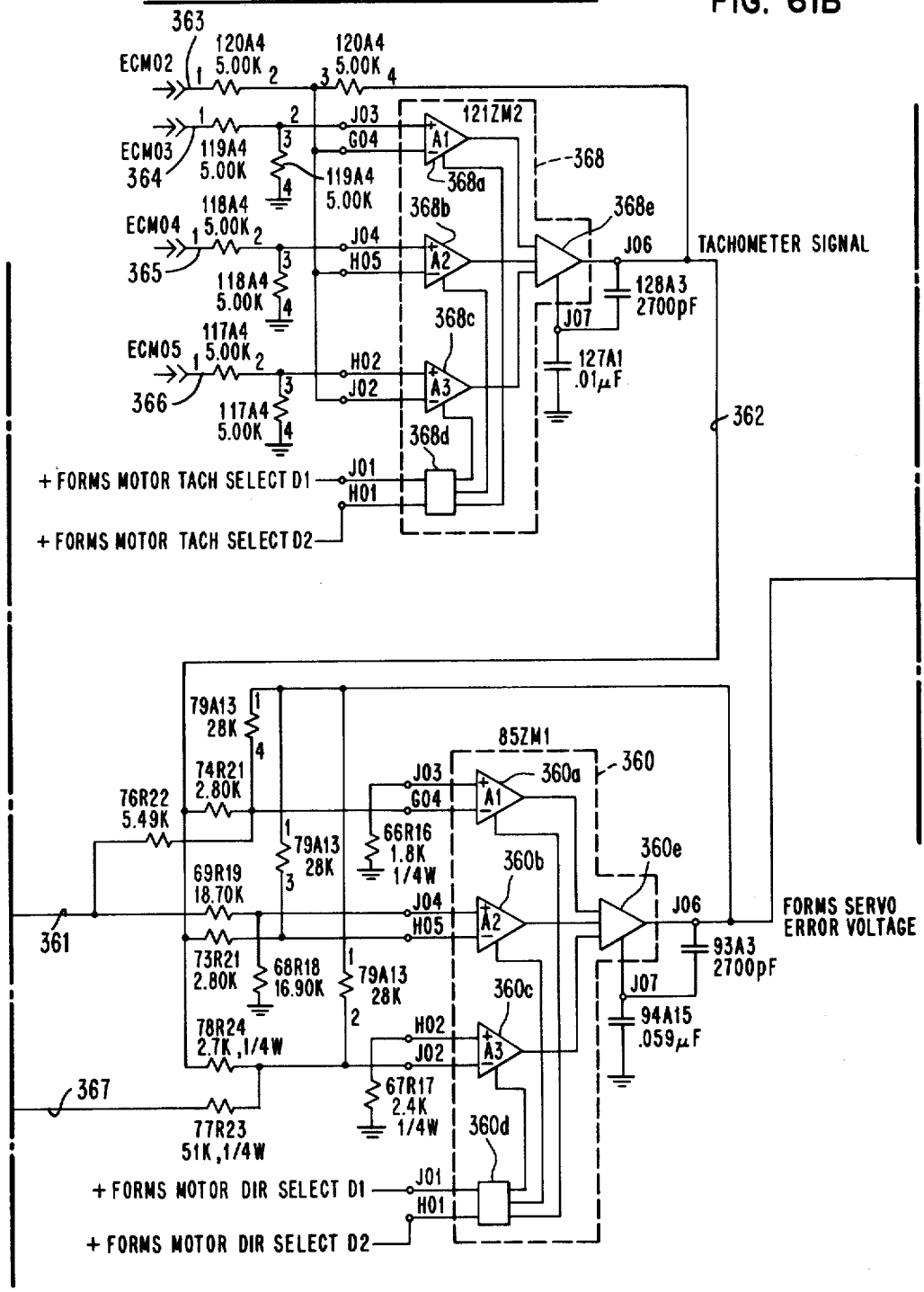

FIGS. 61A-61J represent forms drive circuitry. FIGS. 61A-61C, when arranged as shown in FIG. 62, illustrate a forms servo amplifier portion of the forms drive circuitry. Other portions are shown in FIGS. 61D-J and a voltage chart is shown in FIG. 61K.

In FIG. 61A, the circuitry includes a speed reference generator flock 359 comprising circuit elements 359a-359e which generates a reference voltage on line 361 for high speed and low speed movement, that is, a high speed slewing movement and a low speed forms stepping movement and a detent reference voltage portion used for normal speed. Circuit elements 359a-359c are gated amplifier circuits that are selectively activated to provide speed reference signals to line 361 by way of circuit element 359e which is an amplifier circuit. Circuit elements 359a-359c are gated from circuit element 359d that is a logic block and that receives a +Forms Motor Speed Select D1 signal representative of a lower motor speed (selects element 359b) and a +Forms Motor Speed Select D2 signal representative of a higher motor speed (selects element 359a). If neither input is active, then element 359c is selected indicating zero speed—no forms movement. A+ Forms Busy signal is supplied to the system on line 356 from block 357 which includes circuit element 357a by way of block 358. Circuit element 357a is a reference circuit. It has three inputs, two of which are from +8 and −8 volt sources and one of which is from block 359 that is representative of a high or low speed reference voltage. When the reference signal from block 359 goes above a high (+) or low (−) reference level, the block 357a becomes active. Circuit element 357a in turn activates block 358 to supply the +Forms Busy signal. The forms servo amplifier circuitry, FIGS. 61A-61C is velocity-controlled and involves the speed reference voltage, the detent reference voltage, and a tachometer voltage generated by the motor 23 which is fed back into the circuitry. The circuitry in, FIG. 61B amplifies the error between the two and applies it to the voltage to current conversion circuitry, FIG. 63C. In this stage, a voltage is generated that is the difference between the error voltage from the circuitry shown in FIG. 61B and a voltage that is proportional to the motor current. This error voltage, which is now proportional to the desired motor current is multiplexed by the emitter follower circuitry (21ZM2), and is applied to driver circuitry in FIGS. 65A-65C. The High/Low reference voltage is applied to the main summing error amplifier 360, FIG. 61B, by line 361, and the Detent reference voltage is applied by way of line 367. There is also an input to amplifier 360 comprising circuit elements 360a-360e on line 362 from block 368 comprising circuit elements 368a-368e which represents a combined tachometer signal after it has been multiplexed from the motor 23. The multiplex portion of the signal comes into that circuit on lines 363-366. Circuit elements 368a-368c gated amplifier circuits that provide output signals to line 362 by way of circuit element 368e which is an amplifier circuit. Elements 368a-368c are selectively gated from circuit element 368d which is a logic block. Element 368d receives motor phase signals at its inputs. The signal +Forms Motor Tach (Tachometer) Select D1 indicates phase A, the signal +Forms Motor Tach Select D2 indicates phase B and neither signal, i.e., both signals inactive, indicates phase C. Circuit elements 360a-360c are gated amplifier circuits which provide output signals to block 370 by way of block 360e which is an amplifier circuit. Elements 360a-360c are selectively gated by element 360d which is a logic block. Element 360d receives a +Forms Motor Dir (Direction) Select D1 indicative of a negative direction for forms movement, high or low speed. The input +Forms Motor Dir Select D2 indicates positive direction, high or speed. When neither input to element 360d is active, Detent Speed, forward or reverse is indicated. In summary, the amplifier circuit 360 receives both the tachometer signal on line 362 and the High/Low speed reference voltage on line 361 or the Detent Reference voltage on line 367. The difference between these two inputs, that is, any error is amplified and applied to the power amplifier circuit 370, FIG. 61C. This error is called the Forms Servo Error Voltage. Amplifier 370 comprising circuit elements 370a-370d receives inputs through circuit network 606 including block 607 and circuit element 607a converts the scale from a voltage to a current drive. That is, the error voltage is converted to essentially a motor current by way of the feedback from the motor 23 at inputs 372 and 373. Circuit element 607a serves as a comparator circuit and supplies signals to circuit element 370a to indicate forward (positive) or reverse (negative) direction. Elements 370b, 370c and 370d are gated amplifier circuits. Circuit element 370a is a logic element and if the signal from element 607a is positive, element 370a will gate element 370b and, if negative, element 70a is gated. Output from the power amplifier 370 is applied through three gated amplifier switches 375a-375c (EF1, EF2, and EF3) in block 375, FIG. 61C. These are selected by control signals on lines 376-378 to black 375d depending upon which phase of the motor 23 is required. Block 375d selectively gates switches 375a-375c according to the states of the three inputs −Forms Motor Q4 Select, Q5 Select, Q6 Select which indicate phase A, B or C of the motor. The outputs from terminals 380-382 are selected by the Selection pulses on lines 376-378. A Forms Motor Ramp Up signal is provided from block 388 having circuit element 388a, FIG. 61E, in conjunction with block 389, having circuit element 389a. Circuit element 389a receives an input designated −Forms Motor Ramp On and acts as a delay (D2) for a period of time in conjunction with circuit element 388a to cut off the forms motor so that it does not actually drive while switching from one motor phase to another. Other logical outputs from this circuitry include outputs 385-387 from the semiconductors 401-403, FIGS. 61F-61H, which select a particular pedestal coinciding with the proper phase, such outputs 385-387 being referred to as Forms Motor Q1 Select, Q2 Select, and Q3 Select. These outputs 385-387 drive the semiconductors (124Q1, etc.), FIGS. 61F-61H, to apply +48 volts through a selected one of several Darlington circuits (Q13, Q14, Q15), FIG. 65C. These circuits are on one side of the motor 23.

The circuit also includes an overcurrent portion, FIG. 61C, which includes a Schmitt trigger 390 having circuit element 390a and a ramp generator 391 with circuit element 391a. The arrangement is such that if current exceeds a predetermined value for a certain period of time then the output at block 392 with circuit element 392a is set to indicate a motor overcurrent condition. This output is referred to as a —Set Forms Motor Overcurrent. Circuit element 390a serves as a reference (comparator) circuit receiving inputs +Forms Motor Current Sense and —Forms Motor Current Sense. If excess current is sensed, element 390a is activated and in turn activates circuit element 391a, a delay element (D1). Element 391a has a built in delay to insure that an output is not provided to element 392a for brief transient overcurrent conditions. In the event of valid overcurrent conditions, element 392a will eventually be activated.

Block 394, FIG. 61I, has inputs from the Control microprocessor 210a called —Forms Run and —Forms High Speed. These are combined in block 394 including circuit element 394a and the outputs of that block 394 are called +Forms Motor Speed Select D1 on line 395 and +Forms Motor Speed Select D2 on line 296. Circuit element 394a is a logic network that receives input signals related to Forms Run and Forms Hi (High) Speed to develop the Select D1 and Select D2 outputs to block 359, FIG. 61A, that indicate forms high or low speed or no forms run. Outputs D1 and D2 on lines 395 and 396, respectively, are applied to circuit element 395d in block 359, FIG. 61A. The circuit element 359d utilizes the combinatorial states of these inputs to develop gating signals that are applied to circuit elements 359a, 359b and 359c in block 359. The outputs of circuit elements 359a, 359b and 359c are applied to circuit element 359e which supplies a reference voltage on line 361 to indicate whether or not a high speed or low speed reference will be provided to block 360, FIG. 61B. These two inputs to block 359 simply determine whether high or low speed is to be selected as a reference.

Block 398 comprising circuit elements 398a-398e provides a detent reference voltage to the forms amplifier block 360 under detent conditions, that is, normal forms running speed. Circuit elements 398a-398c are gated amplifier circuits that are selectively gated by circuit element 398d to provide detent signals to line 367 by way of circuit 398e which is an amplifier circuit. The +Forms Motor Detent Ref (Reference) D1 input to element 398d indicates a low detent motor speed in the forward direction and element 398a is gated by element 398d. The other input +Forms Motor Detent Ref D2 indicates a low detent motor speed in the reverse direction and element 398b is gated by element 398d. If neither detent speed to element 398a is selected, then element 398c is selected to indicate no detent movement. The circuit involved in the determination of detent and of forms forward conditions is circuit 399 having circuit elements 622-627, FIG. 61J. Circuit elements 622 and 623 are inverter circuits, i.e., "1" in equals "0" out, "0" in equals "1" out. Circuit elements 624-627 are Nor circuits. For the output of a Nor to be "1", both inputs need to be "0". These elements in combination and in response to the —Forms Detent and —Forms Forward signals supply the various Detent Ref D1 or D2 and Dir (Direction) Select D1 or D2 output signals previously discussed.

Block 400, FIG. 61D, is a logic module and takes various inputs to the forms drive circuitry and supplies combinatorial output signals which select particular motor phases. The block 400 has various encoder inputs, error inputs, ramp inputs, and provides outputs such as +Forms Motor Q1 Select, +Forms Motor Q2 Select, etc. which select particular phases of the forms motor 23. Certain outputs are used to drive the circuits in FIGS. 61F-61H which then provide outputs from terminals ECS06, ECS07, and ECS08 (385-387). The three circuits in FIGS. 61F-61H comprise discrete predrivers. The outputs go to Servo Driver amplifier circuitry, FIG. 65C, to switch pedestal voltages on. The other output signals from block 400 called —Forms Motor Select Q4, Q5, and Q6 are applied to block 375, FIG. 61C, to switch the analog signal on the input of block 375 (B02) to the servo driver amplifier circuitry in FIG. 65C by way of lines 380-382.

FIG. 61K illustrates various voltage levels encountered in FIGS. 61A-61J.

PRINT HEAD DRIVE CIRCUITRY

Figure 63B:
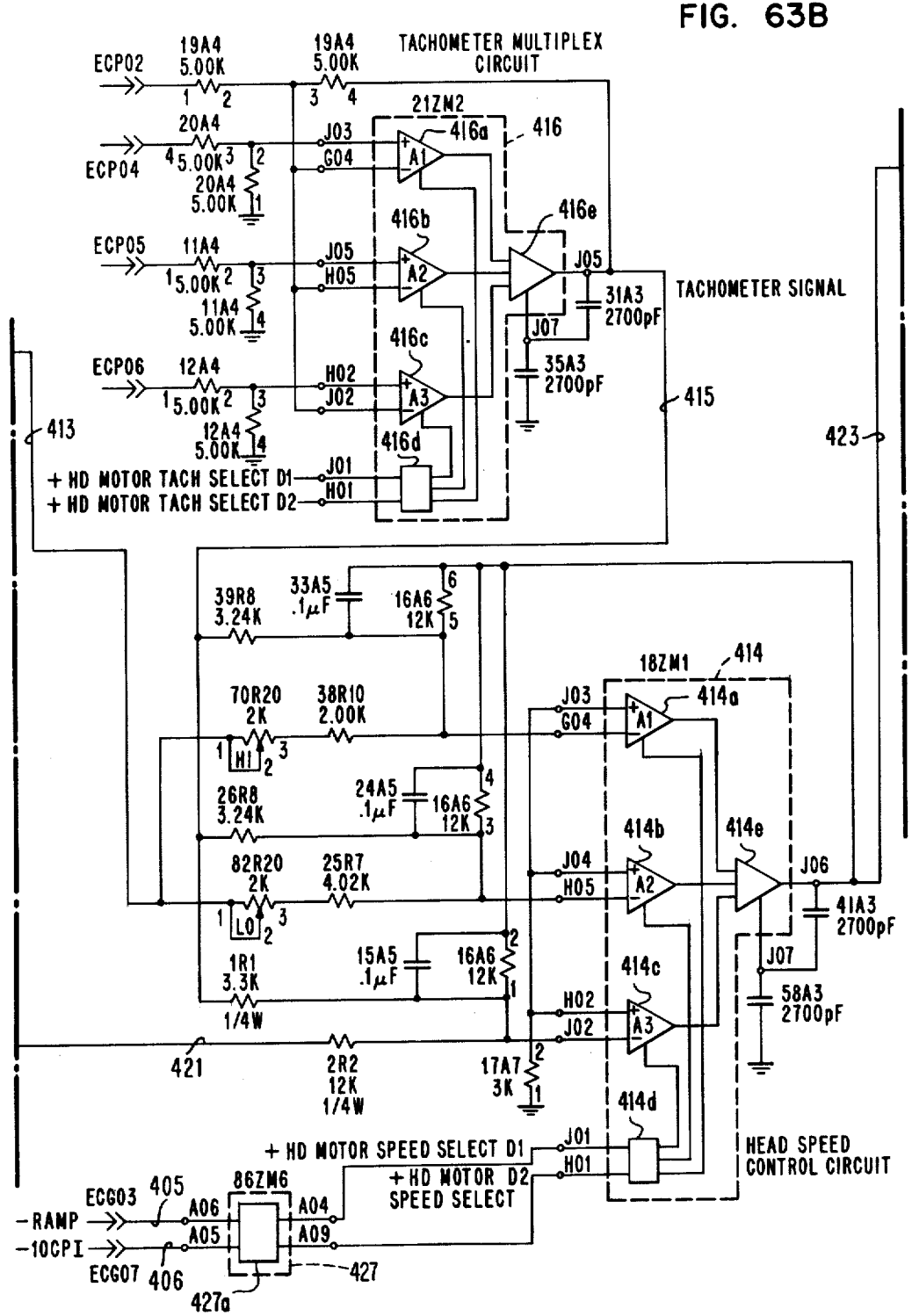
Figure 63C:
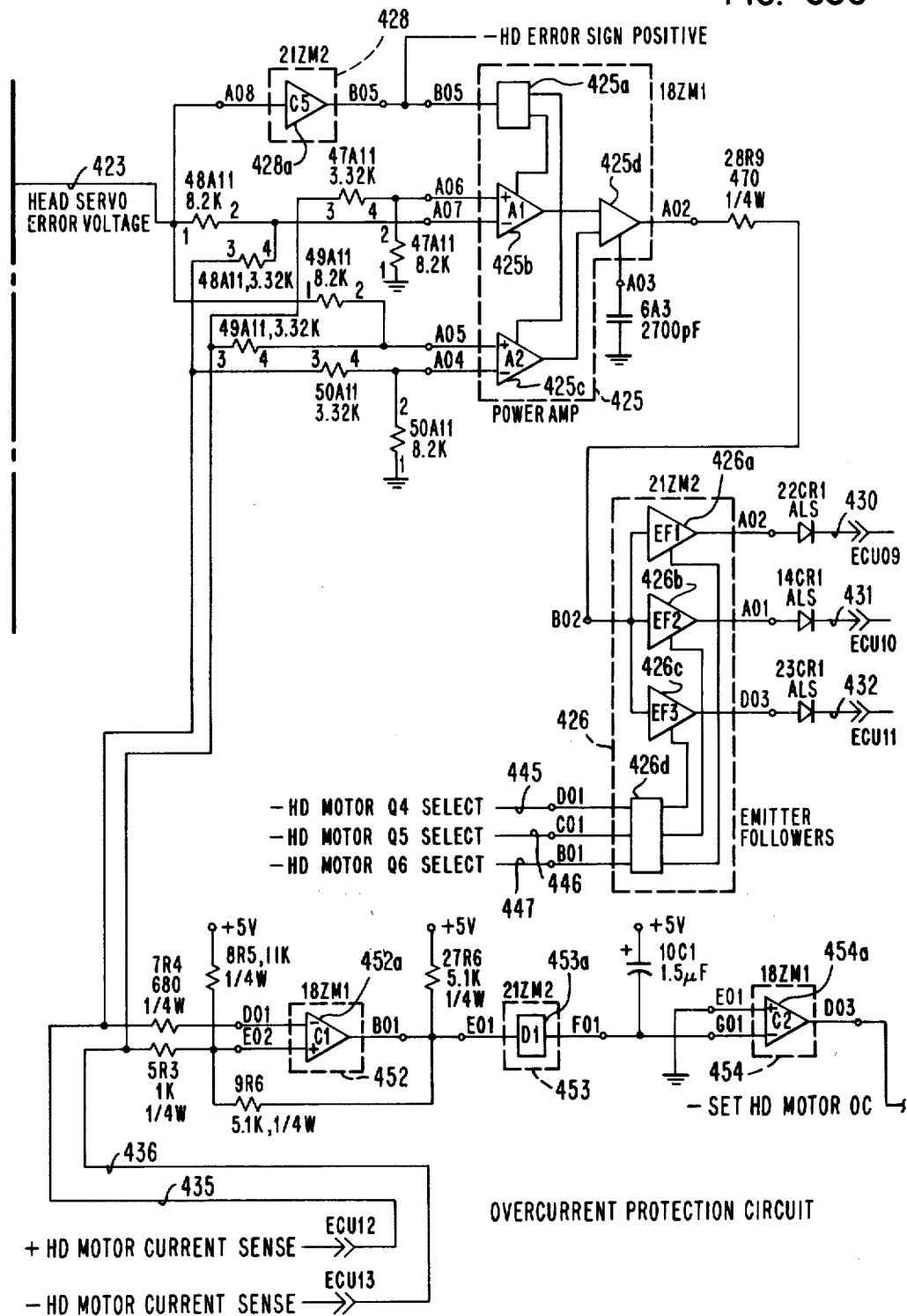

FIGS. 63A-63J represent print head drive circuitry. FIGS. 63A-63C, when arranged as shown in FIG. 64, illustrate the print head servo amplifier portion of the print head drive circuitry in the printer electronics 4. FIGS. 63D-63J illustrate other portions of this circuitry. The circuitry is arranged in a somewhat similar manner to the arrangement of the forms drive circuitry, FIGS. 61A-61J. In this case, the circuitry includes various inputs from the Control microprocessor 210a such as —Ramp on line 405 and —10 CPI on line 406 to block 427 including circuit element 427a, FIG. 63B, which pertain to velocity control. Other inputs from the Control microprocessor 210a include —Block Right on line 407, —Block Left on line 408 and —Ramp on line 409 to the circuit blocks 455-459 indicated at 410, FIG. 63I, which pertain to direction indication. The circuitry in FIG. 63I including circuit elements 455-459 receives three input signals relative to —Block Run, —Block Left and —Ramp. Element 455 is an inverter circuit that supplies a —Left signal to the head servo mechanism. Elements 456-459 are Nor circuits which act in a similar manner to those in FIG. 61J (624-627) previously described. The output signals from circuit elements 456-459 represent various conditions of print carrier 31 and print heads 34 (FIG. 8) including direction selection (left or right) for 10 or 15 characters per inch. Ref (Reference) D1 or Ref D2 and HD (Head) Motor Ramp conditions Ref (Reference) D1 or D2. These signals are supplied to the circuitry of FIG. 63A to be described. The Print Head Servo amplifier circuit includes a block 412 having circuit elements 412a-412e, FIG. 63A, with various inputs and outputs concerning reference voltage for both ten and fifteen characters per inch (CPI). Circuit elements 412a-412e have characteristics and functions analogous to circuit elements 359a-359e, FIG. 61A, with the difference being that they furnish a speed indication to circuit element 417a to establish proper speed of the print heads 34 for printing of 10 or 15 characters per inch. Element 412a is activated for left movement by Ref D1 to element 412d. Element 412b is activated for right movement by Ref D2 to element 412d. No input to element 412d means no print head movement. Circuit element 417a serves as a comparator circuit similar to circuit element 357a, FIG. 61A, except that element 417a provides a +Head Busy signal by way of block 418. This block provides an input by way of line 413 to the Print Head amplifier block 414 having circuit elements 414a–414e, FIG. 63B. A signal on line 413 also conditions block 417 having circuit element 417a and in turn block 418 to supply a +Head Busy signal. There is also a ramp reference voltage input from block 420 having circuit elements 420a–420e by way of line 421 to block 414. Circuit elements 420a–420e are analogous to circuit elements 398a–398e, FIG. 61A. A +Hd (Head) Motor Ramp Ref (Reference) D1 signal is applied to element 420d, and element 420a is activated to supply a signal by way of element 420e to line 421 to command left ramp speed movement of the print heads 34. Ref D2 input to element 420d activates element 420b to command right ramp speed movement, while if neither Ref D1 or Ref D2 is active, no ramp movement is commanded. The tachometer input signals to block 416 are multiplexed by way of line 415 with the signals on lines 413 and 421 thereby forming a combined tachometer reference signal. Circuit elements 416a–416e have characteristics and functions analogous to circuit elements 368a–368e, FIG. 61B, previously discussed. The inputs on lines 413, 415, and 421 are effective to produce an output signal from block 414. Block 427a is a logic block responsive to input signals −Ramp and −10 CPI. −Ramp low indicates Ramp speed. −Ramp high plus 10 CPI low indicates 10 CPI speed. −Ramp high plus 10 CPI high indicates 15 CPI speed. Circuit elements 414a–414e are analogous to circuit elements 360a–360e, FIG. 61B, except that they are used for print head 34 control. The Select D1 and Select D2 inputs to circuit element 414d activate element 414a (Select D1−10 CPI) or element 414b (Select D2−15 CPI) or element 414c (Neither D1 or D2 Select Active −Ramp). Thus, Block 414 supplies a signal on line 423 to the power amplifier block 425 which includes circuit elements 425a–425d, FIG. 63C, and which then supplies an amplified current output to block 426 having circuit elements 426a–426d. Block 426 includes emitter follower circuits EF1, EF2, and EF3. Characteristics and functions of elements 428a, 425a–425d and 426a–426d is analagous to respectively corresponding elements 607a, 370a–370d and 375a–375a–375d in FIG. 61C, previously described, with the exception that the elements 428, 425a–425d and 426a–426d are concerned with the print motor rather than the forms motor. The emitter follower circuits EF1, EF2, EF3 are switched into operation depending on which phase of the motor 76 is to be selected, and the outputs are supplied from terminals 430–432 to the head servo power driver circuitry in FIGS. 65A and 65B, which includes Darlington circuitry Q13, Q14 and Q15. These outputs represent analog outputs that go to the head servo power driver circuitry and then to the print head motor 76. Inputs to the print head amplifier circuitry are applied on lines 435 and 436 and involve +Head Motor Current Sense and −Head Motor Current Senses. This is a feedback input from the motor 76 which determines the scale factor for the voltage to current conversion in power amplifier 425. Accordingly, an error signal is applied to amplifier 425 by way of line 423 from amplifier 414 and a feedback current sense input at terminals 435 and 436 determines the conversion factor.

Figure 63D:
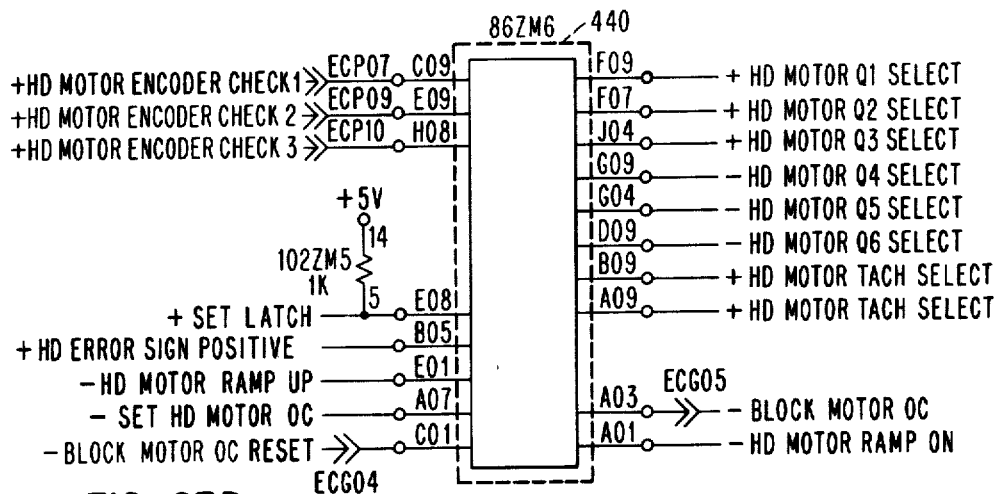
Figure 63E:
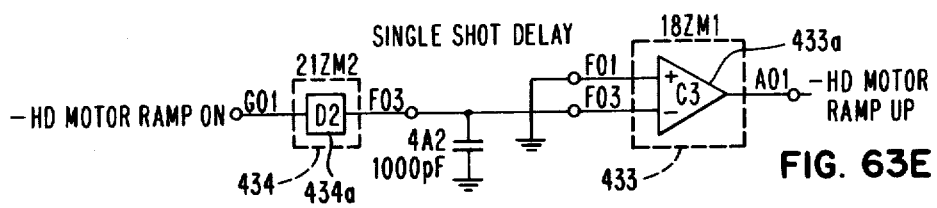
Figure 63F:
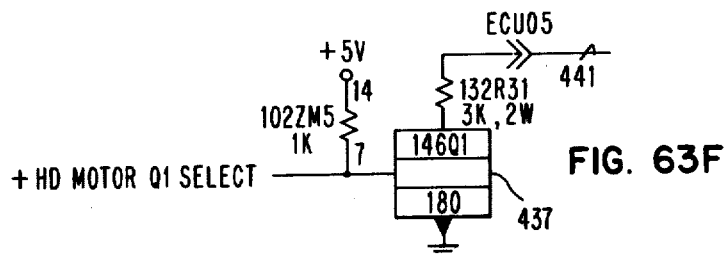
Figure 63G:
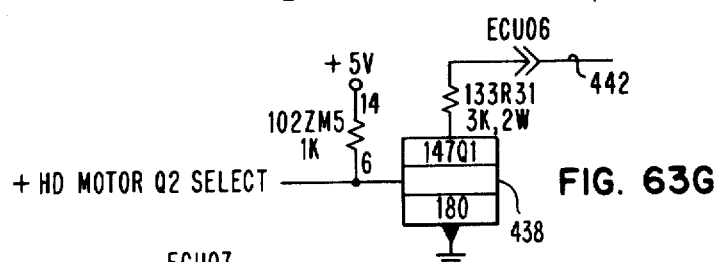
Figure 63H:
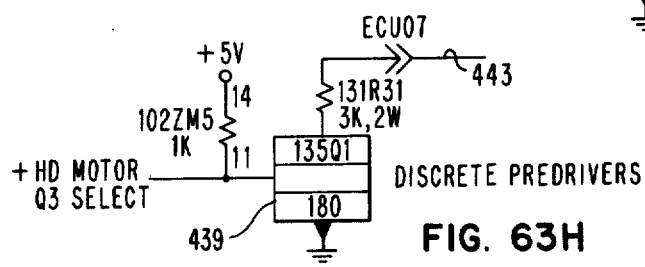
Figure 63I:
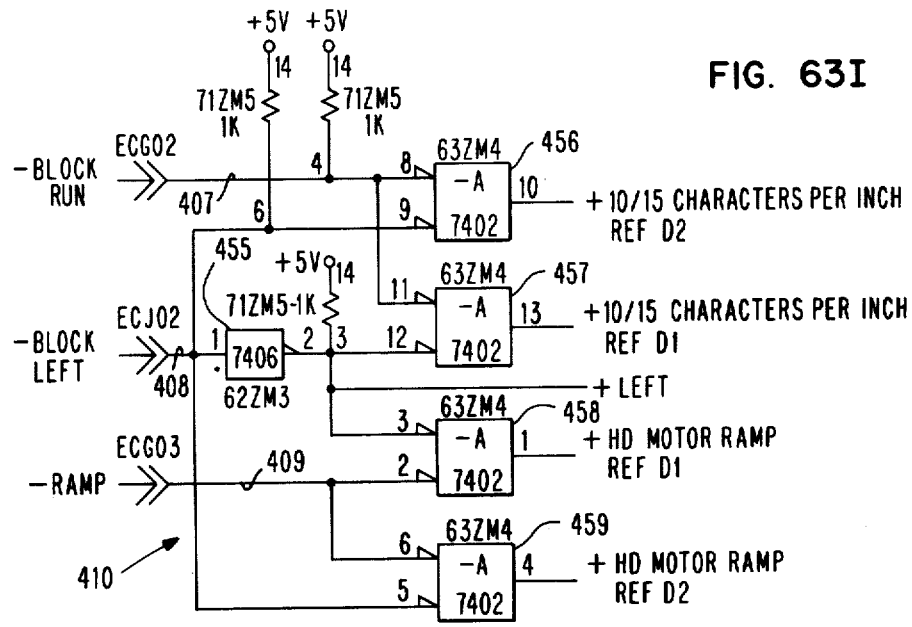
Figure 63J:
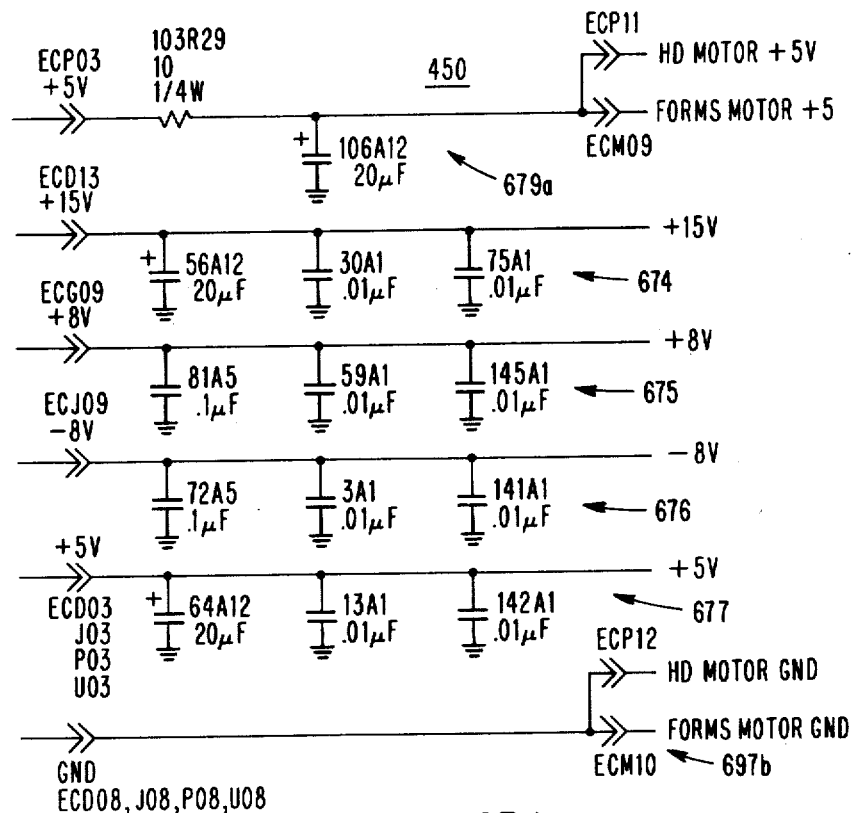

Logic module 440, FIG. 63D, takes various inputs, such as encoder inputs, representing the linear emitter channels 1, 2, and 3, ramp inputs, etc. and produces a number of control output signals such as +Head Motor Q1 Select, +Head Motor Q2 Select, etc. A −Head (−HD) Motor Ramp Up signal is provided from block 433 including circuit element 433a, FIG. 63E, in conjunction with block 434, including circuit element 434a. The characteristics and functions of circuit elements 434a and 433a are analogous to those of circuit elements 389a and 388a, respectively, previously described in conjunction with FIG. 61E. Certain of the outputs from module 440 are applied to semiconductors 437–439 in FIGS. 63F–63H, which serve as discrete pre-drivers and when these signals are applied these pre-driver circuits will switch on. The outputs 441–443 from the pre-driver circuits at terminals ECU05, ECU06, and ECU07 are applied to the Darlington circuits transistors 468, 470, FIG. 65A, and 476, FIG. 65B, for switching amplified voltages on through. The other outputs from module 440 referred to as −Head Motor Q4 Select, Q5 Select, and Q6 Select at lines 445, 446, and 447, FIG. 63C, are applied to circuit element 426d of block 426 to switch the analog signal out onto terminals 430–432. Additional distribution and decoupling capacitor circuitry is illustrated at 450, FIG. 63J. Inputs are applied to individual "rail" circuits 674–677 such as +15 volts, +8 volts, etc. Portions 679a and 679b of circuit 450 filter the input voltages and the outputs are applied to both the forms motor 23 and the head motor 76 by way of outputs such as ECP11 and ECM09. As with the forms amplifier circuits, the print head servo amplifier circuit has an overcurrent protection circuit, FIG. 63C, which includes a Schmitt trigger 452 including circuit element 452a and a ramp generator 453 including circuit element 453a. If current exceeds a predetermined value for a certain period of time, then the output circuit 454 including circuit element 454a is set and will indicate a print head motor overcurrent condition referred to as −Set Head Motor Overcurrent. The characteristics and functions of elements 452a, 453a and 454a are directly analagous to those of elements 390a, 391a and 392a, FIG. 61C, previously described.

SERVO POWER DRIVER CIRCUITS

Figure 65A:
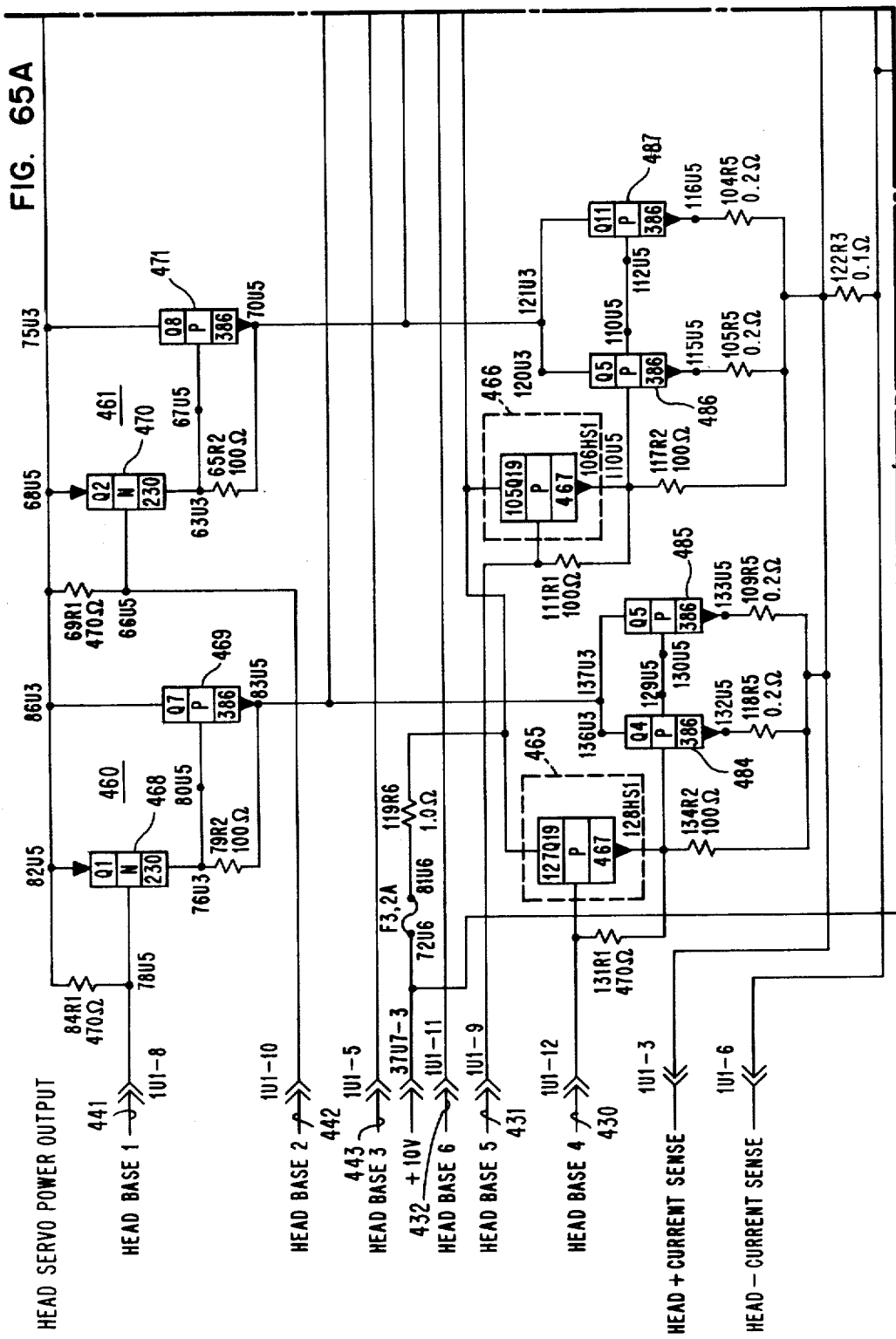
Figure 65C:
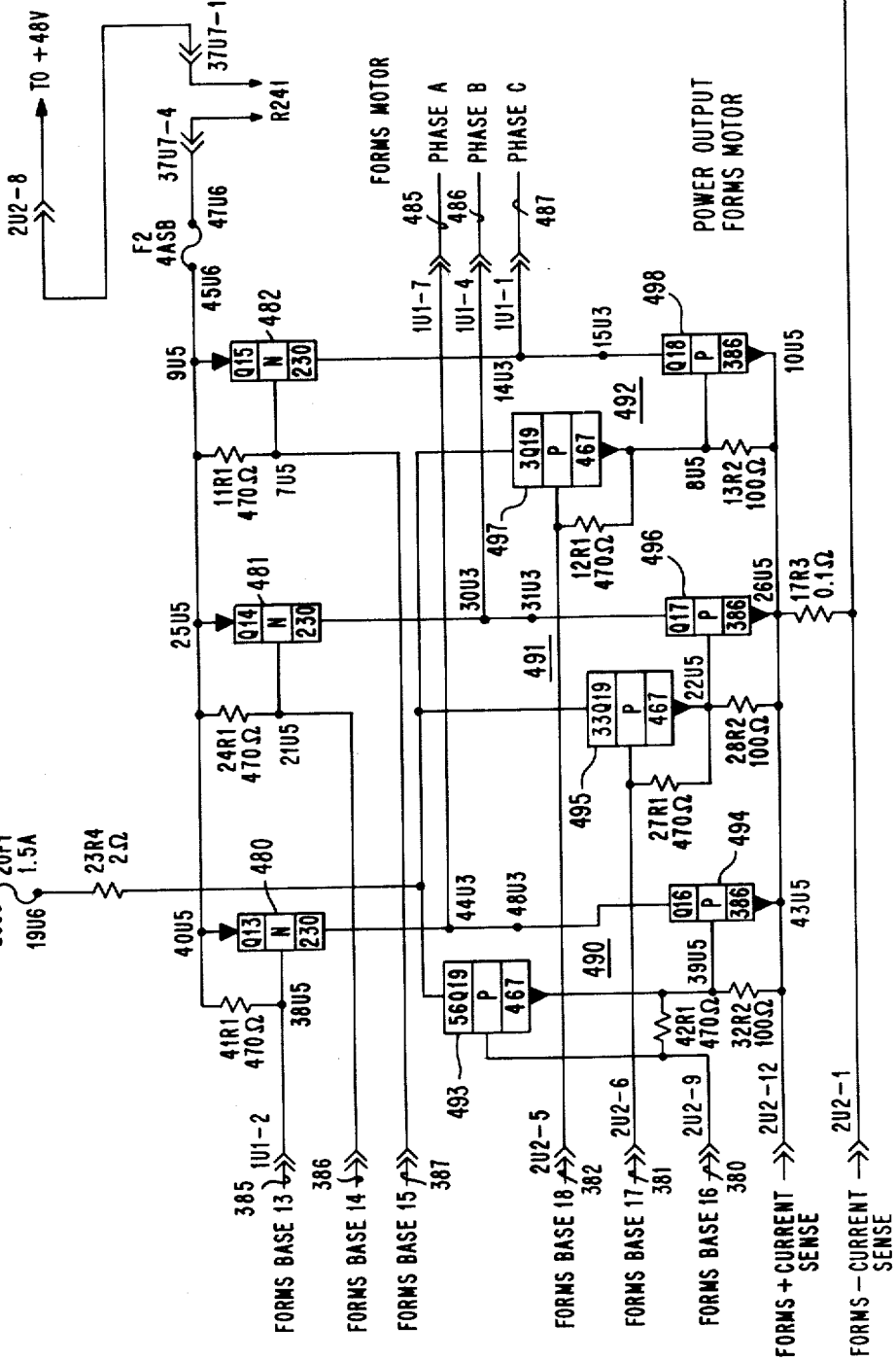

FIGS. 65A–65C, when arranged as shown in FIG. 66, illustrate servo power driver circuitry in the printer electronics 4 that is used in conjunction with the forms drive circuitry of FIGS. 61A–61J and the print head drive circuitry of FIGS. 63A–63J. The circuitry provides motor control signals for both the forms motor 23 and the print head motor 76. Referring first to the print head portion of the circuitry, FIGS. 65A and 65B, the inputs to the circuitry are three pedestal inputs which are simply switched to turn on the +48 volts to the motor 76 and also three control inputs delivering analog signals from the servo amplifier card in FIGS. 63A–63J. Inputs on lines 441–443 at Head Base 1, Head Base 2, and Head Base 3, are logic-level inputs that turn on transistors 468, 470, FIG. 65A, and 476, FIG. 65B. These are the input transistors for switch 460 (comprising transistors 468 and 469), switch 461 (comprising transistors 470 and 471), in FIG. 65A, and switch 462 comprising transistors 476 and 477 in FIG. 65B, on to apply '48 volts to the top side of the motor 76 from terminal line 463. The other inputs on lines 430–432 designated Head Base 4, Head Base 5, and Head Base 6 are three inputs which receive control signals from the print head amplifier card that are applied to the bases of Darlington transistors at 465, 466, and 467 and associated power transistors 484–489 for driving the print head motor 76 in accordance with three phases by signals supplied at outputs 470, 471, and 472. Diodes at 473 and 474 allow current to flow back to the power supply 245, FIG. 50, or from ground to the print head motor 76 depending upon the commutation of the phases. Thus, this circuitry serves as a power driver circuit for the print head motor 76.

The circuitry for driving the forms motor 23 shown in FIG. 65C is practically identical to the circuitry just described for driving the print head motor 76. Similar inputs on lines 385–387 designated Forms Base 13, Forms Base 14, and Forms Base 15 control switches 480–482. Outputs to the forms motor 23 are produced on phase output lines 485–487 as a result of input signals on lines 380–382 designated Forms Base 16, Forms Base 17, and Forms Base 18 provided to the individual circuits 490–492 which include transistors 493–498. Other inputs of interest in the circuitry in FIGS. 65A–65C are the Head+Current Sense and Head−Current Sense inputs and the Forms+Current Sense and Forms−Current Sense inputs which control the voltage to current conversion. The power driver circuitry also includes fuses (20F1, 4ASB-F2) and has external cable harness going to two resistors (R240 indicated in FIG. 65B and R241 indicated in FIG. 65C) used to limit the current in both of the servo systems when the system is in saturation. FORMS EMITTER AND END-OF-FORMS EMITTER CIRCUITRY FIGS. 67A and 67B illustrate amplifier circuitry for use in amplifying signals derived from the Forms emitter 47, FIG. 8, while FIG. 68 illustrates amplifier circuitry used in utilizing the emitter signals derived from the End-of-Forms emitter assembly particularly involving the emitter disc 115, FIG. 8. The amplifier circuits in FIGS. 67A and 67B are practically identical. The representative amplifier circuit in FIG. 67A includes an amplifier stage 500, a comparator stage 501, and a line driver module 502, while that in FIG. 67B has respectively corresponding circuit elements 680, 681 and 682. Circuit element 680 is am amplifier that serves to convert current from the photo transistor input to a voltage ramp signal output. This output is applied to circuit element 681 which serves as a comparator to compare the signal (upper input) against the reference (lower input) and will provide a square wave signal to circuit element 682. Element 682 acts as an inverter to supply an inverted signal to the Control and Sense circuitry, FIG. 68, "Forms Emitter B". Since the transitions coming from the forms emitter assembly 24, FIG. 8, are considerably faster than those derived from the print head emitter assembly 70, FIG. 8, the amplifier 500 has somewhat increased speed capability. The circuit stage of FIG. 67A including comparator 501 has an adjustable potentiometer 503 to adjust the symmetry in the circuit, while that shown in FIG. 67B includes an adjustable potentiometer 683. The End-of-Forms amplifier circuit, FIG. 68, is similar to the circuits in FIGS. 67A and 67B except that there is not a linear amplifier such as the amplifier circuit 500. It is not necessary to provide for high speed circuit action in this case since the End-of-Forms (forms jam) emitter signals from the emitter assembly 25, FIG. 8, occur at rather slow intervals. The circuit of FIG. 68 includes a comparator 505 and an output module 506.

Emitter Circuitry

Figure 69:
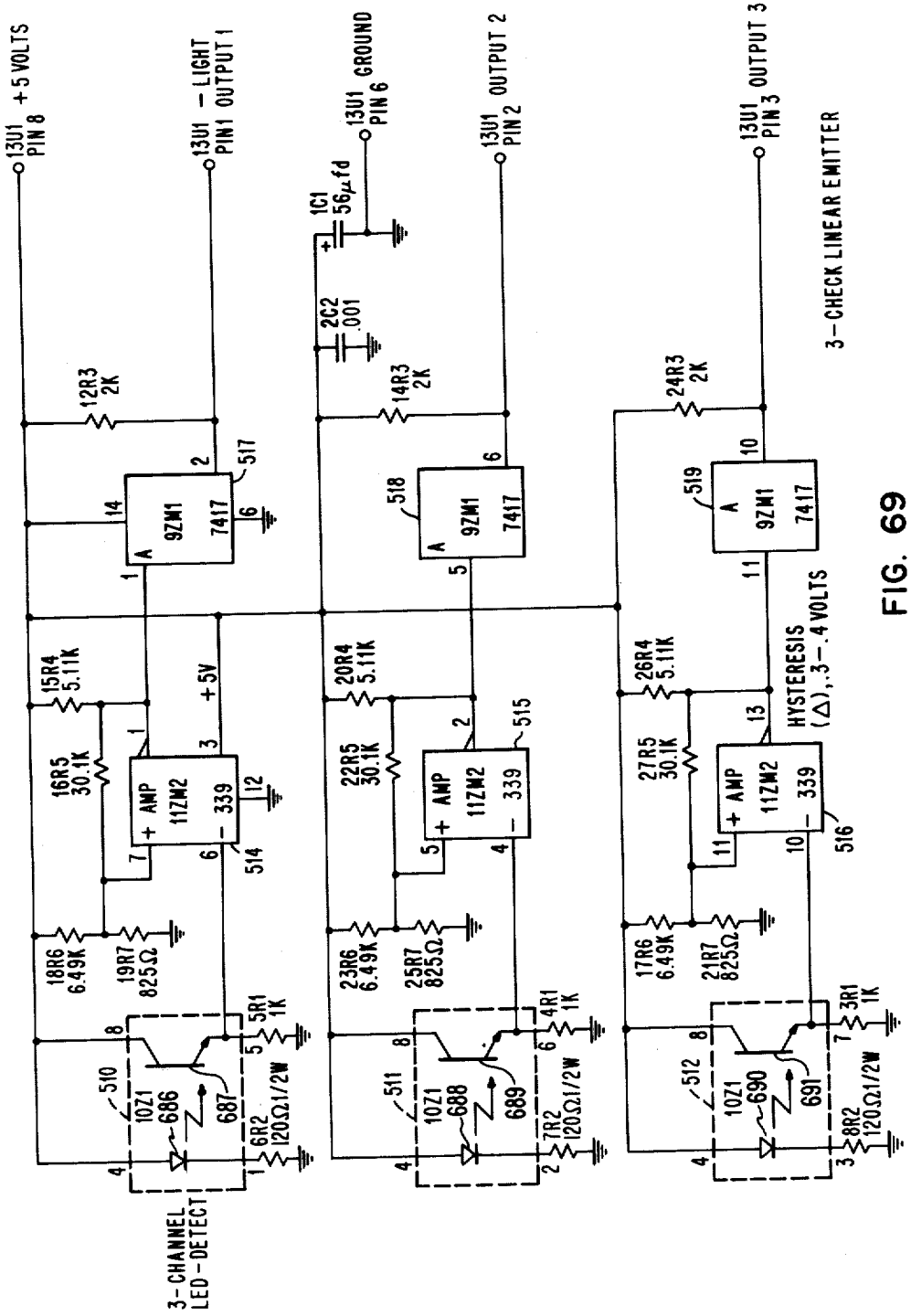
FIG. 69 shows the print emitter circuitry in the printer electronics.

FIG. 69 illustrates the circuitry for the three channels A, B, and C of the linear print emitter assembly 70, FIGS. 7 and 8. The emitter circuitry contains three optical detectors 510–512 including respective light emitting diode and transistor pairs 686-687, 688-689, and 690-691. Each of the detectors 510–512 drives one of the comparator circuits 514–516 which in turn provide outputs to the line driver circuits 517–519. The three channels from top to bottom in FIG. 69 involve the print emitters, the random turnaround emitters, and the left and right margin emitters on the registration glass 71, FIGS. 7 and 8.

Operation is as follows. When one of the optical grids traverses between the light emitting diode (LED) and the associated transistor such as diode 686 and transistor 687 in the detector circuit 510, as an example, it results in light being chopped. The output of the transistor 687 feeds the comparator module 514 directly. The opposite input to module 514 is a voltage at a predetermined level. The output of transistor 687 in block 510 goes above and below the predetermined level and thus the output from module 514 switches accordingly. A resistor network is provided around comparator module 514 to prevent its output from operating on slow transitions due to relatively slow velocities that are being used in the linear emitter operation. The output of module 514 feeds into line driver 517 which simply powers up the signal so that it can be sent over the cables. Other emitter channels in FIG. 69 operate on a similar principle.

ACTUATOR DRIVER CIRCUITRY

Figure 70:
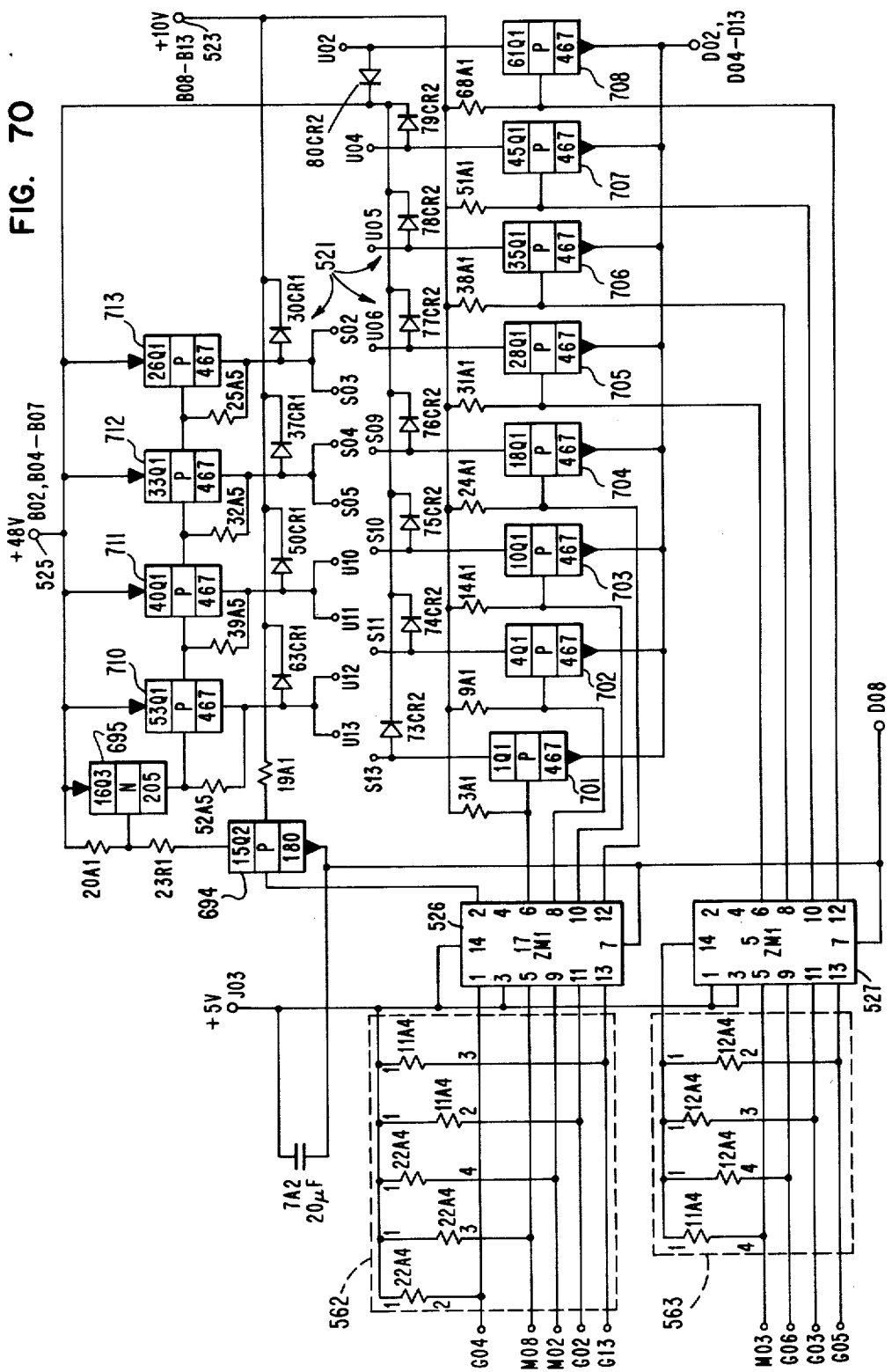
FIG. 70 illustrates the actuator drive circuitry in the printer electronics for handling sixteen print wire actuators.

FIG. 70 illustrates the actuator driver circuitry utilized to energize the actuator electromagnets (solenoids) in order to drive the print wires 33 and place dots on the forms at the print line. Outputs are originally provided from the Head Image Generator 220a which are amplified and the amplified signals in turn drive the actuator drivers. The circuitry in FIG. 70 accommodates eight print wire actuators 35 and consists of series transistor switches 701–708 and pedestal transistor switches 710–713. When the signals for the actuators 35 are supplied by the Control microprocessor 210a, transistor switches 701–708 are switched on by action of transistors 694 and 695 to provide +10 volts to the actuators 35 from terminal 523. Later a pedestal firing signal switches on transistor switches 710–713 to provide +48 volts from terminal 525 through the actuators 35 until the current through them reaches a predetermined level such as 4.2 amps, or the like. Then the pedestal switches 710–713 are shut off by action of transistors 694 and 695, the +48 volts from terminal 525 is removed and only the +10 volts from terminal 523 remains to sustain the current through the actuators 35 until the wire firing inputs are dropped to the two modules 526 and 527. Modules 526 and 527 have respectively associated networks 562 and 563 comprising resistor elements which allow pulling up of signals on the various inputs G04–G13 and M03–G05 to the logic level of +5 volts. Each actuator coil 35 is respectively connected to one of the terminal pairs U13-S13, U1-2-S11, U11-S10, etc. Twelve diodes generally designated 521 are connected to transistors 710–713 and 701–708 and are provided in the circuit of FIG. 70 to protect the respectively connected transistors from high transient signals occurring upon turn on and turn off.

RIBBON MOTOR DRIVER CIRCUITRY

FIGS. 71A-71D illustrate motor driver circuitry for the right ribbon motor 50 while FIGS. 71A-72D illustrate motor driver circuitry for the left ribbon motor 50. The motor driver circuitry such as that shown in FIG. 71A includes a pre-driver stage 530 and a Darlington output transistor stage 531. Corresponding elements 542-544 and 545-547 are shown in FIGS. 71B-71D. One circuit in each group such as the circuit in FIG. 71A for the group shown in FIGS. 71A-71D includes additional circuitry which acts as a ribbon movement detector. This circuitry includes the transistors 533 and 534 which sense the "back emf" voltage developed across the opposite ribbon stepper motor 49 or 50 and which develop a logical signal for movement detection. The driver circuitry in FIG. 72A for the left motor 49 includes identical ribbon movement detection circuitry with primary elements 551-554. Elements in FIGS. 72A-72D corresponding to elements 530 and 531 in FIG. 71A are 551, 555-557, and 552, 558-560, respectively. Operation of the driver circuit in FIG. 71A which is representative of all of the driver circuits in FIGS. 71A-72D is as follows. A down-level input to pre-drive module 530 allows transistor stage 531 to conduct. Since the ribbon stepper motor 49 or 50 is an inductive load, the didoe 535 protects transistor 531 when the input returns to the up-level. Diode 536, on the other hand, protects transistor 531 since the output can also go below zero volts. Normal current through transistor 531 during on-time is 1.5 amperes. The detector circuit comprising transistors 533 and 534 operates as follows. When the output from the opposite ribbon driver motor 49 or 50 rises approximately 2 volts above the +10 volt input at terminal 537, transistor 533 turns on and switches transistor 534 to the on state. This provides an output at terminal 538. Diode 539 protects transistor 533 from reverse breakdown.

While a preferred embodiment of the invention has been illustrated and described, it is to be understood that there is no intention to limit the invention to the precise constructions herein disclosed and the right is reserved to all changes and modifications coming within the scope of the invention as defined in the appended claims.

We claim:

1. A printer subsystem interconnected with a host system for receipt of command signals and data signals from said host system and transmission of status signals back to said host system, comprising:

a printer unit including a forms feed assembly, a ribbon drive assembly and a print assembly, said assemblies being operable to print data on forms in said printer unit in response to data signals as well as perform other operations in connection with printing;

a communications adapter, said communications adapter incorporating a communications microprocessor and said communications adapter being operable to translate command signals provided by said host system into control signals representative of printer actions required, such as print, carrige returns, line feeds, and the like and to process data signals provided by said host system;

a control adapter, said control adapter incorporating a control microprocessor and said control adapter being operable to receive status signals from various sensors in said printer unit, such as ribbon reverse/jam, forms jam, head position, linear encoder, forms position encoder, and the like, and further being responsive to command signals from said communications adapter and data signals generated in said subsystem to generate print firing signals and various control signals to control said forms feed assembly, said ribbon drive assembly and said print assembly in said printer unit;

interface means interconnecting said communications adapter with said host system for receipt of said command and data signals from said host system and for transmission of status signals back to said host system representative of various conditions in said printer subsystem;

image generator means interconnected with said communications adapter and said control adapter and responsive to command and data signals received from said communications adapter to produce control signals and character image signals for use by said printer unit during printing operations, said image generator means being operable to convert data signals from said host system to image signals in a format required to operate said printer unit, said image signals being provided to said printer unit via said control adapter;

communications storage means accessible by said communications adapter for storing character information to be printed and further accessible by said image generator means for conversion of said character information to image signals for use by said printer unit;

control and sense means interconnecting said printer unit with said control adapter for transfer of command and image signals from said control adapter to said printer unit and for transfer of status signals from said printer unit to said control adapter; and register means interconnected between said communications adapter and said control adapter, said register means being operable to store command, data, image, and status signals pertaining to operation of said printer subsystem and for intercommunication purposes between said communications adapter and said control adapter.

2. The printer subsystem of claim 1 wherein said host system provides command signals and data signals to said communications adapter in accordance with a first format; and wherein said image generator means is operble to convert data signals in said first format to data signals in a second format for use by said control adapter and said printer unit, said data signals in said second format being more directly representative of functions and information required during printing operations.

3. The printer subsystem of claim 1, further comprising:

means interconnecting said image generator means with said communications microprocessor and said control microprocessor; wherein said host system provides data signals to said communications microprocessor representative of characters to be printed, said data signals being in a first format, wherein said printer unit utilizes data signals in a second format that differs from said first format; and wherein said image generator means is operable to convert said data signals in said first format to data signals in said second format for use by said control microprocessor and said printer unit.

4. The printer subsystem of claim 1, further comprising:
wire matrix means incorporated in said print assembly for printing characters on a form in said printer unit by means of dot images.

5. The printer subsystem of claim 1, wherein:
said communications storage means includes space for accommodating at least two text buffers each of which is capable of accommodating an entire line of data to be printed; and wherein
said communications adapter enters data into said text buffers on an alternate line by line basis.

6. The printer subsystem of claim 5, wherein:
said control adapter is operable to access text buffer information in said communications storage means in response to control signals from said communications adapter.

7. The printer subsystem of claim 1, further comprising:
operator facilities, said facilities including entry means for entering control information indicative of operation of said printer unit on-line or off-line, and the like and display means for displaying condition information to an operator; and
means incorporated in said communications adapter for accessing said operator facilities to determine entry of control information by an operator and further operable to provide signals for operating said display means to indicate status of said printer subsystem.

8. The printer subsystem of claim 1, further comprising:
emitter means incorporated in said printer unit for indicating positional conditions of said forms feed assembly, said ribbon drive assembly and said print assembly; and
means incorporated in said control adapter for receiving emitter signals from said emitter means and for monitoring the position of said assemblies in said printer unit.

9. The printer subsystem of claim 8 wherein said printer unit has a forms motor, a print motor and at least one ribbon motor, said forms and print motors having respectively associated emitter assemblies and wherein said control and sense means interfaces with said control adapter and said printer unit to control said forms motor, said print motor, and said ribbon motor and is further operable to sense the status of printer elements such as the print emitters, forms emitters, and the like.

10. The printer subsystem of claim 1 further comprising:
a head latch for latching image data received from said image generator means by said control adapter and for supplying said image data in synchronized fashion to said printer unit.

* * * * *